(12) United States Patent
Garwood

(10) Patent No.: US 7,455,704 B2
(45) Date of Patent: Nov. 25, 2008

(54) METHOD OF PROCESSING WASTE PRODUCT INTO FUEL

(76) Inventor: Anthony J. Garwood, 9772 SE. 41st St., Mercer Island, WA (US) 98040

( * ) Notice: Subject to any disclaimer, the term of this patent is extended or adjusted under 35 U.S.C. 154(b) by 616 days.

(21) Appl. No.: 10/958,996

(22) Filed: Oct. 5, 2004

(65) Prior Publication Data

US 2005/0142250 A1  Jun. 30, 2005

Related U.S. Application Data

(63) Continuation-in-part of application No. 10/878,491, filed on Jun. 28, 2004, now abandoned, and a continuation-in-part of application No. PCT/US03/17643, filed on Jun. 3, 2003.

(60) Provisional application No. 60/545,841, filed on Feb. 18, 2004, provisional application No. 60/536,770, filed on Jan. 15, 2004, provisional application No. 60/483,311, filed on Jun. 27, 2003, provisional application No. 60/561,128, filed on Apr. 9, 2004, provisional application No. 60/385,710, filed on Jun. 3, 2002, provisional application No. 60/388,067, filed on Jun. 10, 2002, provisional application No. 60/391,702, filed on Jun. 24, 2002, provisional application No. 60/411,138, filed on Sep. 16, 2002, provisional application No. 60/422,949, filed on Oct. 30, 2002, provisional application No. 60/424,388, filed on Nov. 5, 2002, provisional application No. 60/427,516, filed on Nov. 19, 2002, provisional application No. 60/429,644, filed on Nov. 25, 2002, provisional application No. 60/433,526, filed on Dec. 13, 2002, provisional application No. 60/438,546, filed on Jan. 7, 2003.

(51) Int. Cl.
*C10L 5/00* (2006.01)
*C10L 5/40* (2006.01)

(52) U.S. Cl. .............................. 44/589; 44/605; 44/628

(58) Field of Classification Search .................... 44/589, 44/605, 628
See application file for complete search history.

(56) References Cited

U.S. PATENT DOCUMENTS 3,910,775 A * 10/1975 Jackman ...................... 44/589

* cited by examiner

*Primary Examiner*—Cephia D Toomer
(74) *Attorney, Agent, or Firm*—Foley & Lardner LLP

(57) ABSTRACT

Fuels used may be derived from existing waste streams such as animal wastes and streams of discarded or unwanted animal byproducts generated at animal slaughterhouses. A method of processing organic waste products into fuel includes homogenizing the waste products. The waste products are heated and pressurized. Water is removed from the waste products. Selected constituent of the waste products are separated from the waste products into a waste stream. The waste stream is blended with a fuel to form a bio-fuel mixture.

1 Claim, 50 Drawing Sheets

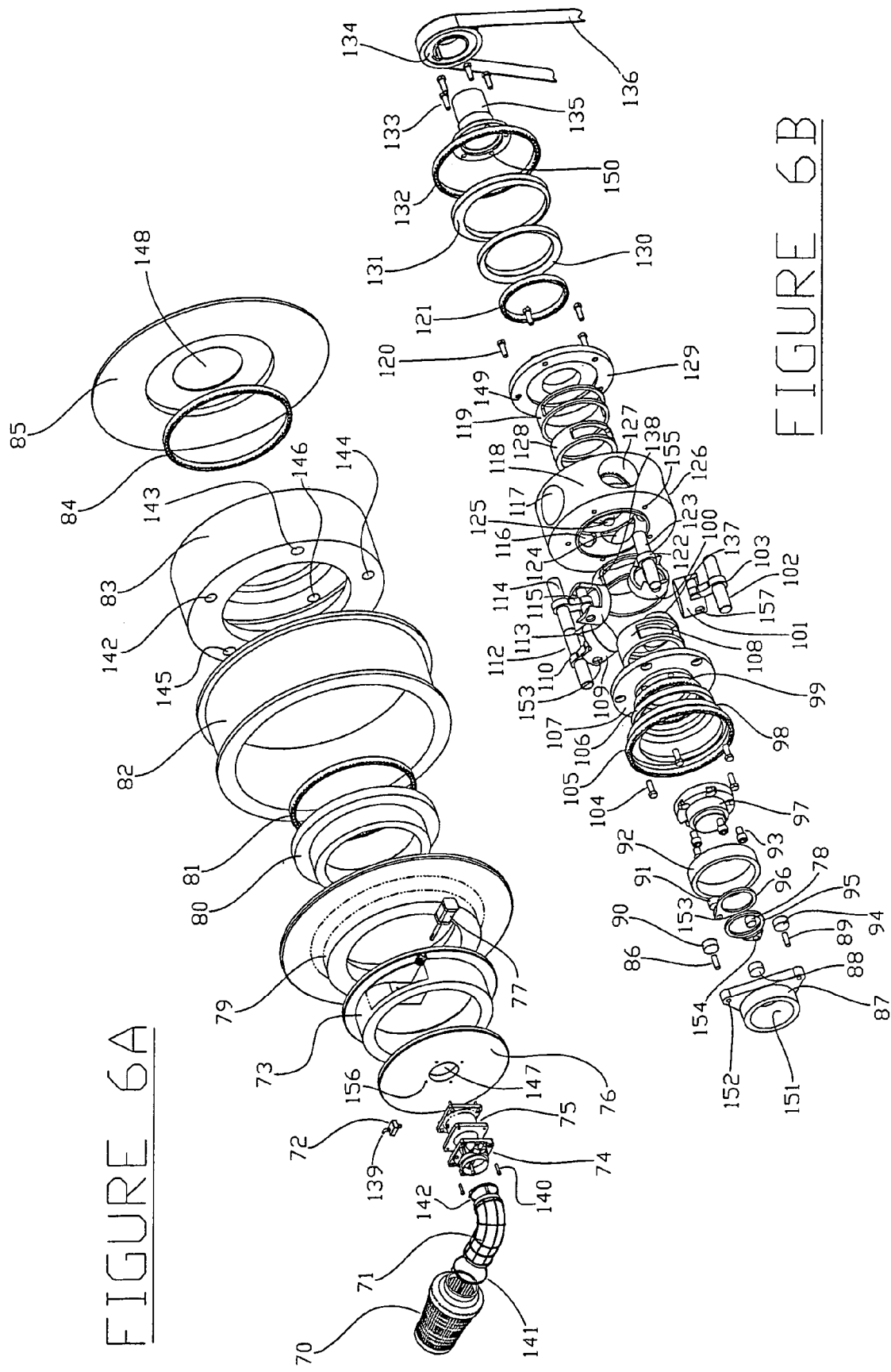

COMPRESSOR STAGE
Two Stroke Cycle

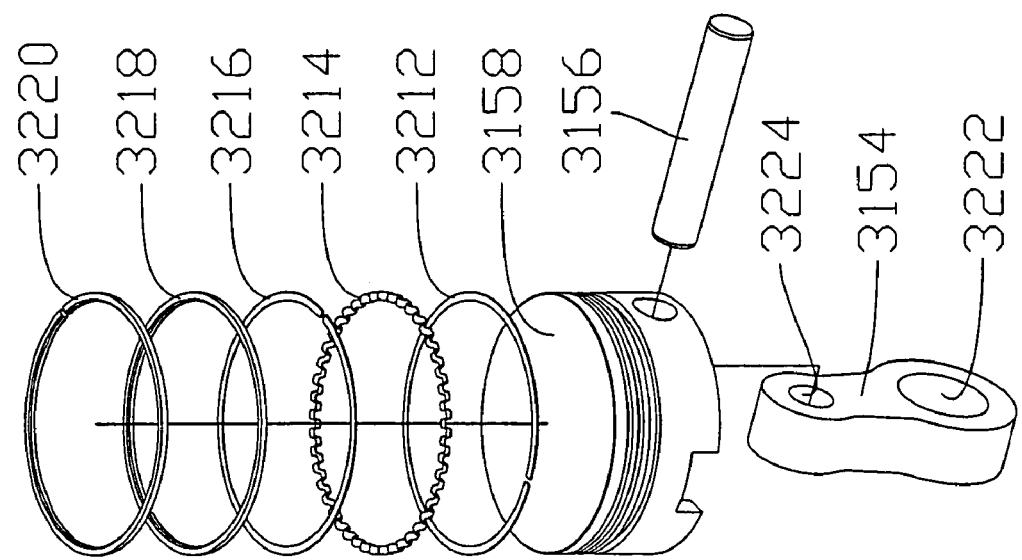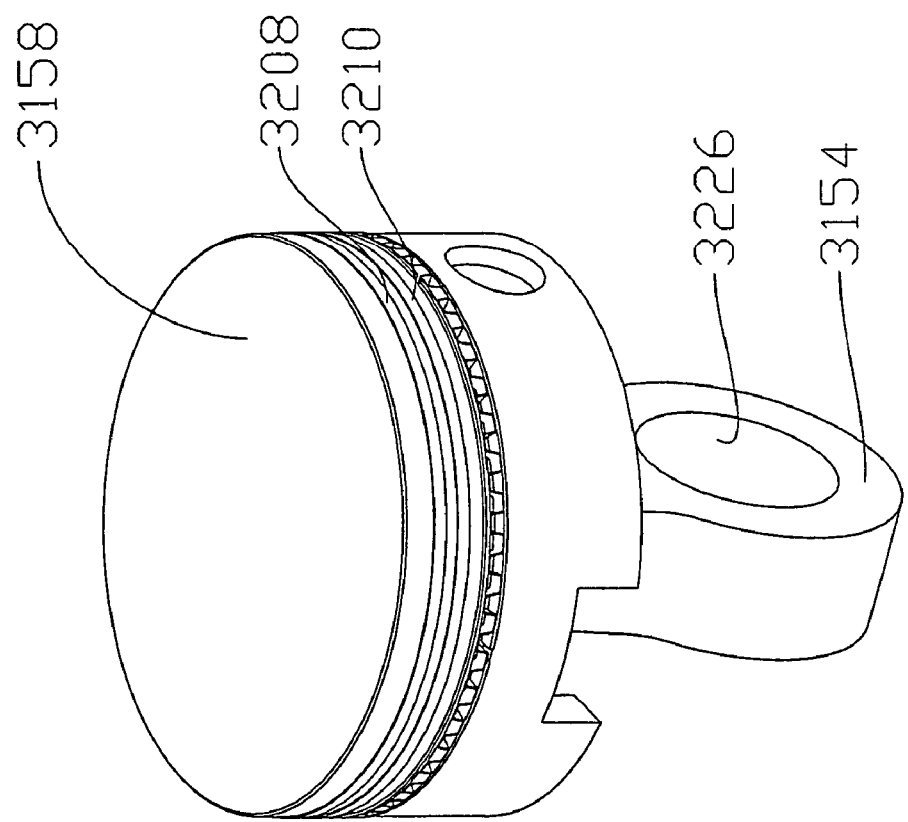
FIGURE 26

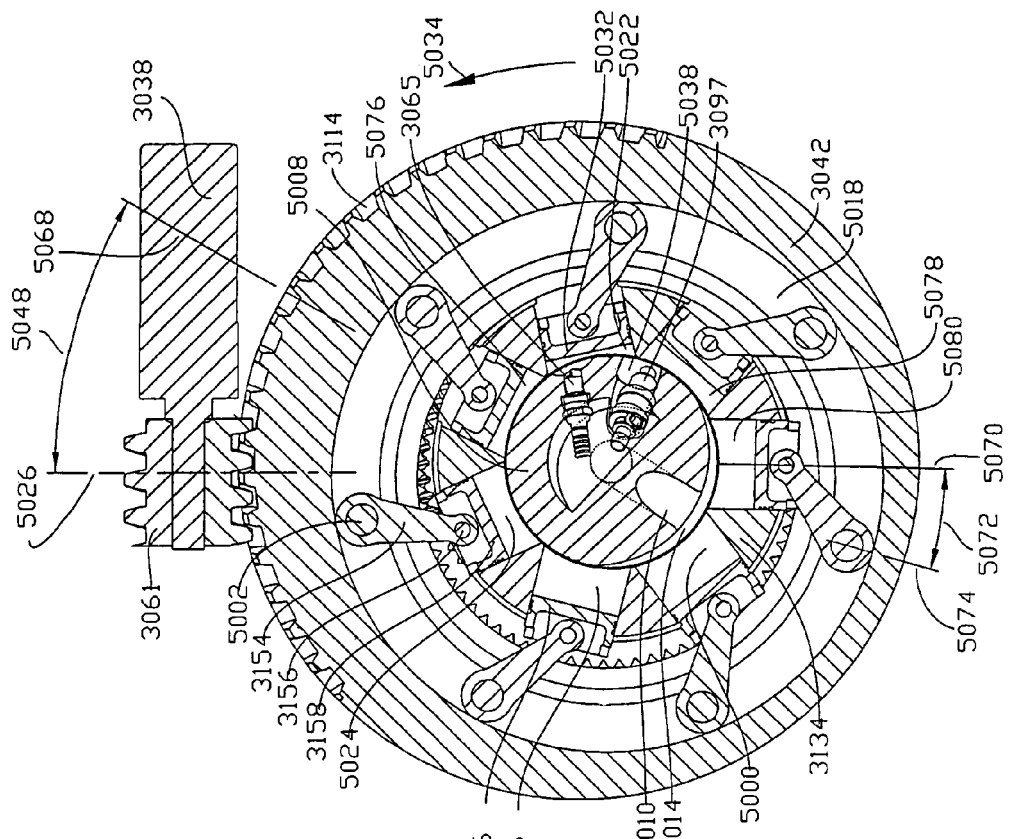
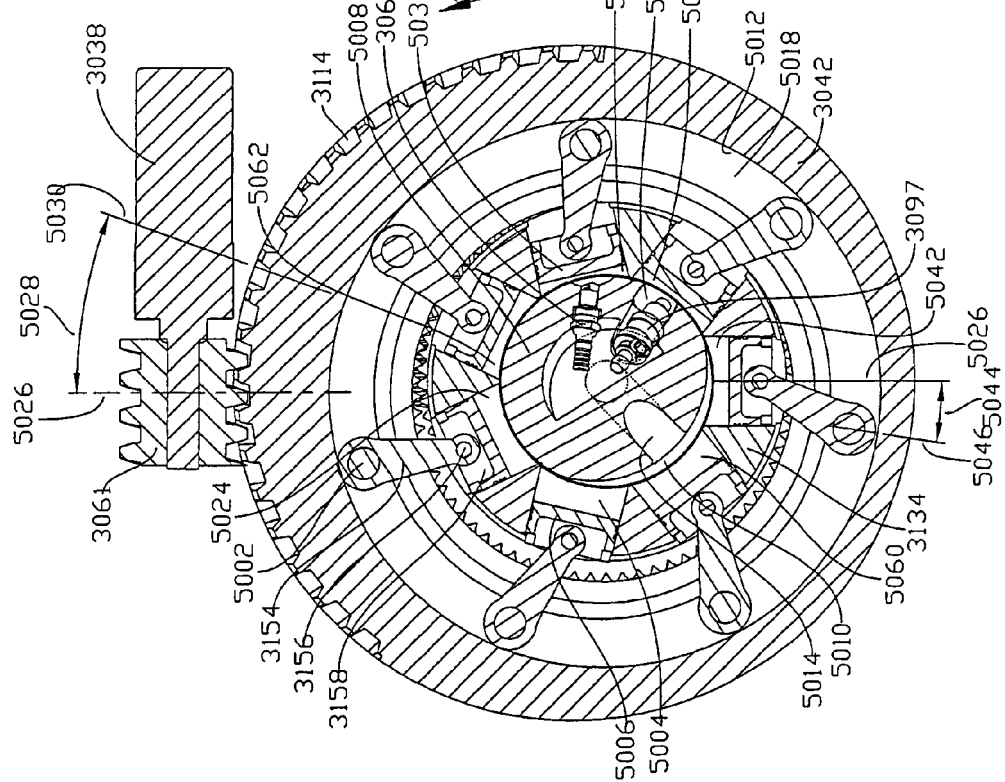
FIGURE 29A
FIGURE 29B

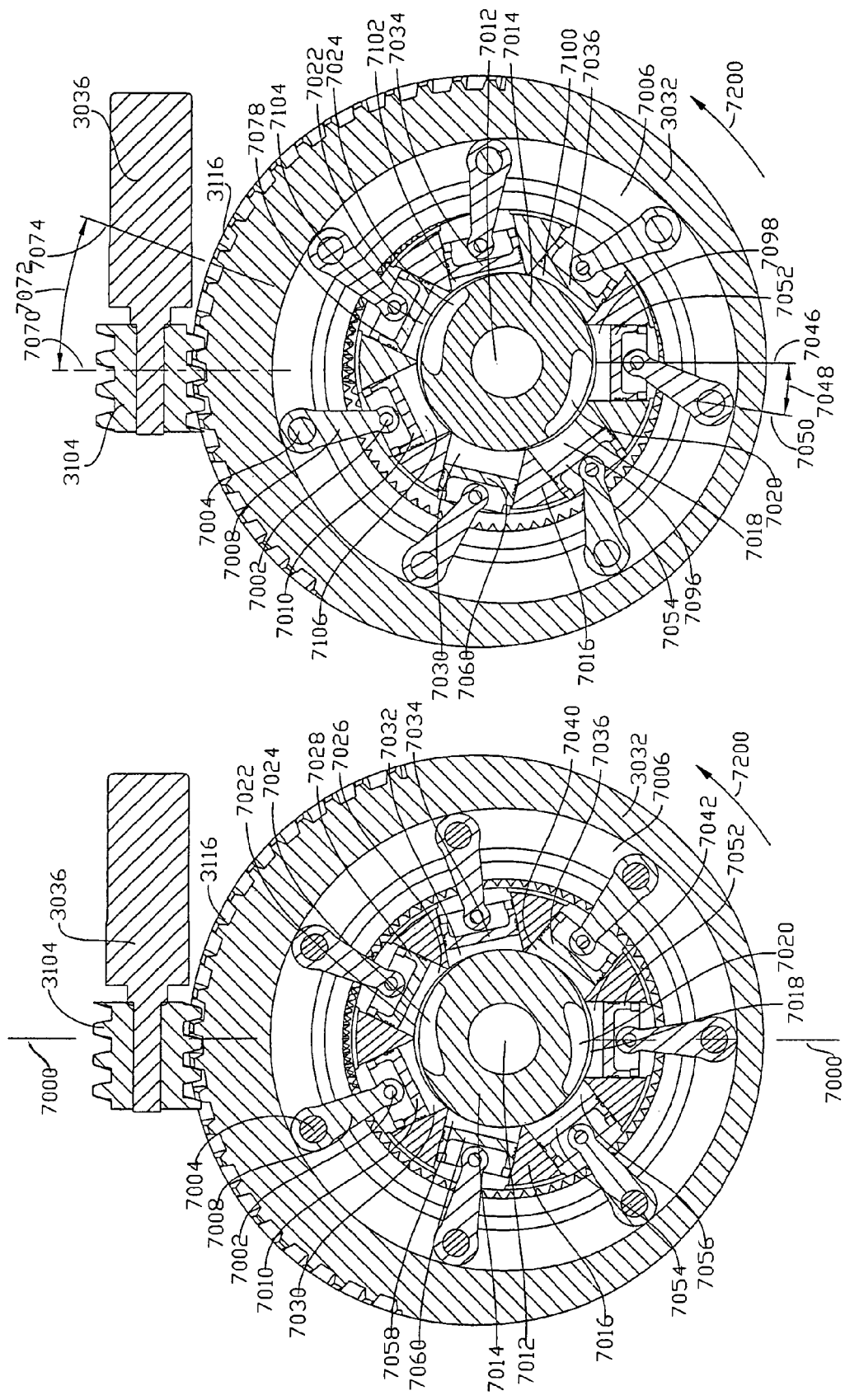

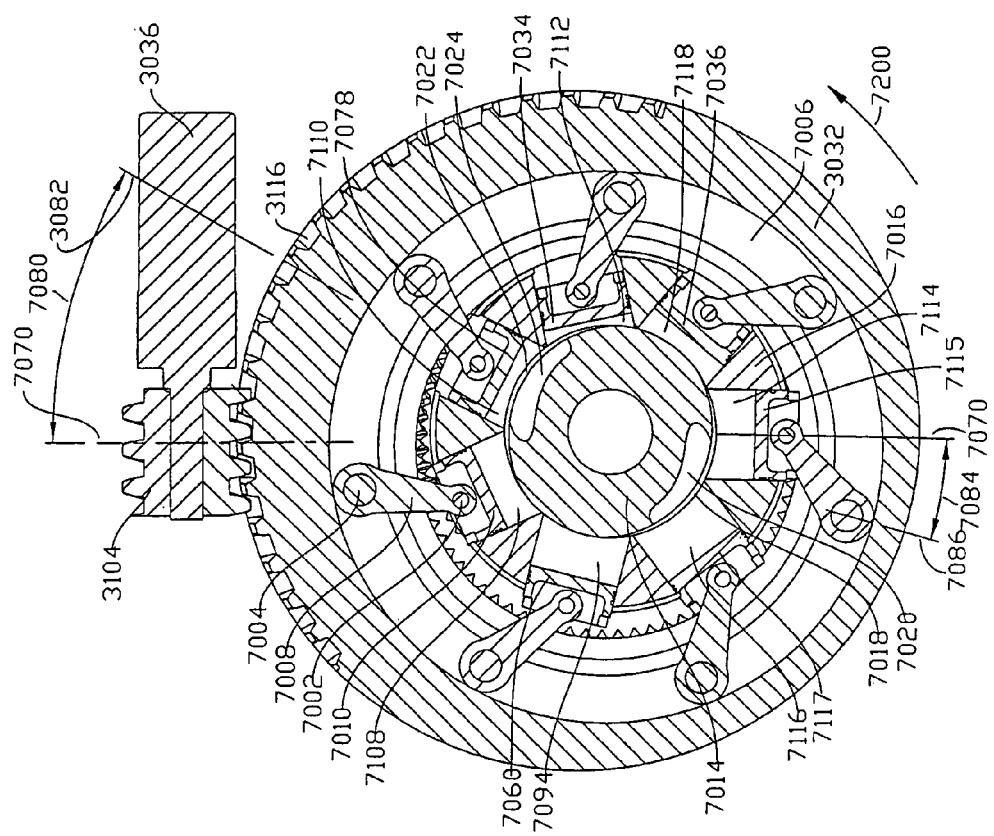
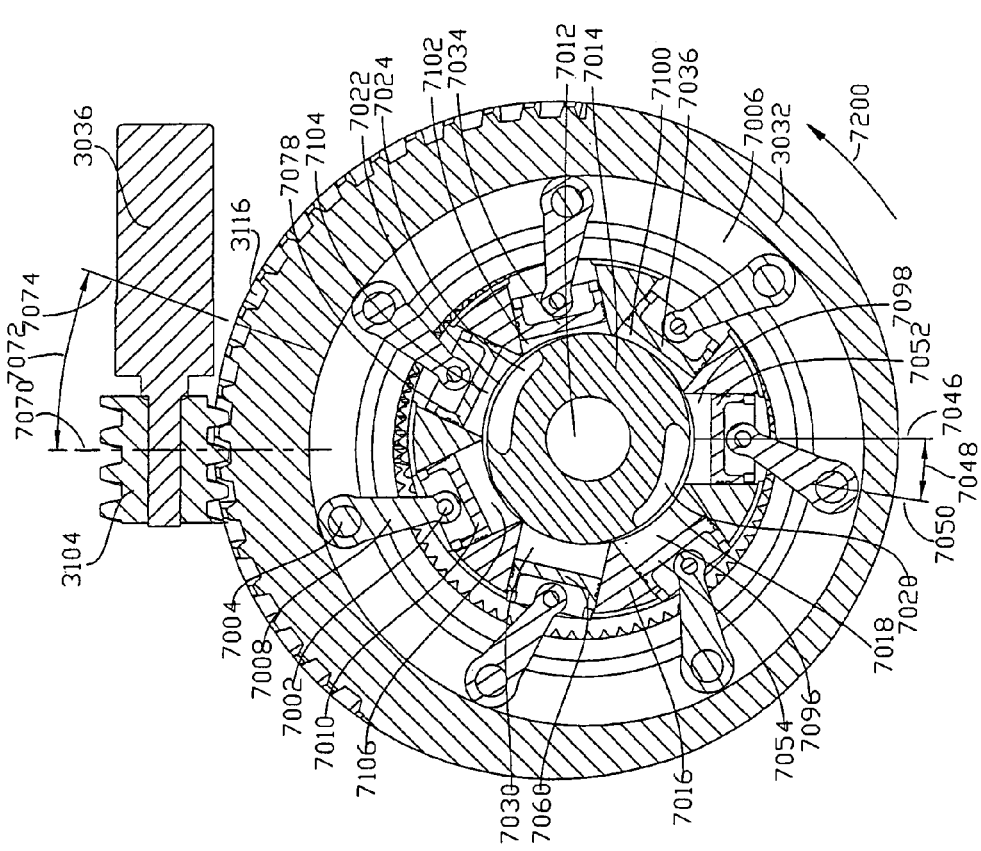

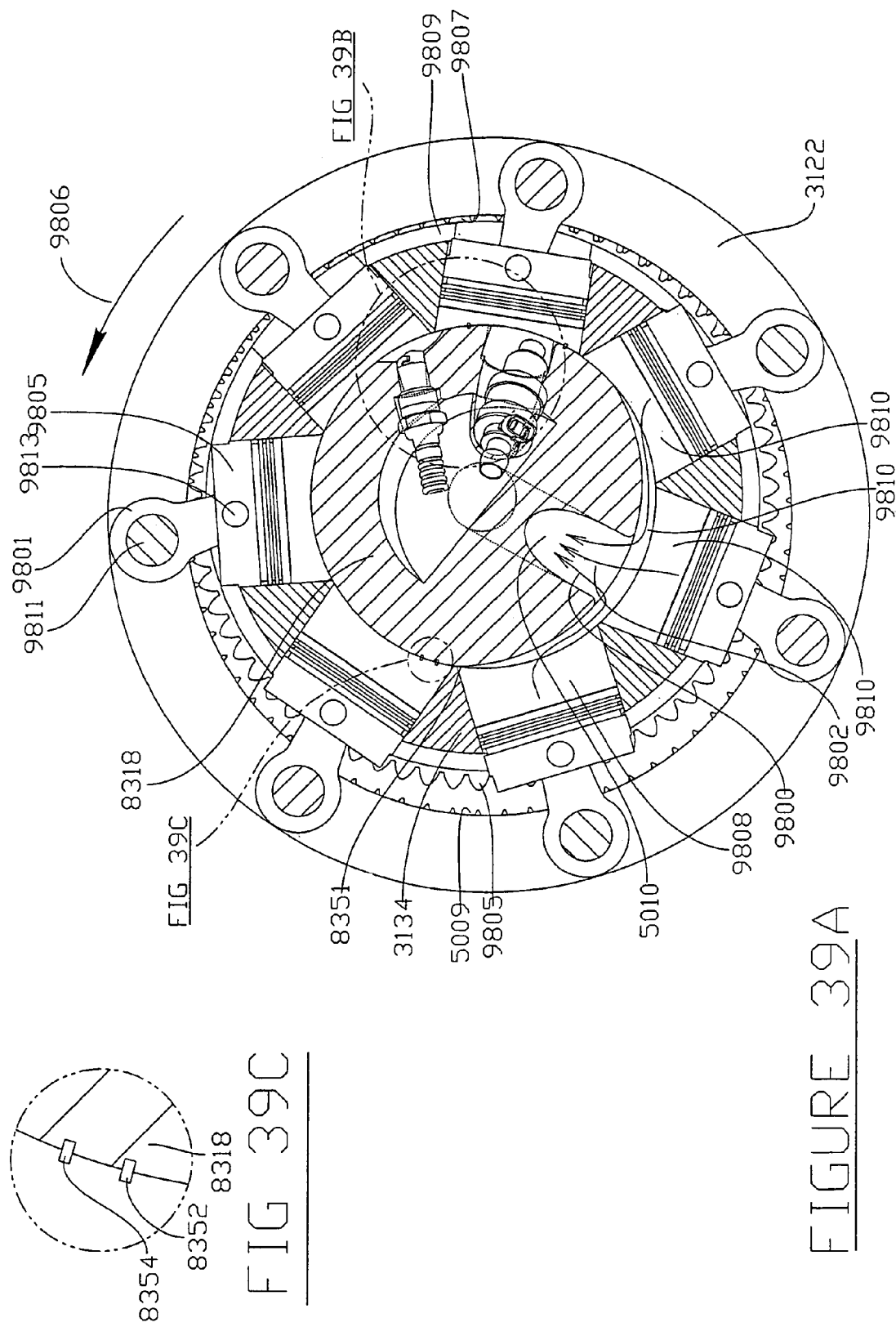

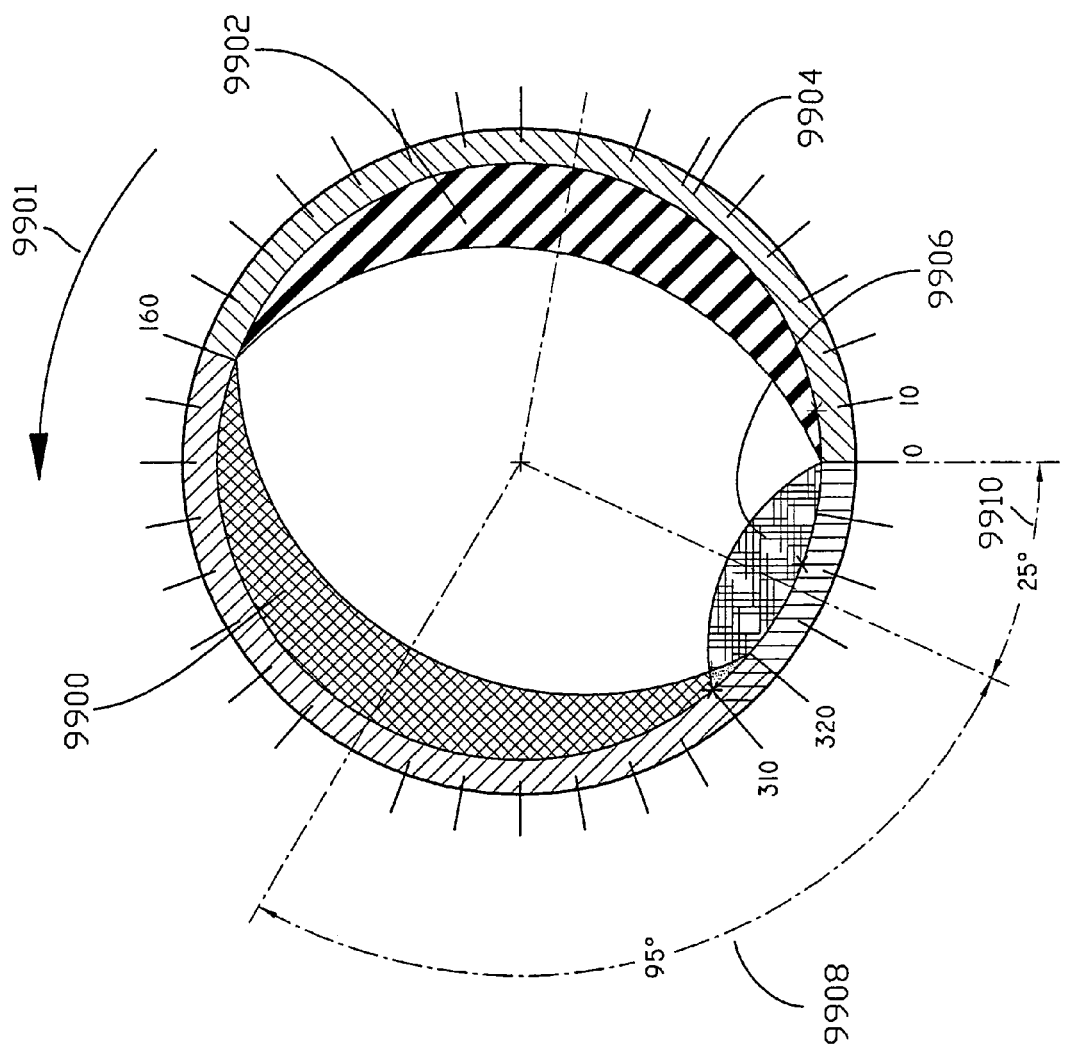

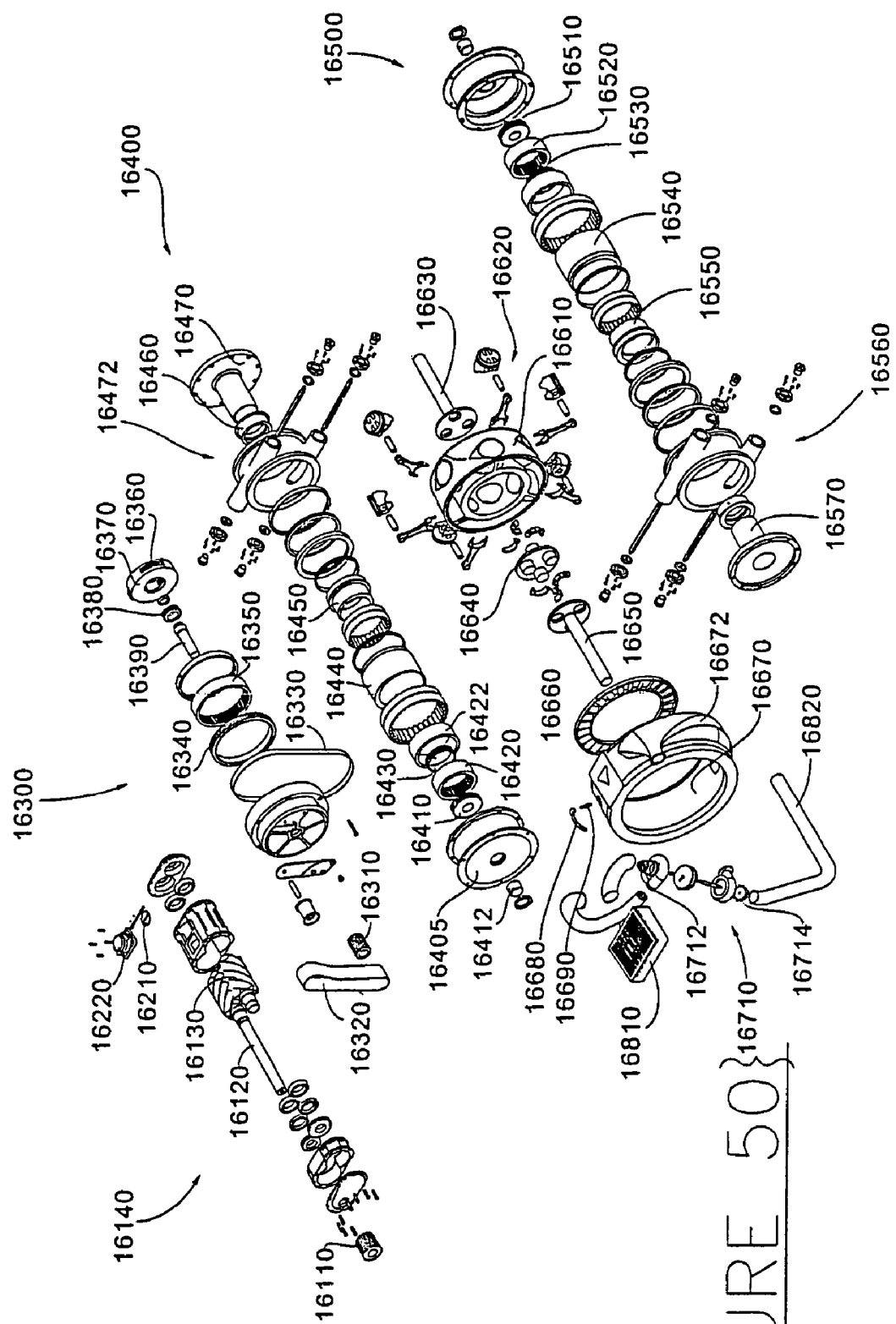

FIGURE 59

| | Raw Material/Source | Max-Min Range | | Barrels per day (BPD) | |
|---|---|---|---|---|---|
| | | | | 200,000 | |
| 1 | Natural Gas | 20.00% | 50.00% | 40000.00 | 100000.00 |
| 2 | Torrified wood chips (Blue Mountains, E. WA) | 25.00% | 20.00% | 50000.00 | 40000.00 |
| 3 | Torrified paper/pulp waste | 5.00% | 2.50% | 10000.00 | 5000.00 |
| 4 | Torrified timber mill sawdust | 2.00% | 1.00% | 4000.00 | 2000.00 |
| 5 | Torrified baled wheat straw | 20.00% | 15.00% | 40000.00 | 30000.00 |
| 6 | Torrified baled Triticale straw | 1.00% | 0.00% | 2000.00 | 0.00 |
| 7 | Animal waste (hog effluent) [Torrified] | 2.50% | 1.00% | 5000.00 | 2000.00 |
| 8 | Animal waste (beef & dairy effluent) [Torrified] | 1.00% | 0.00% | 2000.00 | 0.00 |
| 9 | Beef tallow | 3.00% | 0.00% | 6000.00 | 0.00 |
| 10 | Pork fat | 0.50% | 0.00% | 1000.00 | 0.00 |
| 11 | Bio-mass potato/beet/corn [Torrified] | 5.00% | 2.50% | 10000.00 | 5000.00 |
| 12 | Bio-mass corn/wheat straw ethanol production | 5.00% | 2.50% | 10000.00 | 5000.00 |
| 13 | Ethanol from corn and wheat straw | 10.00% | 5.00% | 20000.00 | 10000.00 |
| | TOTAL = 100% | 100.0% | 100% | 200000.00 | 199000.00 |

METHOD OF PROCESSING WASTE PRODUCT INTO FUEL

CROSS-REFERENCE TO RELATED PATENT APPLICATIONS

This application is a continuation-in-part of U.S. patent application Ser. No. 10/878,491 entitled Combustion Engine, filed Jun. 28, 2004 which claims the benefit under 35 U.S.C. 119(e) of Provisional Patent Application No. 60/545,841, filed Feb. 18, 2004; Provisional Patent Application No. 60/536,770, filed Jan. 15, 2004; and Provisional Patent Application No. 60/483,311, filed Jun. 27, 2003, the disclosures of which are hereby expressly incorporated by reference.

This application also claims the benefit under 35 U.S.C. 119(e) of U.S. Provisional Application No. 60/561,128, filed Apr. 9, 2004. This application is a continuation-in-part of International Application PCT/US03/17643, filed on Jun. 3, 2003, which claims the benefit of 60/385,710, filed Jun. 3, 2002; 60/388,067, filed Jun. 10, 2002; 60/391,702, filed Jun. 24, 2002; 60/411,138, filed Sep. 16, 2002; 60/422,949, filed Oct. 30, 2002; 60/424,388, filed Nov. 5, 2002; 60/427,516, filed Nov. 19, 2002; 60/429,644, filed Nov. 25, 2002; 60/433, 526, filed Dec. 13, 2002; and 60/438,546, filed Jan. 7, 2003. All the above applications are herein expressly incorporated by reference in their entirety.

FIELD OF THE INVENTION

The present invention relates to a method of processing waste product into fuel.

BACKGROUND OF THE INVENTION

The present invention relates to a method of processing organic waste product into a bio-fuel. The invention also relates to manufacture of an apparatus intended for use, for example, as the primary drive in any suitable vehicle, tractor, truck or boat. The invention also relates to a method of operation of an apparatus commonly known as an engine and most particularly, engines requiring fuel supply including gasoline (fossil fuel) and alternatively vegetable or biomass derived fuel burning engines. Existing engines in this field are most predominantly employed, as the installed drive means in personnel and goods transport vehicles. A purpose of this invention is to provide a more compact, lighter and more powerful engine with significantly improved fuel efficiency with the intent to enable easy replacement of the more complex and costly existing reciprocating gasoline engines presently used in most automotive applications.

Gasoline engines presently installed in automobiles and transport vehicles are inefficient in terms of energy conversion of ambient liquid (or natural gas) fossil fuel to usable energy. Such efficiency can be measured at less or not much more than 25% extraction of available energy from any given quantity of fuel (fossil fuel or otherwise). The present invention discloses an engine that may be capable of greater efficiency, such as significantly greater than 25%, such as 30%-70% efficiency, in terms of conversion of fuel to useable energy upon demand, particularly in vehicles intended for human and goods transport.

The use of fossil fuels is obviously limited by the availability of such natural resources. Costs associated with their mining refining and ultimate use, for simple energy production include losses associated with all aspects of mining and drilling recovery of the crude oils and natural gas, shipping (whether via installed pipeline or other means, which is typically fully dedicated, transport systems), environment deterioration due to oil spills at sea and on land and even wars. These costs are typically not factored into the total fuel costs but clearly they should be.

It is a purpose of this present invention to facilitate the most efficient use of fossil fuels, enable their dilution and assist in the ultimate displacement by renewable fuels such as vegetable or biomass derived fuels including hydrogen, ethanol and methanol. It is also intended that an engine formed in accordance with the present invention will be capable of operation using fuels that may, in the future, be produced from biomass sources with small fuel production facilities operated by farmers and/or present day, regional fuel distributors, close to the point of use, as opposed to the typically massive, centralized, crude oil (petroleum) refining and distilling plants.

Other interesting vehicles are now available such as the so called "hybrid" cars which have been developed to enable improved efficiencies in automobile operation. However, such new vehicles are not as efficient as they should be and typically consume fossil fuels by conversion to an electrical associated energy state. This method of energy conversion involves storage in a battery or as may otherwise be described, by chemical reaction in a batteries which contain environmentally hazardous acids. The chemical reaction in a battery is subsequently reversed to produce electricity which in turn is converted via electric motor means, to usable energy required to drive the hybrid vehicle. This approach may be more efficient than other gasoline consuming vehicles but it must be noted that each time the captured energy is converted into a different form, unavoidable inefficiencies result in unrecoverable energy loss. A purpose of this invention is to enable a direct and efficient conversion of the fuel energy source to a usable energy condition (i.e. a drive means) such as the means of driving a vehicle with reduced inefficiencies. In particular, the present invention enables conversion of a suitable fuel to a mechanical driving force, as required to power vehicle drive wheels, in the most direct and efficient manner.

It is a further purpose of this invention to enable manufacture of an engine that is simpler and less costly to produce, when compared to the presently and most commonly used internal combustion engine arrangement while still allowing ease of engine manufacture within the existing automotive manufacturing infrastructure. Even though the inevitable barrier of "control" by large automobile manufacturers operating in concert with large oil companies must be overcome, the benefits to society that may be available to society with an engine formed in accordance with the present invention should prevail.

Attempts to improve efficiency of fuel consumption in gasoline engines have been made and several inventions are disclosed in patents. Examples of engines, designed for the purpose of improved fuel consumption efficiency, are disclosed in the following U.S. Pat. No. 4,336,686, Inventor: Porter, K. W., Title: Constant Volume, Continuous External Combustion Rotary Engine With Piston Compressor And Expander; and U.S. Pat. No. 6,279,550, Inventor: Bryant, Clyde C., and Title: Internal Combustion Engine.

Methods associated with the torrefaction of wood is disclosed in the following U.S. Pat. No. 4,553,978, Nov. 19, 1985; entitled "Process for Converting ligneous matter of vegetable origin by torrefaction and product obtained thereby". Inventor Yvan; Schwob (Paris, FR); U.S. Pat. No. 4,787,917, Nov. 29, 1988; entitled "Methods for producing torrefied wood, product obtained thereby, and application to the production of energy". Inventor: Leclerc de Bussy;

Jacques (Bussy, FR); and U.S. Pat. No. 4,954,620, Sep. 4, 1990; entitled "Thermocondensed lignocellulose material, and a method and an oven for obtaining it"; Inventor; Bourgeois; Jean-Paul (Creteil, FR).

The subject matter of the above patents is hereby expressly incorporated by reference for all purposes.

SUMMARY OF THE INVENTION

The present invention includes a method of processing organic waste products into fuel and includes homogenizing the waste products. The waste products are heated and pressurized. Water is removed from the waste products. Selected constituent of the waste products are separated from the waste products into a waste stream. The waste stream is blended with a fuel to form a bio-fuel mixture.

The fuel may be transferred into a gasification vessel and converted to carbon monoxide (CO) and hydrogen (H2) gases and then converted to a diesel fuel in a Fischer-Tropsch (F-T) process.

Another embodiment of the present invention comprises an efficient and dimensionally compact revolving and rotary piston engine having a generally cylindrical external profile with a centrally disposed drive. A pair of central rotors or series of rotors having radial disposed cylinders are mounted to a relatively fixed drive. Pistons mate with corresponding cylinders and are attached to piston rods via suitable pins at a first end (small end) of the piston rods. The second ends of the piston rods (big ends) are attached by a pivoting pin to an outer ring. The "outer ring" encloses the pistons with rods attached thereto and the centrally disposed rotor. A variable capacity feature is enabled by an adjusting mechanism that allows the efficient conversion of a wide range of suitable fuels to energy as required in low speed, high torque or high speed, low torque conditions.

An engine formed in accordance with the present invention may be provided with any suitable method for temperature control and most preferably, be cooled by forced air and/or water, or suitable fluid medium enabling temperature control (TC), recirculation within an enclosed loop comprising a series of pressurized pipes with an integrated pumping means and heat exchanging means, such as a radiator. Such radiator may be provided with a suitable fan to force air, as required, with thermostatic water and air flow control arranged to maintain heat exchange across the radiator surfaces, thereby controlling temperature of the medium transferred through the radiator. In this configuration, ambient air may be in contact with the outer surfaces of the heat exchanger. With an engine formed in accordance with the present invention having a forced air cooling arrangement to control engine temperature, internal passages in the engine may be connected via a series of forced air inlet and outlet ducts to provide internal engine cooling as is well known in the art. Alternatively, other cooling means may be applied as should be apparent to those skilled in the art.

Furthermore, an engine formed in accordance with the present invention is designed to control the speed of a vehicle, not merely provide a means of forward or reverse drive. An engine formed in accordance with the present invention is arranged such that when the driven vehicle is braking or coasting down a hill the driving force provided by the engine combustion rotor is reduced and the stroke of the engine compressor rotor may be increased, thereby offering a controlled and adjustable resistance to the forward motion of the vehicle. This provides an inhibiting factor to the vehicle's forward motion which may be controlled to provide a steady speed, for example down a hill, or alternatively, causing the vehicle to slow and ultimately stop as may be required. The "resistance" or opposition provided by the engine's compressor rotor (and combustion rotor), to the forward movement of the subject vehicle is adjustable to a maximum degree beyond which standard vehicle disc or drum braking systems can be provided to stop the vehicle in any normal extreme or emergency. However, in most instances the forward acceleration, braking or reverse movement of the subject vehicle can be controlled completely by the engine and in such a manner that enables compressed air, created by the braking action, to be generated and conveniently stored in a suitable pressure vessel. Such stored compressed air can then be used as required to drive the vehicle in a selected direction which may be to assist the engine combustion rotor in providing drive to the vehicle in an uphill direction or perhaps during acceleration. In this manner, the efficiency of the vehicle is enhanced substantially. This and other aspects of An engine formed in accordance with the present invention are disclosed in further detail below.

It should be noted that while, in FIG. 1, an arrangement including an engine formed in accordance with the present invention is depicted having a combustion rotor component and a compressor rotor component, coupled to one another via a first differential is shown, the centrally disposed differential can be similarly arranged with any type of engines. For instance, a pair of suitable internal combustion engines (ICEs) may be coupled connected via the first differential in place of the illustrated engine's combustion rotor and compressor rotor. In this way the ICEs' would be diametrically opposite each other with each drive shaft therefore rotating in opposing directions and connected to the first differential at opposing (first and second) inputs. The third differential output/input drive would therefore rotate only when the ICEs' engine speed, rotating in opposite directions, are at different speeds. Any suitable pair of engines, motors, driving means or alternatively any motor, engine or driving means with a correspondingly suitable and matching compressor can be arranged with a differential interposed between them in such a manner that the combination can drive a vehicle, boat, aircraft or any other mechanism, requiring a driving means, to provide a variable drive but without the inefficiencies attendant with typical oil operated torque converters or vehicle automatic transmission arrangements.

Additionally, even when a vehicle having an engine formed in accordance with the present invention is stationary, at for example traffic lights, the idling engine is driving the compressor rotor and thereby enabling the storing of energy in the form of compressed air which is surplus to the engine's operational compressed air requirements.

The engine can be started by driving the combustion rotor with the compressor rotor which in turn is driven by a suitable and adequate amount of compressed air stored in one of the engine's systems pressure vessels. The engine CPU management system can further be arranged to auto-start and ensure that the quantity and pressure of compressed air in storage, is sufficient to start the combustion rotor when required. The CPU can be programmed to instruct the owner or vehicle driver via a suitable screen, monitor display or even verbally via suitable speakers installed for the purpose, any conditions that may be critical to engine's operation. For example if the oil, fuel or water levels are approaching a critically low level, the CPU can provide the owner with advice accordingly, via a screen or installed speakers.

In another preferred embodiment, individual disc or any other suitable braking system can be installed on the combustion rotor and separately onto the compressor rotor. In this way, for example, during the normal braking process of the subject vehicle, when the compressor rotor is being powered by the inertia or forward movement of the vehicle, the combustion rotor can be prevented from being driven in an undesirable direction of rotation.

In another embodiment, a suitable substitute gasoline engine which could be a selected turbine or reciprocating internal combustion, piston engine or an engine formed in accordance with the present invention can be directly coupled to an electric generator or alternator which in turn is directly connected to an electric drive motor via a first differential. In this arrangement, the connection of the substitute engine to the alternator would be similar to the illustrated engine configuration wherein the compressor rotor would be substituted with an alternator and the combustion rotor of the illustrated engine substituted with an electric motor. In this way said electric motor drive can be arranged with said alternator (or generator) located on the opposing side of a centrally disposed, first differential. This arrangement would enable recovery of energy otherwise lost in the braking process of the subject vehicle. Electrical power can be generated by providing a resistance to the forward movement of the vehicle thereby slowing the vehicle while generating electrical power which can be stored in a suitable battery and used to power the vehicle, start the substitute or illustrated engine or drive any other electric motors associated with the subject vehicle.

Any suitable Ground Positioning System (GPS) information, that is available for such purposes, can be used to enable the vehicle location to be determined and such information can then be made available to the driver of the vehicle or the information can transmitted, by radio, to other interested parties, such as for safety purposes. Any faults which can be determined by an automated diagnostic device such as a computer adapted for the purpose of diagnosing engine faults or malfunctions, associated with the subject vehicle and/or illustrated engine, can also be communicated by transmission to an interested party (such as the vehicle manufacturer or it's representative) to enable a suitable response and/or recovery of the vehicle.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A and 6B show an exploded three dimensional view of the E-VVORP engine as shown assembled in FIGS. 1 through 5.

FIG. 7 is intentionally omitted.
FIG. 8 is intentionally omitted.
FIG. 9 is intentionally omitted.

FIG. 11 is intentionally omitted.

FIG. 16 is intentionally omitted.

FIG. 26 shows a typical assembly of a piston with piston rings and a pin connecting the piston to a connecting rod.

FIG. 29 shows two cross sectional views, FIGS. 9A and 29B through the X-X section shown in FIG. 27, of the combustion component of the E-VVORP engine.

FIG. 30 shows two cross sectional views, FIGS. 30A and 30B, through the Y-Y section shown in FIG. 27, of the compressor component of the E-VVORP engine.

FIG. 31 shows two cross sectional views, FIG. 31A and FIG. 31B, through the Y-Y section shown in FIG. 27, of the compressor component of the E-VVORP engine.

FIG. 40 shows a timing chart of the fuel and air mixture inlet, combustion and exhaust cycle of the two stroke E-VVORP engine.

FIGS. 43-49 are intentionally omitted.

FIG. 50 shows an exploded view of an alternate embodiment of a combustion engine formed in accordance with the present invention.

FIG. 54 is intentionally omitted.

FIG. 59 is a chart showing a list of 13 source raw materials used in the production of distillate and other fuel in a gasification and Fisher Tropsch plant.

DETAILED DESCRIPTION OF THE PREFERRED EMBODIMENTS

Figure 1:
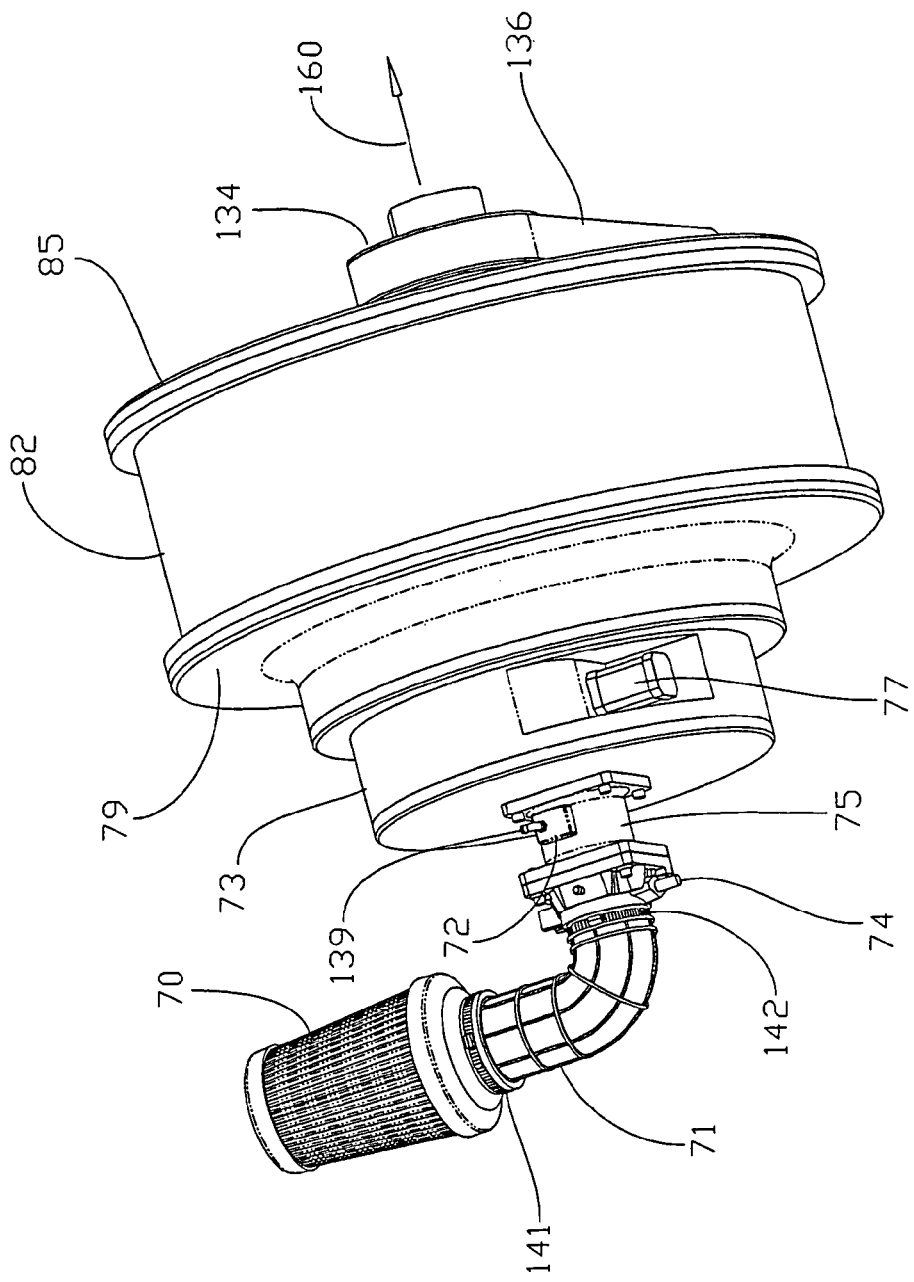
FIG. 1 is a 3-D view of one embodiment of an engine formed in accordance with the present invention.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

As used herein, the following terms take the following meaning, unless otherwise indicated.

The term "E-VVORP" or "E-VVORP engine" is an acronym of Electronic Valve-less Variable Output Rotary Piston engine and refers to one embodiment of an engine formed in accordance with the present invention as disclosed in this disclosure.

The term "blending" refers to a the process of continuous, static and/or enclosed fuel blending in a device suitable for such blending that can be used to continuously blend suitable fuels such as, without limitation thereto, those described and/or listed below.

The terms "gas," "liquid," "solid," and "oil," (or the plural there of any) may refer to the condition or physical state of fuel(s) various suitable fuel(s) at ambient temperature and pressure.

The term "fluid" may refer to any gas, liquid, solution, or suspension, such as any fuel.

The terms "suitable fuel," "suitable gas", "renewable fuel" or "suitable liquid fuel" can refer to any fluidized fuel such as a blend of natural gas or gasses or any other selected gas at ambient conditions, liquid or solid suspension in liquid, or selected blend thereof in any suitable relative proportions with a suitable measured quantity of air, oxygen or combustion enhancing matter such as nitrous oxide, provided at any pressure (suitable pressure) or at ambient pressure or any other pressure.

Renewable fuel can be any fluid fuel such as methanol or ethanol derived from corn, wheat, potato or other similar or entirely different fuel, which can be extracted from a vegetable source or any biomass source such as the entrails of animals killed for human consumption and any waste products such as human and/or animal effluent.

The terms "suitable fuel," "suitable gas" or "suitable liquid fuel" can refer to any gas, liquid or solid suspension in liquid, or selected blend thereof in any suitable relative proportions with a suitable measured quantity of air, oxygen or combustion enhancing matter such as nitrous oxide, provided at any pressure (suitable pressure) or at ambient pressure.

The term "fuel" means any suitable fuel for use in the E-VVORP engine and may be any of the following or any combination thereof in any suitable relative ratio: any suitable fuel may be used to drive the E-VVORP engine, the details of a few suitable fuels are disclosed herein. Any fuel, selected for it's suitable combustion properties may be used such as any suitable gas, at ambient temperature and pressure, including but without limitation to propane, methane, pentane, butane, acetylene, hydrogen sulfide, carbon monoxide or hydrogen gas. Additionally, any suitable liquid fuel, at ambient temperature and pressure, such as gasoline (petrol), diesel, kerosene (paraffin), alcohol, any animal fats or proteins, raw vegetable fats and/or any suitable oils having been suitably processed or refined, if so required, or any selected blend, in any suitable relative proportions thereof, are suitable for use with the present invention. Pulverized coal dust blended and suspended in air to create a suspension of coal dust and air of suitable relative proportions may be suitable for use in the present invention. Pulverized solids such as sulfur, black coal (anthracite), and/or brown coal (lignite), wood and grassy substances any suitable metal nitrates (such as sodium nitrate), nitrites or oxygen yielding metal salts, crushed and blended with a suitable liquid carrier, such as kerosene or suitable oils, combined together to provide a liquid suspension of the selected solid and/or coal in kerosene (or diesel), may also be suitable for use with the present invention.

The term "piston" may mean the cylindrically profiled member attached to an end of a connecting rod.

The term "piston rings", commonly known by this descriptive name, can mean the sealing and scraping, oil and gas sealing rings frequently installed, in suitably machined slots, typically extending close to and around the outer circumference of any typical engine piston. Piston rings may be lubricated with any suitable material such as oils, water, powders such as graphite or any other suitable materials including compounds or elements in any phase (solid, liquid or gaseous). The piston ring lubricating materials may also be used as a heat exchange medium to enable temperature control of the piston rings or component(s) with which they may be associated. The piston rings or piston ring segments (i.e., a segment of a circular or otherwise profiled piston ring) may also be arranged in any configuration, including other than circular, as may be required to suit any particular application and/or use. Piston rings can be cast, surface treated with any suitable surface treatment, hardened, machined, center ground, polished and treated in any selected process so as to enhance sealing efficiency (for example between the subject piston, piston ring and cylinder bore) and minimize friction which could otherwise cause undesirable inefficiencies.

The term "connecting rod" refers to the connecting member attaching the piston at a first end and a crank ring at a second end, wherein both ends of the connecting rod have pivots.

The term "combustion chamber" refers to the confined space at the closed end of a cylinder between the upper surface of a piston within the cylinder and the under surface of the respective cylinder head wherein at least fuel and air has been compressed and ignited by suitable ignition means such as a spark plug, which are commonly used in automotive reciprocating piston gasoline engines.

The term "housing" can mean an outer (or inner) cover with which the mechanical or electrical contents are associated and attached to by bearing surfaces. The housing may also serve as a vessel for collection and retention of lubricating oils, greases and/or water for cooling and/or lubrication purposes. Any suitable channels, conduits, tubes and/or pathways may be machined, molded or cast (by any method such as lost wax casting methods and/or cope and drag gravity sand molding) in the housing. The housing may be fabricated, cast or manufactured by welding any suitable metals together, to produce any suitably profiled weldment to suit all needs, or with use of any other suitable material.

The term "air compressor" can be a device or means such as an exhaust driven turbo charger, piston air compressor, screw compressor or Rootes blower (see website for details of a Rootes blower: http://wwwjimbonet.fsnet.co.uk/blowing-.html) or similar mechanically driven, impeller style blower when installed appropriately to enable compression of ambient filtered or otherwise treated air and transfer thereof into each combustion chamber of the engine as required, with the selected fuel. Additionally, any suitable combustion enhancing additives, as may be selected for such properties, including oxygen gas and/or nitrous oxide may be mixed with the selected fuel(s) according to requirements.

Examples of fuel or blends thereof are provided, but are not restricted to any of the following:

1. A blend of fuel gases including, carbon monoxide, propane, kerosene and a quantity of oxygen that does not exceed 50%.
2. Air that has been filtered to remove substantially all contaminants therefrom.
3. Gasoline and air in any relative proportions and physical conditions such as gasoline vapor and compressed air.
4. Oxygen and propane where oxygen does not exceed 50% and is not 20% of the gas by volume.
5. Methane and a quantity of oxygen that does not exceed 50% and is not less than 5%.
6. Hydrogen and a quantity of oxygen that does not exceed 60% and is not less than 5%.
7. A selected amount of hydrogen and a selected quantity of compressed air.
8. A blend of fuel gasses and or vapor's and a quantity of oxygen that does not exceed 50% and is not less than 5%.
9. Any suitable, selected, proportional blend of atomized diesel and compressed air.
10. A blend of vaporized or atomized diesel, pentane and oxygen in any relative proportions wherein the quantity of oxygen that does not exceed 60% and is not less than 5% by volume.
11. A blend of butane and hydrogen in any relative proportions and a quantity of oxygen that does not exceed 60% and is not less than 2%.
12. A blend of a gasoline and air in any relative proportions wherein the quantity of oxygen does not exceed 20% and is not less than 5%.
13. A blend of methane and diesel in any relative proportions wherein the quantity of oxygen that does not exceed 50% and is not less than 5%.
14. Any selected blend of methanol and compressed or ambient pressure air, in any suitable proportions.
15. A blend of hydrogen sulfide and air in any relative proportions and a quantity of gasoline that does not exceed 10% and is not less than 1% of the blend by volume.
16. A blend of carbon monoxide and air in any relative proportions and a quantity of hydrogen that does not exceed 50% and is not less than 1%.
17. A blend of pulverized anthracite and diesel in any relative proportions and a quantity of air that does not exceed 98% and is not less than 40% of the total volume of fuel and air.
18. A gas blend including more or less than 60% hydrogen and more or less than 40% oxygen.
19. Any selected blend of vaporized, atomized or gaseous fuels, of any suitable type, with at least sufficient air and/or added or increased levels of oxygen and/or nitrous oxide to enable efficient combustion (which may be complete or almost complete combustion of the fuel or fuels) of the selected blend of fuel or fuels.
20. Any suitable fuel such as ethanol or methanol, produced from a biomass source which may be produced regionally such as by farmers for their own and local use (see www.bioproducts-bioenergy.gov/).
21. Any selected aviation fuel and any combination of aviation fuels.
22. Kerosene, paraffin, or any heavy oil such as creosote or any combination thereof.
23. Any suitable blend of fuels and air or oxygen which can be provided in any suitable pressure, temperature or phase (solid, liquid or gas) condition and as required. For example enriched oxygen/air may be produced by compressing air and then removing a nitrogen component of the air in separating process in a centrifuge arrangement attached to an E-VVORP engine rotor.
24. Any suitable blend of substantially dehydrated or fluid animal waste products such as a mixture of offal, intestines and fat which can be pulverized heated and blended with sufficient fat to produce a pump able paste, suspension or liquid. The suitably processed and dehydrated animal waste can then be blended with sufficient oxygen to enable combustion. The oxygen may be obtained from atmospheric air by separating in a membrane separation process such as can be provided by BOC Gases. The membrane air separation process can be arranged to enrich the oxygen content of air by removing other atmospheric gases such as nitrogen. Oxygen may also be produced by separation from air in an Air Separating Unit (ASU) which compresses atmospheric air into liquid (fluid) phase and then allows the liquid air to stratify in a separation column; this process using an ASU can be more thoroughly understood by accessing information available from BOC Gases on their website at www.boc.com.

The term "exhaust" or "exhaust gas" can refer to the spent fuel, waste products and/or waste gases which may include a blend of soot (carbon), carbon dioxide, carbon monoxide, hydrogen sulfide, nitrogen, partially combusted oils and fuels, a relatively small component of oxygen and/or other oxides with residual atmospheric gases in any relative proportions or any other exhausted compounds.

The term "suitable gas pressure," "gas pressure" or "water pressure" refers to any pressure of the referenced medium under the specified pressure that is suitable for the application and may be controlled within selected pressure ranges by measurement with any suitable measuring device such as a pressure transducer which in turn can be interfaced with the E-VVORP engine CPU. Such suitable gas pressure ranges may be within any of the following pressure ranges, or any other suitable pressure:

[Note: PSI means pound per square inch, however any other unit of pressure are also included]:
  gas at a pressure of 0 PSI to 1 PSI.
  gas at a pressure of 1 PSI to 14 PSI.
  gas at a pressure of up to 1000 PSI
  gas at a pressure of 1000 PSI to 10,000 PSI
  gas at a pressure of 10,000 PSI to 30,000 PSI.
  gas at a pressure of 30,000 PSI to 50,000 PSI.
  gas at a pressure of 50,000 PSI to 70,000 PSI.
  gas at a pressure of 70,000 PSI to 80,000 PSI.
  gas at a pressure of 80,000 PSI to 100,000 PSI
  gas at a pressure above 100,000 PSI
  The term suitable water pressure:
  water at a pressure of 1 PSI to 14 PSI.
  water at a pressure of up to 13 PSI.
  water at a pressure of 13 PSI to 50 PSI.
  water at a pressure of 50 PSI to 80 PSI.
  water at a pressure of 80 PSI to 120 PSI.
  water at a pressure of 120 PSI to 200 PSI.
  water at a pressure of 200 PSI to 500 PSI.
  water at a pressure of 500 PSI. to 800 PSI
  water at a pressure above 800 PSI.

The term suitable steam pressure at any suitable temperature:
  steam at a pressure of 1 PSI to 14 PSI.
  steam at a pressure of up to 13 PSI.
  steam at a pressure of 13 PSI to 50 PSI.
  steam at a pressure of 50 PSI to 80 PSI.
  steam at a pressure of 80 PSI to 120 PSI.
  steam at a pressure of 120 PSI to 200 PSI.
  steam at a pressure of 200 PSI to 500 PSI.
  steam at a pressure of 500 PSI. to 800 PSI
  steam at a pressure above 800 PSI The term "suitable super-heated steam" can mean steam at any temperature but most particularly at an elevated suitable temperature and suitable pressure.

The term "suitable oil pressure," "suitable fuel pressure" or "fuel pressure" refers to any pressure that is suitable for the application and may be controlled within any of the following pressure ranges by measurement with any suitable measuring device such as a pressure transducer which in turn can be interfaced with the E-VVORP engine CPU in a way that will enable control of any selected pressure or pressure range to be maintained as may be required for the efficient operation of the E-VVORP engine.

Such pressure ranges may be as follows or at any other suitable pressure:
  Oil or fuel at a pressure of 1 PSI to 14 PSI.
  Oil or fuel at a pressure of up to 13 PSI.
  Oil or fuel at a pressure of 13 PSI to 50 PSI.
  Oil or fuel at a pressure of 50 PSI to 80 PSI.
  Oil or fuel at a pressure of 80 PSI to 120 PSI.
  Oil or fuel at a pressure of 120 PSI to 200 PSI.
  Oil or fuel at a pressure of 200 PSI to 500 PSI.
  Oil or fuel at a pressure of 500 PSI. to 800 PSI
  Oil or fuel at a pressure of 800 PSI. to 1,000 PSI
  Oil or fuel at a pressure of 1000 PSI. to 1,500 PSI
  Oil or fuel at a pressure of 1,500 PSI. to 2,000 PSI
  Oil or fuel at a pressure of 2,000 PSI. to 2,500 PSI
  Oil or fuel at a pressure of 2,500 PSI. to 3,500 PSI
  Oil or fuel at a pressure above 3,500 PSI The term "suitable temperature," "suitable gas temperature", "suitable water temperature", "suitable steam temperature" or "suitable super-heated steam temperature" refers to any temperature that is suitable for the application and may be controlled within any suitable temperature range or ranges for any suitable period of time, or at any other suitable temperature within or outside the E-VVORP engine assembly. Any suitable temperature may be any selected temperature range. The E-VVORP engine temperature may be controlled by cooling or heating, most preferably by heat exchange between selected mediums such as with water or any suitable oil, glycol, CFC, HCFC, ammonia, liquid or compressed nitrogen, liquid or compressed carbon dioxide (cryogenic) or any combination of selected mediums. Most preferably any E-VVORP engine excess heat may be controlled by direct contact and heat exchange with any suitable medium such as any selected oil which can then be transferred to a heat exchanging arrangement, such as in association with a car, what is commonly known as a radiator, wherein water or oil can be cooled by exchanging heat with any other suitable medium including ambient air. The heat exchanging can be controlled by any suitable thermostat, infra red measuring or temperature transducer or any other suitable temperature measuring device which may be interfaced with the E-VVORP engine CPU. The desired temperature of fuel, oil, water, air or gas used in association with the efficient operation of the E-VVORP engine may be controlled by any suitable heat exchanging apparatus within any suitable temperature range such as the following temperature ranges:
  Any temperature below 0° F.
  0° F. to 26° F.
  26° F. to 32° F.
  32° F. to 50° F.
  50° F. to 70° F.
  70° F. to 100° F.
  100° F. to 150° F.
  150° F. to 212° F.
  212° F. to 300° F.
  212° F. to 300° F.
  300° F. to 350° F.
  350° F. to 400° F.
  400° F. to 450° F.
  450° F. to 500° F.
  500° F. to 600° F.
  600° F. to 700° F.
  700° F. to 850° F.
  850° F. to 1000° F.
  1000° F. to 1200° F.
  1200° F. to 1400° F.
  1400° F. to 1600° F.
  1600° F. to 1700° F.
  1700° F. to 1900° F.
  1900° F. to 2200° F.
  any selected temperature above 2200° F.

The term "weld", "welding", "bond", "bonded" or "bonding" refers to a weld, welding, bond or bonding of two or more surfaces together by any suitable means such as with any suitable adhesive, arc welding means, oxy-acetylene welding, RF welding, ultrasonic welding, heat sealing, or any other suitable means of welding two or more components together in a desired manner.

The term "seal" or "sealing" may refer to the sealing of any gas such as exhaust or any liquid such as oil as is, for example, provided by the piston ring member(s) installed around the circumference of a piston, as disclosed herein, in a manner that contacts the surfaces on the inside of a respective engine cylinder. Such piston rings are most suitable for sealing of pistons and similar members wherein the respective components attached to the sealing means move rapidly against each other. Alternatively, "O" ring sealing means may be installed, most preferably, for static sealing.

The term "Valve" refers to any suitable valve to suit the particular needs of the disclosed application. Valves may be arranged, in the E-VVORP engine, to control the flow of gas, vapors, liquid, or solids such as powders, and can be specially manufactured for the particular E-VVORP engine application or may be selected from standard valve assemblies supplied by manufacturers skilled in the arts of valve manufacturing valves such as SMC, Festo, Bosch, Borg-Warner. Any suitable valve may be manufactured from any suitable material(s) such as iron, carbon steel, stainless steel, aluminum, magnesium, titanium and/or any selected alloys.

Valve-less means having no valve (wherein a valve may be a spring loaded poppet valve) are also suitable for use with the present invention.

The term "bearing" or "bearings" may refer to any suitable bearing selected for any suitable purpose and installed in the E-VVORP engine. Such bearing(s) may be ball, roller or needle bearings or "white metal" journal bearings provided with a supply of selected lubricating oils suitable for the particular application.

The term "lubricating oils" or "oils" may refer to any suitable oil of any viscosity, selected for use as a lubricating medium at any suitable temperature and may also be provided as a heat exchanging medium.

Fuel oil may refer to diesel or kerosene or any other suitable fuel oil.

The E-VVORP engine may be manufactured from any suitable materials such as any suitable metals or plastics. Metals may refer to titanium, aluminum, molybdenum, steel, iron, copper, nickel, chromium, stainless steel of any suitable grade or any other suitable metal or blend of metals including those listed herein and/or other suitable metals and/or materials such as ceramics. The metals may be treated by any suitable process, such as Teflon coating or heat treatment to induce any desired property such as hardness malleability, toughness or any other property. The materials may also be plated or laminated to other materials. Plating may be nickel, zinc, copper, silver, gold or any other metal plating which can be by electrolytic or electro-less process. Metals may be surface treated by any suitable process and most particularly as can be provided by the corporation known as General Magnaplate such as Tufram surface treatment (see www.generalmagnaplate.com). General Magnaplate surface treatments may be used in some instances, to eliminate the need for lubricating oils or to inhibit, minimize or prevent corrosion as desired. Such surface treatments may also be provided for the purpose of insulation, wherein for example, a ceramic composition which may be arranged in an amalgamation with the subject member surface, to a specified depth, as can be provided by General Magnaplate.

Any suitable metal or suitable plastic, E-VVORP engine components can be finished with any suitable machined surface finishes as required which may include such finishes provided by lathe turning and/or milling and/or surface grinding, center or center-less grinding, to any surface finish specification and as may be selected for it's suitability for any particular application, selected so as to enable adequate durability, wear, heat insulating properties and/or corrosion resistance.

Suitable metal may refer to any metal such as aluminum steel, iron, copper titanium, vanadium, uranium, depleted uranium, zinc, any alloys or metals comprising a blend of selected suitable metals.

The term "CPU" refers to a Central Processing Unit or any suitable computer processor suitable for the application such as may be contained in a Personal Computer (PC), and used to manage the E-VVORP engine performance and control it's operation so as to maximize efficiency in use.

The term "HHRCD" refers to a hand held remote controlling device such as a PALM PILOT®, an HP (Hewlett-Packard) or Compaq iPAQ "HHRCD" to name a few.

The term "engine speed" can refer to the engine speed in terms of RPM (revolutions per minute of the output drive). Suitable engine speeds for the present invention may be as low as 100 RPM or lower, or as high as 50,000 PM or more.

The term "torque specifications" can refer to the engine torque specifications in inch/pounds or foot/pounds, [such as the intake manifold bolts (fasteners) which, for example, could be set (tightened) to 23-25 ft/lbs with a torque wrench].

The term "engine torque" generally refers to the engine output drive in torque and can be represented in any selected units such as foot/lbs or Newton/meters which may be translatable or converted to other units as required.

The term "CFC" refers to chlorofluorocarbons typically used in refrigeration or air conditioning systems as a suitable medium for heat exchange. Similarly, HCFC refers to another type of medium commonly used as a heat exchanging medium in air conditioning and particularly vehicle air conditioning systems.

The term "4 stroke engine" refers to a mode of operation that is typically applied in reciprocating internal combustion gasoline engines. The "E-VVORP" engine example shown in the attached FIGS. 1 through 11 shows 5 pistons enclosed within 5 corresponding cylinders machined in the centrally disposed engine rotor. Although a specific number of pistons are depicted in various illustrated embodiments, it should be apparent to those skilled in the art that any number of pistons and corresponding cylinders are suitable for use with the present invention, such as 1 cylinder or 10 cylinders or more. Furthermore, the E-VVORP engine can be arranged to operate in, for example, a "two-stroke", "four-stroke", "eight-stroke", "twelve-stroke" mode of engine operation and can be switched from, for example, a 4 stroke mode or operating condition to an "eight-stroke" engine operating sequence for the purpose of improving fuel consumption efficiency during engine operation or alternatively as more output torque energy or conversely drive shaft speed is required.

A "two-stroke" engine operation generally comprises the following steps:

1) Intake stroke and compression stroke;
2) Combustion stroke and exhaust stroke.

The normal operation of a 2 stroke engine is well known and can be seen at the following website: http://science.howstuffworks.com/two-stroke2.htm.

A "4 stroke" engine operation, typically involving approximately two full revolutions of a crank shaft, generally comprises the following phases:

1) Intake stroke/phase;
2) Compression stroke/phase;
3) Combustion stroke/phase;
4) Exhaust stroke/phase.

The normal operation of a 4 stroke engine is well known and can be seen at the following website: http://www.denso.com.au/dw/fuel/tech.pdf.

Each "stroke" typically involves a half rotation of a crankshaft such that a "4 stroke" engine operation involves two complete revolutions of the respective crankshaft. Therefore, an "8 stroke" operation may involve 4 complete revolutions of the respective crankshaft and a "12 stroke", correspondingly, 6 complete revolutions of the respective crankshaft per single firing of fuel mixture in each of the respective cylinder(s).

Figure 39B:
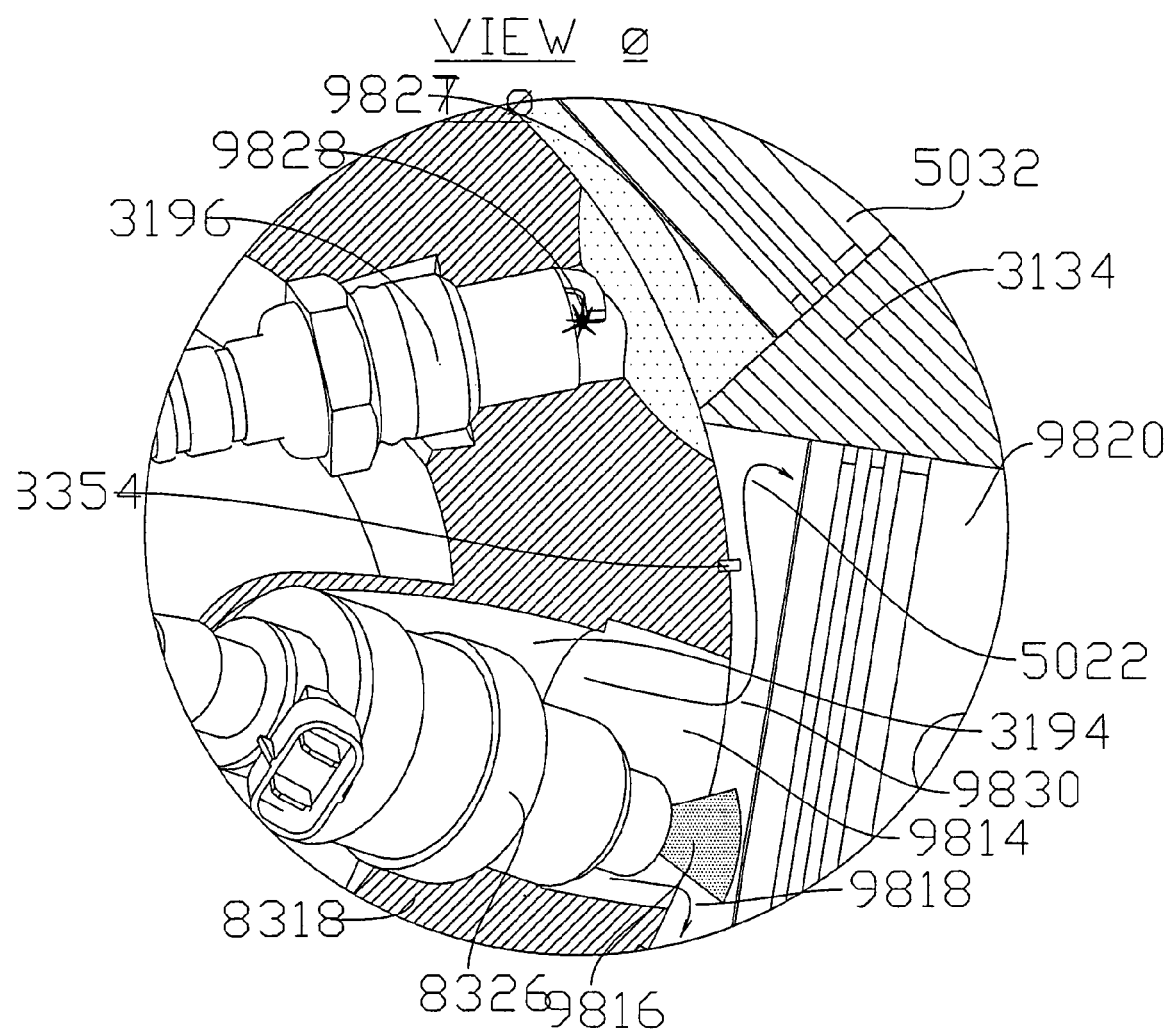
FIG. 39 shows a cross sectional view through the crank ring, piston, combustion rotor and inlet/exhaust manifold of the E-VVORP engine.

In the illustrated embodiments, a "two-stroke" mode of E-VVORP engine operation is depicted, although it is apparent to those skilled in the art that an engine formed in the accordance with the present invention is not limited to 2-stroke operation. A "two-stroke" engine typically has a at least one piston in a suitably sized cylinder connected to a crank shaft via a connecting rod. The "two-stroke" engine operates with a combustion stroke for each revolution of the crankshaft as follows:

1) A first phase (>25%) of an engine crank shaft revolution may comprise the combustion (of the fuel mixture within the combustion chamber such as 9827 in FIG. 39B) phase which is followed by the exhaust phase;
2) A second phase after engine cylinder exhausting sequence is followed by the compression sequence;

The operation of a two stroke engine can be see at the following website: http://science.howstuffworks.com/two-stroke2.htm.

A preferred E-VVORP engine embodiment is shown in FIGS. 17 through 42. The E-VVORP engine configuration shown in FIGS. 17 through 42 comprises 7 pistons with the combustion rotor and 7 pistons with the compressor rotor with corresponding cylinders and connecting rods as shown. However, the E-VVORP engine may be arranged to have any selected number of pistons with corresponding cylinders, such as, as few as one, 10, 14 and up to 20 cylinders or more to name a few.

Any suitable materials may be selected and used to manufacture and construct any E-VVORP engine components such as aluminum, titanium, magnesium, iron, carbon steel, stainless steel, any suitable ceramic materials of any kind and suitable plastics of any kind as may be chosen for any application.

In another preferred embodiment, any compressed gas (which may also be stored in a suitable pressure vessel mounted within the subject vehicle, at a low temperature and suitable pressure, such as 0° F. and at 300 PSI) such as nitrogen, carbon dioxide or "liquid air" can also be used to drive the E-VVORP compressor. A supply of compressed gases which may be either very dense or in liquid form (cryogenic) can be supplied by BOC Gases, Mountain Avenue, New Jersey (www.boc.com). Such gases as cryogenic nitrogen or carbon dioxide can be used for any suitable E-VVORP engine cooling and/or temperature controlling purposes in addition to providing an energy source that is usable by the E-VVORP engine. The cryogenic gases may also be utilized to cool air in the driven vehicle in an air conditioning system suitably arranged to use such a cooling medium as cryogenic gases.

In another embodiment, the E-VVORP engine is also arranged with a braking system that can primarily engage the compressor to slow and even stop the forward movement of the subject vehicle. This enables the collection and storage of energy that would otherwise be lost. The use of the E-VVORP compressor in this manner also significantly reduces the wear on brake shoes and/or brake pads with a corresponding reduction in costs. The energy thereby collected and stored in the form of compressed air (or any selected gas or fluid) can be used, for example, to improve vehicle acceleration while incurring minimal costs. In this instance the compressor has a valve configuration that enables compressed air, having been compressed using a driving force (energy) derived from the braking vehicle, to be stored in the pressure vessels provided for this purpose and as described in further detail below.

Specific details of the E-VVORP engine as shown herein may, in other alternate embodiments, be arranged such that any conduit, pipe or engine component can be enclosed within any suitable insulating material and/or jacketed so as to enable a temperature controlling medium (TCM) to be provided between the jacket and component or conduit. The TCM can then be pumped by any suitable pumping means and re-circulated via a suitable heat exchanger to enable selected temperature controlling of the E-VVORP engine. Suitable temperature measuring devices suitably located with CPU control of thermostat valves can enable consistent temperature control of the EVORP engine as required. The E-VVORP engine can be operated so as to extract energy from any suitable fuel transferred at a controlled rate of flow, to the combustion chamber(s) within the E-VVORP engine, at any suitable temperature and any suitable pressure.

Additionally, the actual size of any E-VVORP engine component, such as the length of an exhaust conduit or the bore diameter of the cylinders can be altered as required. Also, the location of each engine component such as the combustion rotor relative to the compressor rotor can be adjusted as needed.

Referring now to FIG. 1, a 3-D view of one embodiment of engine formed in accordance with the present invention is depicted. For purposes of this detailed description, the engine will be designated as an E-VVORP engine. Air Filter 70 is shown attached to a first end of conduit 71 with a clamp band 141. A second end of conduit 71 is coupled to a throttle mechanism 74 with clamp band 142. The throttle mechanism 74 includes an air intake extension conduit 75 with fuel injector 72 and pressurized fuel supply pipe 139, which collectively comprise air intake and fuel supply. The fuel mixture required to drive the E-VVORP engine is blended within conduit 75, wherein a measured volume of air controlled by throttle mechanism 74 is blended with fuel injected in controlled proportions by injector 72, and controlled by a CPU according to the engine management control system which provides a suitable fuel and air mixture according to demand and energy output requirements. An air compressor (not shown) may be interposed between connecting conduit 75 and the manifold air supply to the engine. Electric motor drive 77 is arranged to enable advancing and retarding of the piston crank ring. Housing 73 encloses planetary gears associated with the advancing and retarding mechanism driven by electric motor 77. Main E-VVORP engine housing 82, having a cylindrical profile with end plates 79 and 85 on each respective side of the outer housing 82, is shown. Power takeoff pulley 134 shows one preferred embodiment of the engine drive, and exhaust exits the E-VVORP engine through the center of drive pulley 134 in the direction shown by arrow 160. Drive belt 136 engages with pulley 134.

Figure 42:
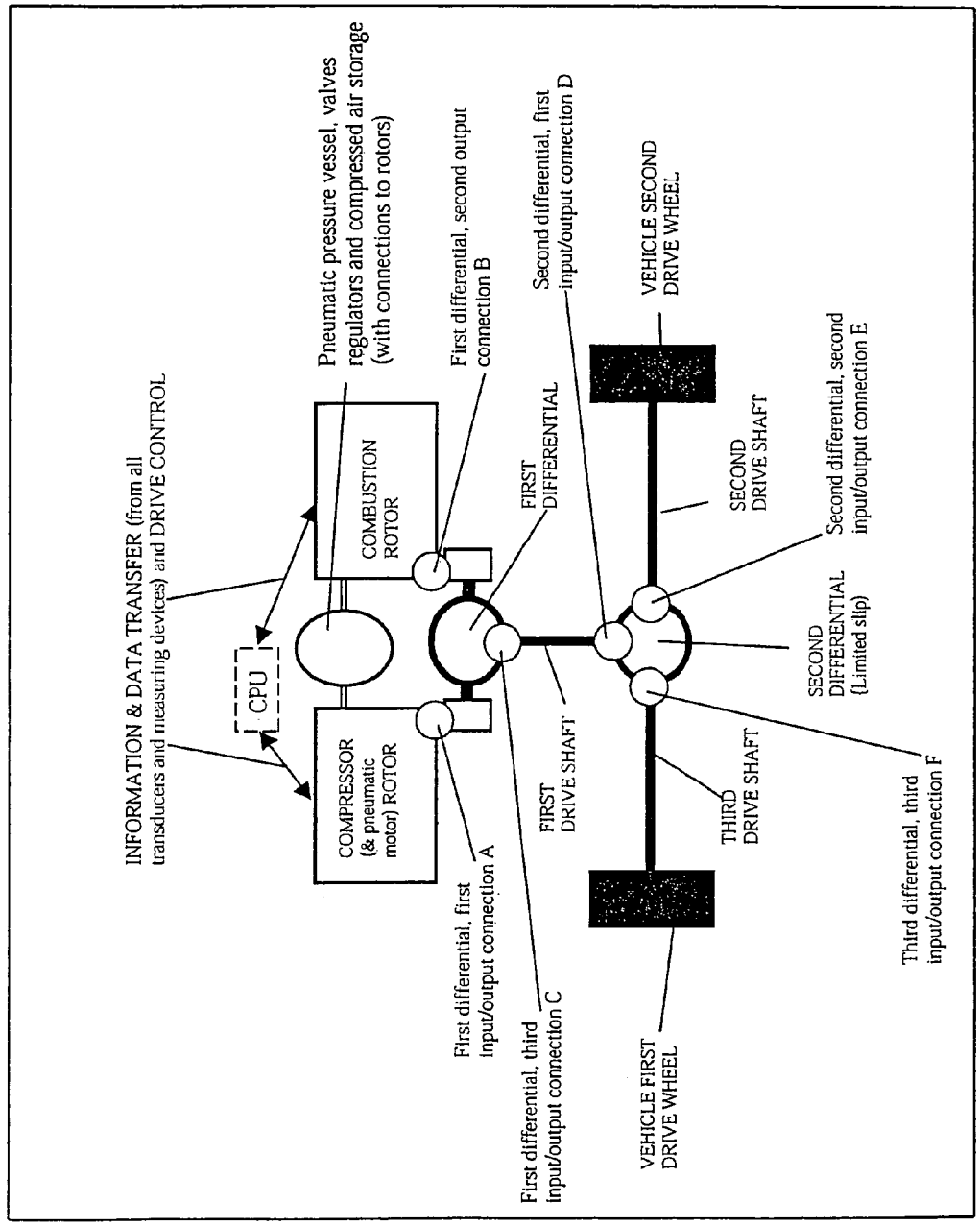
FIG. 42 show a diagrammatic view of an E-VVORP engine and associated drive train of a vehicle formed in accordance with one embodiment of the present invention.

The EVORP engine can provide a driving force to the drive wheels of a vehicle as required as a consequence of a balance of opposing forces. Referring now to FIG. 42, a line diagram shows the relationship between the first and second differentials.

Figure 2:
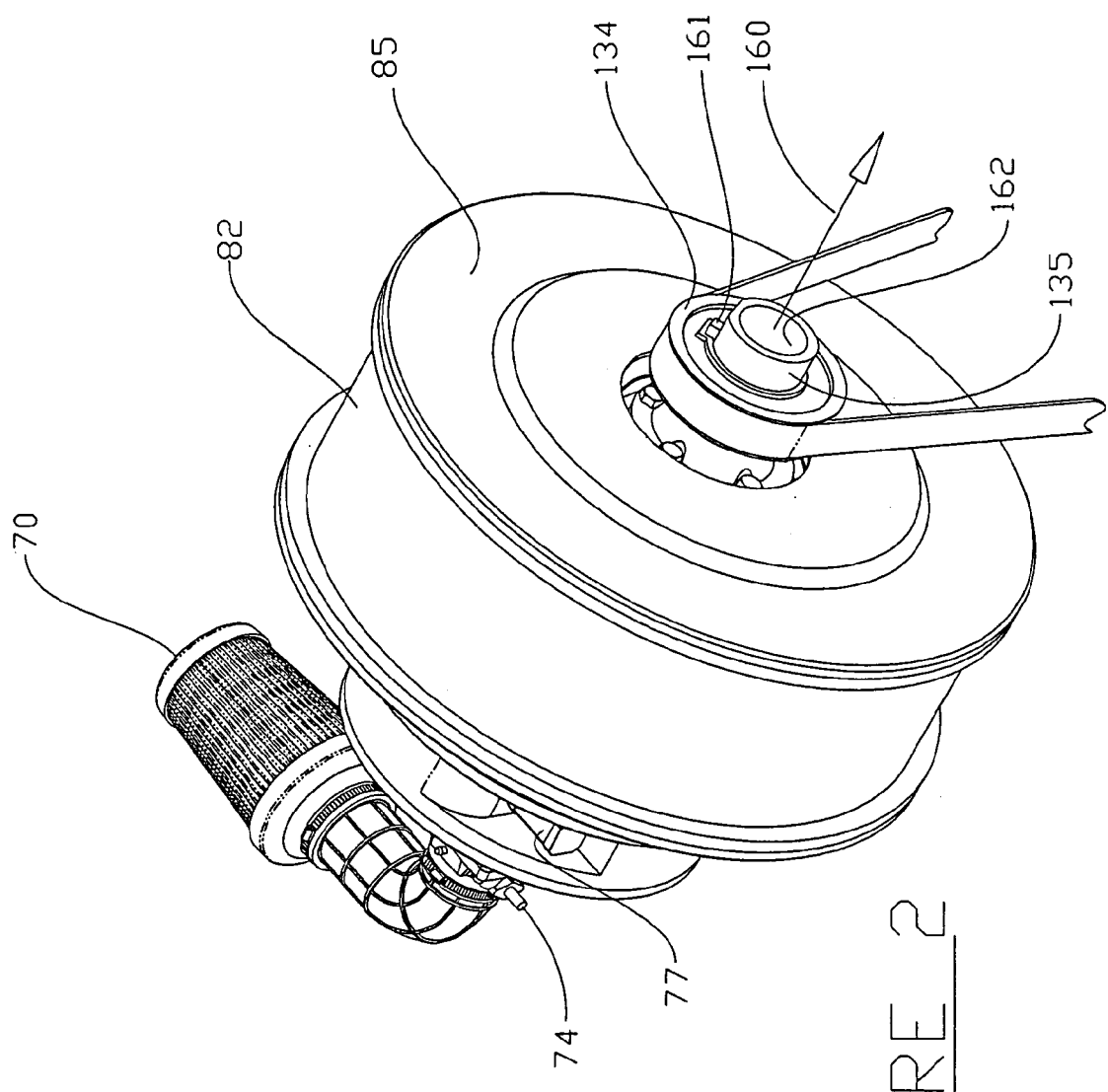
FIG. 2 shows a further 3-D view of the E-VVORP engine with air filter intake connected via a right angle conduit to engine throttle mechanism.

FIG. 2 shows a further 3-D view of the E-VVORP engine with air filter intake 70 connected via a right angle conduit to engine throttle mechanism 74. E-VVORP engine advancing and retarding electric motor drive 77 is shown in the assembly with main E-VVORP engine outer housing 82, and end plate 85 in position. Drive power take off pulley 134 is shown with key 161 securing said pulley 134 to drive 135, with exhaust port 162 passing concentrically through the drive 135. Exhaust is extracted via exhaust port 162 in the direction shown by arrow 160.

Figure 3:
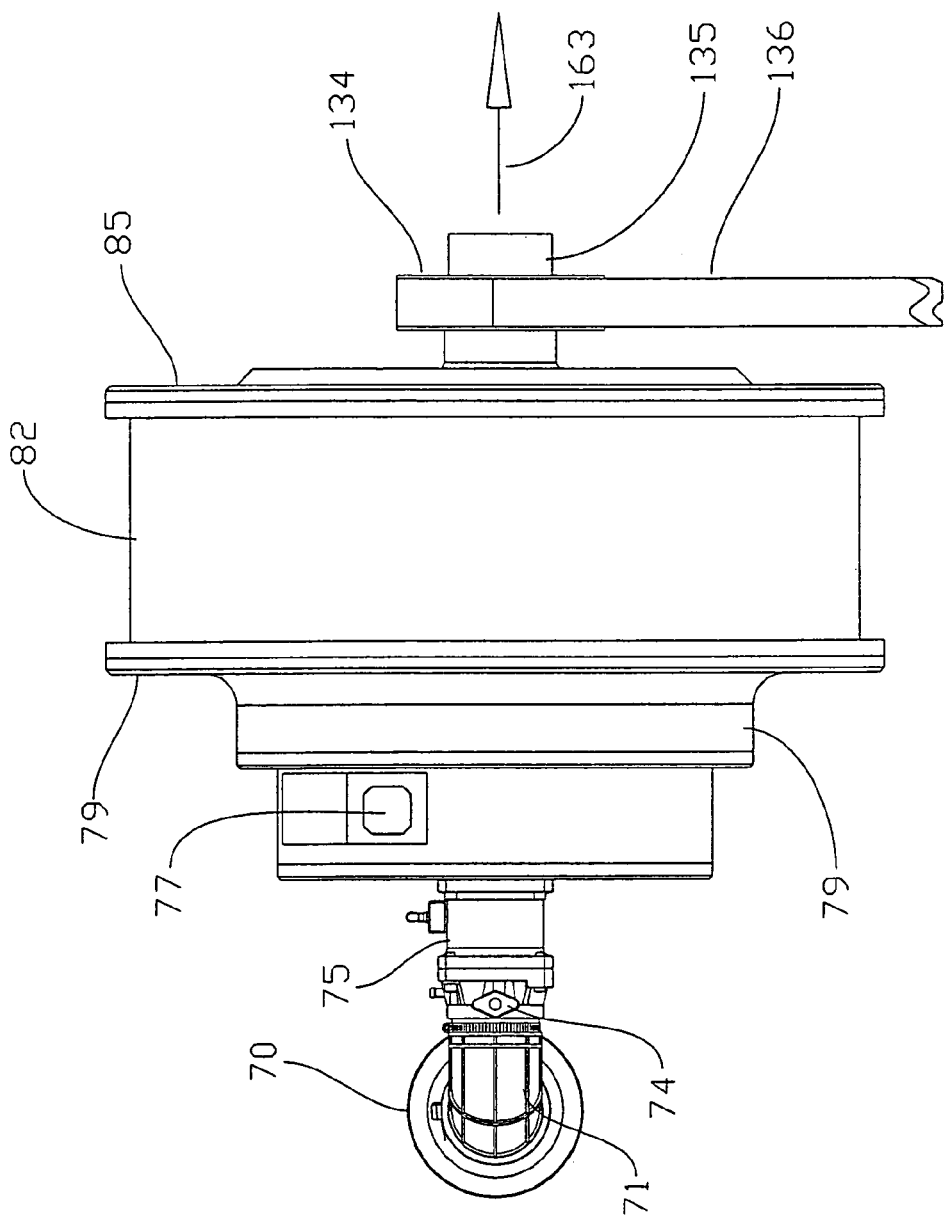
FIG. 3 shows a side view of the E-VVORP engine with air intake filter connected to throttle mechanism via air intake conduit.

FIG. 3 shows a side view of the E-VVORP engine with air intake filter 70 connected to throttle mechanism 74 via air intake conduit 71. Air inlet conduit and fuel/air blending section 75 connects throttle mechanism 74 to the air inlet manifold. The E-VVORP engine advancing and retarding mechanism drive means 77 is seen in end view with main engine housing 82 and end cover plates 85 and 79 also shown. Drive pulley 134 is shown in operating position attached to engine power takeoff 135. Engine exhaust is extracted via centrally disposed exhaust conduit centrally disposed within the engine power takeoff 135, wherein exhaust flows in the direction shown by arrow 163.

Figure 4:
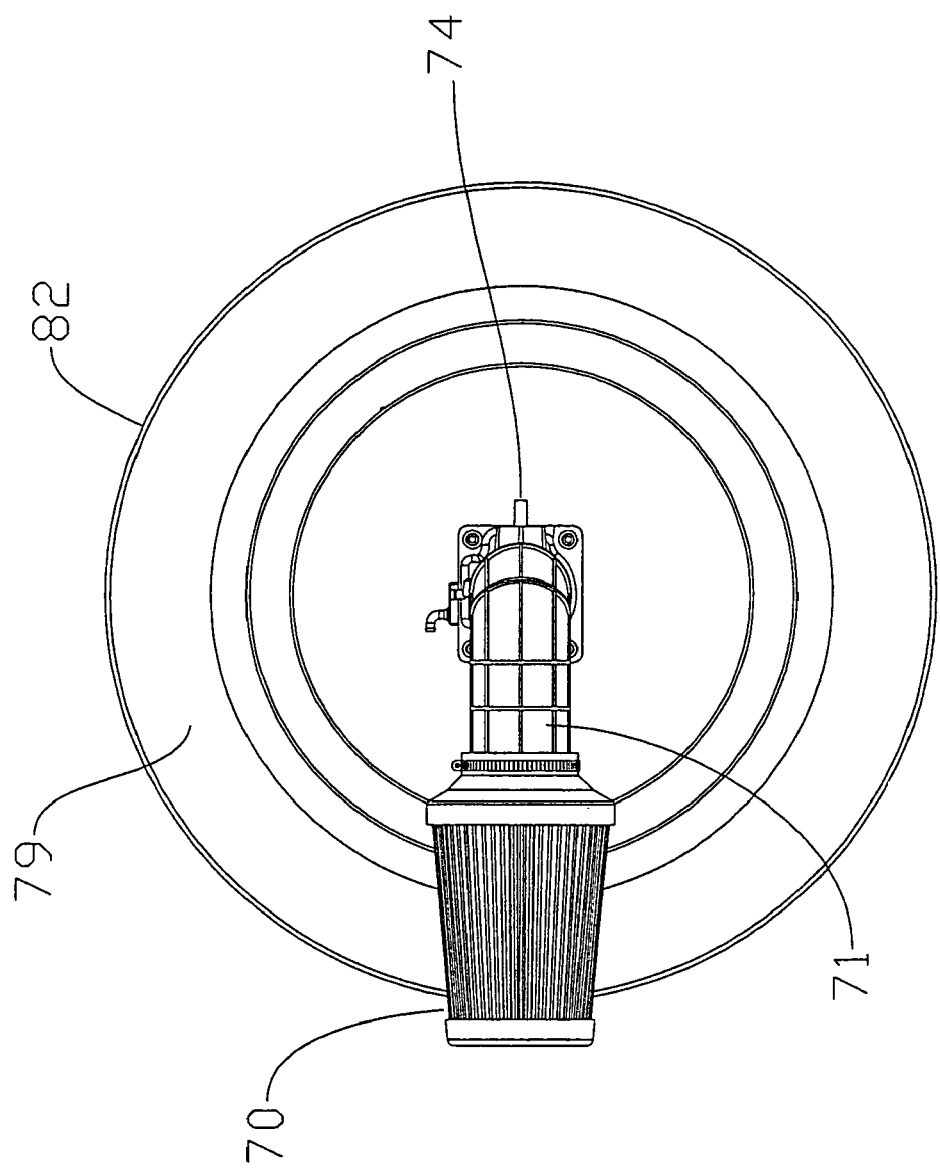
FIG. 4 shows the air intake end of the E-VVORP engine with cylindrical outer engine housing covered by endplate.

FIG. 4 shows the air intake end of the E-VVORP engine with cylindrical outer engine housing 82 covered by endplate 79. Air intake filter 70 is connected via air intake conduit 71 to throttle mechanism 74.

Figure 5:
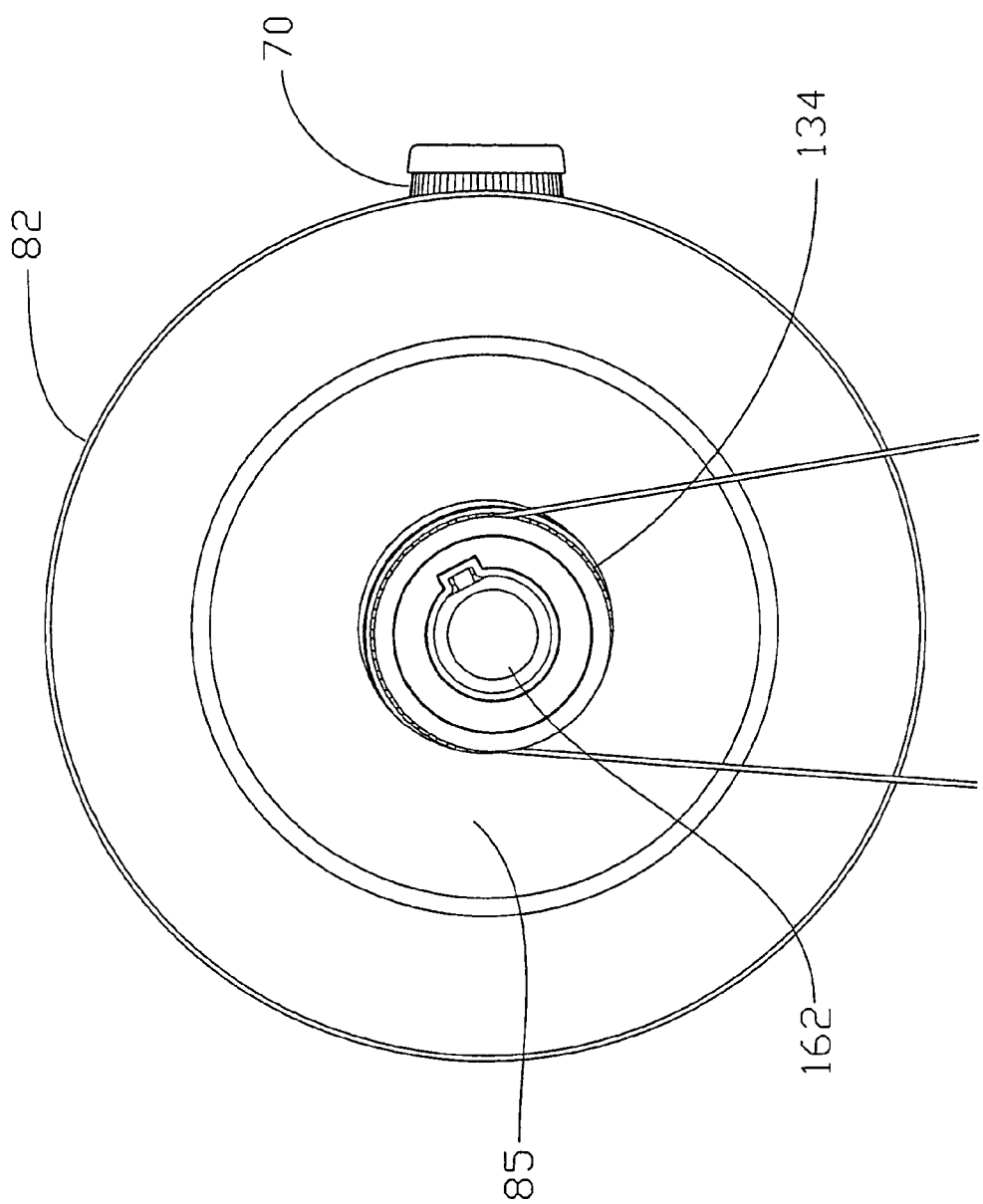
FIG. 5 shows the E-VVORP engine exhaust end view with engine outer housing, end cover, air intake filter, power take-off pulley and exhaust port.

FIG. 5 shows the E-VVORP engine exhaust end view with engine outer housing 82, end cover 85, air intake filter 70, power takeoff pulley 134 and exhaust port 162.

FIGS. 6A and 6B show an exploded three dimensional view of the E-VVORP engine as shown assembled in FIGS. 1 through 5. The operation of E-VVORP engine is most preferably achieved with components shown in FIGS. 6A and 6B. However alternative components may be substituted while enabling the operation of the engine as required. Most preferably however, the items listed as follows will be arranged to enable the efficient operation of the E-VVORP engine. The operation of the E-VVORP engine is disclosed herein, however various components may not detailed in any particular FIGURE or disclosed in subject matter, such as engine mounting brackets, fuel tank, storage, pumping systems and/or supply, electricity storage (battery) and/or supply, starting mechanism, spark plugs and other readily available and well known items.

Turning to FIG. 6A, air filter 70 is clamped to air inlet conduit 71 by clamp ring 141. Air conduit 71 is attached by clamp ring 41 to throttle mechanism 74 which in turn is attached to fuel/air blending and fuel mixture transfer section 75. Fuel injector 72 injects fuel into member 75 according to needs and is supplied via pipe 139. Member 75 is attached to end cover plate 76 at four screwed fastening points 156 enabling transfer of fuel mixture directly via aperture 147 therein. Advance and retard mechanism housing 73 is fitted with electric servo drive 77. Housing 73 is mounted to housing 79 with ring 80 mounted to bearing 81. Main engine housing 82 encloses crank ring 83 which is mounted to bearings 81 and 84. Crank ring 83 is provided with five radially disposed bored holes 142, 143, 144, 146 and 145. Engine end plate cover 85 provided with centrally disposed aperture 148 is located adjacent to engine outer housing 82.

Referring now to FIG. 6B, helical planetary gears 90, 94 and 88 are mounted to member 87 by pins 86 and 89 at three points positioned at the three points of an equilateral triangle such as at 152. Planetary gears, which in this instance may be spur gears 91 and 78 are attached to members 96 and 95 at holes 153 and 154 respectively. Gear ring 92, with spur gears hobbed on the inner surface of ring 92 mate with spur gears 91 and 78. Member 97 with five fasteners 93 is attached to member 107. Bearing 105 retains eccentric outer collar 98 with eccentric inner collar 106 and internal bearing 99. Air intake valve ring 108 mates with air intake valve ring 115 which are centrally disposed and fitted within rotor 118 and arranged to rotate in such a manner so as to allow a suitable mixture of air and fuel to enter cylinders 117, 127, 126, 124, and 116 respectively, and according to the normal four stroke operation of the E-VVORP engine. Pistons 113, 100, 101, 157, and 109 are arranged with suitable piston rings within said cylinders respectively, with connecting rods 115, 122, 103, and 110 each attached to pins such as 114, 123, 102, and 112 which in turn are located in crank ring 83, bored holes 142, 143, 144, 146, and 145. Fuel mixture deflecting member 125 is centrally disposed with rotor 118 in such a manner as to provide direct flow of fuel mixture into said cylinders via valve rings 108 and 138. Exhaust valve rings 128 and 119 are arranged to mate and fit as required within the exhaust section of rotor 118. Retaining member 129 is attached to rotor 118 at five points with fasteners such as 120. Inner bearing 121 mates with eccentric collar 130 which in turn mates with outer eccentric collar 131 with bearing 132 mating with outer eccentric collar 131. Drive shaft 135 with exhaust conduit centrally disposed there through is attached to rotor 118 at five points with fasteners such as 133. Power takeoff pulley 134 is attached to drive 135 and keyed thereto. A suitable timing drive belt 136 mates with pulley 134. Exhaust gases or fluids are extracted through drive 135.

FIG. 6 shows an adjustment mechanism that enables precise positioning of the crank ring 83 relative to the centrally disposed rotor 118. The centrally disposed rotor is arranged to rotate about an axis in line with the output drive shaft. The outward adjustment of the crank ring 83 relative to rotor 118 enables a controlled increase of the cubic capacity of the combustion chamber of each cylinder and an inward adjustment correspondingly reduces the cubic capacity of the combustion chamber of each cylinder. Accordingly, the quantity of any suitable fuel mixture, transferred into each combustion chamber prior to ignition, is varied according to demand by adjusting the crank ring 83 outwardly or inwardly relative to the rotor 118.

The combustion chamber capacity is further adjusted by the advancing or retarding mechanism. This mechanism achieves the desired adjustment by rotating the crank ring 83 relative to the rotor 118. Each connecting rod is attached to the crank ring at a pivot by a pin. Each connecting rod is attached to each respective piston via an additional pin of suitable profile. The location of crank ring 83 relative to rotor 118 is adjusted by rotating a pair of eccentric collars shown as 98 and 106 on a first side of rotor 118, and eccentric collars 131 and 130 on a second side of rotor 118. The pair of eccentric collars 98 and 106 is mounted to inner bearing 99 and outer bearing 105. The pair of eccentric collars 131 and 130 is mounted to inner bearing 121 and outer bearing 132.

Suitable drive means which are most preferably a pair of electric servo motors attached to outer collar 98 and inner collar 106 respectively are arranged to rotate collar 106 and collar 98. The relative position of rotor 118 to crank ring 83 can be in direct alignment wherein the center point of the axis about which crank ring 83 rotates is common with the axis about which rotor 118 rotates also. The rotation of outer collar 98 and inner eccentric collar 106 will separate the axis about which crank ring 83 will rotate relative to the axis about which rotor 118 will rotate. Outer eccentric collar 131 and inner eccentric collar 130 with respective electro servo motor drive means enable the rotation of selective components of the engine so as to ensure parallel and similar rotation with respect to the rotation of eccentric collars 98 and 106 and in such a manner as to ensure the equal and controlled relative location of crank ring 83 in relation to rotor 118.

In another preferred embodiment the drive shafts of at least two similar engines may be attached either in parallel or in series so as to minimize engine "twist" during acceleration and deceleration. With such a combined engine configuration a first E-VVORP engine drive shaft can be arranged to rotate in a first, clockwise direction while the drive shaft of the second E-VVORP engine is arranged to rotate in a counter clockwise direction. The drive shafts can be attached via a helical geared connection comprising, for example a sun gear, fixed to the first E-VVORP engine drive shaft, with three planetary helical gears simultaneously engaging the sun gear and an outer ring gear which is attached directly to the second E-VVORP engine drive shaft. In this instance the drive shaft connecting arrangement, comprising a helical sun with planetary gears and an outer ring gear, may be arranged to have a 1:1 geared ratio or alternatively any other suitable geared ratio. For example a geared ration of 2:1 may be selected so that an engine having both relatively high torque in combination with high speed can be provided. Any suitable geared ratio between the respective first and second E-VVORP engines maybe arranged as desired.

In another preferred embodiment an "HHRCD" (hand held remote controlling device) such as a PALM PILOT®, alternatively, an HP (Hewlett-Packard) or Compaq iPAQ "HHRCD" can be employed to communicate by any suitable medium, such as infra-red (or cable connection means); directly with a corresponding transmitter and receiver attached to the E-VVORP engine (or any other suitable engine). In this way, a readily established communication between the HHRCD and the engine controlling computer device can enable rapid transfer of any data and/or engine setting adjustments to for example, improve engine performance and/or fuel consumption efficiency.

Figure 10C:
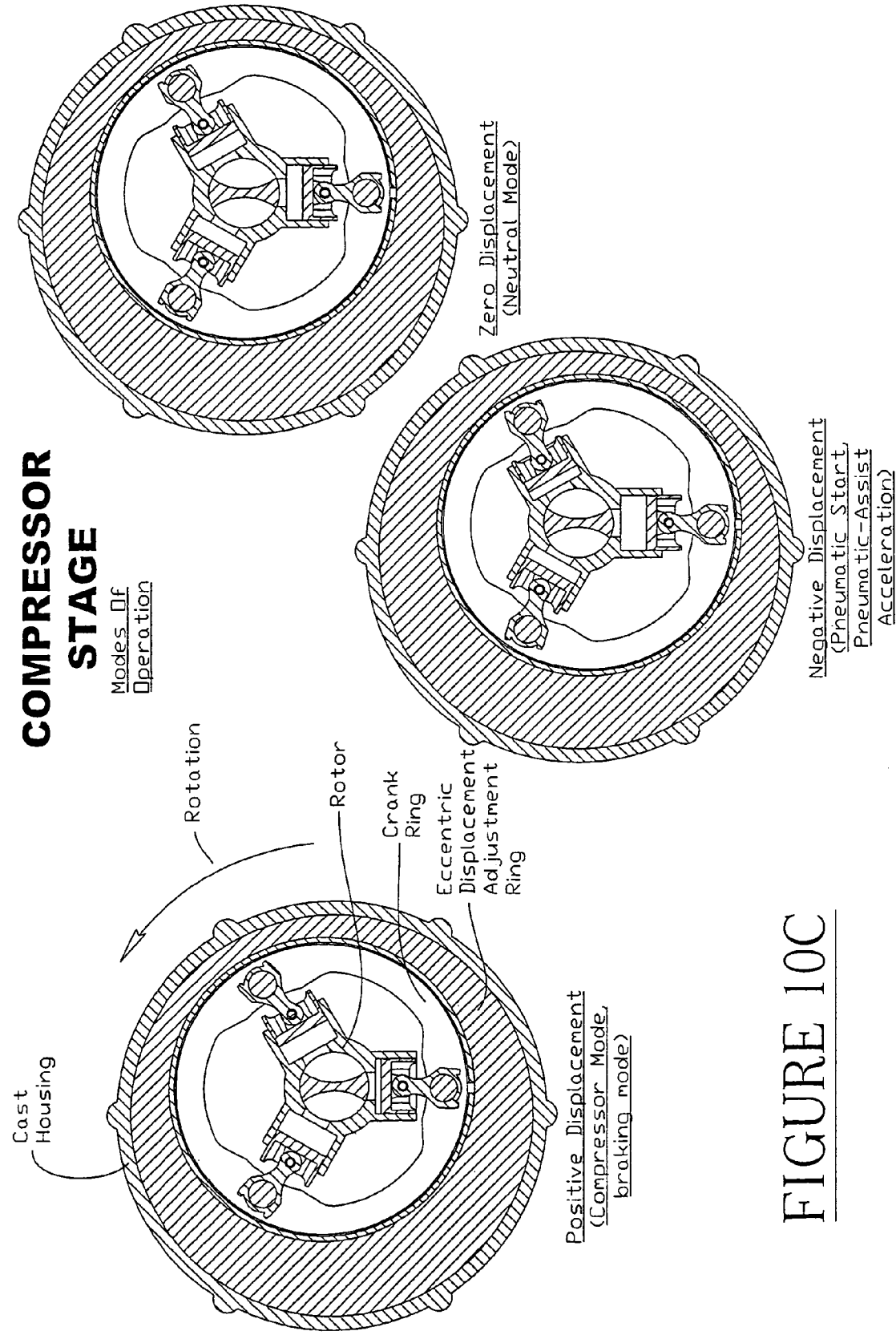
FIG. 10C is a cross-sectional view of an alternate embodiment of an E-VVORP engine formed in accordance with the present invention depicting three different modes of operation of the compressor stage of the E-VVORP engine.
Figure 10D:
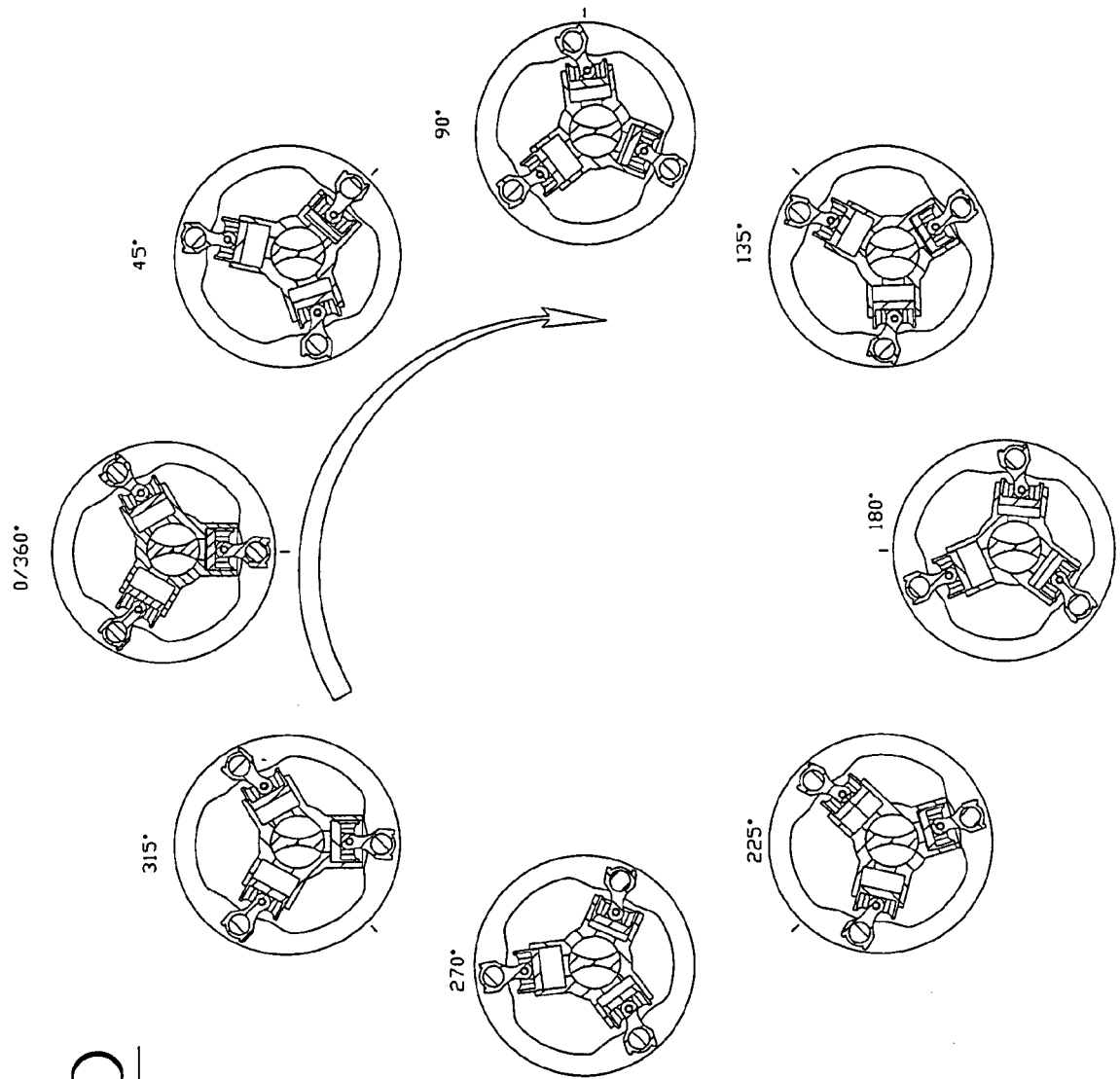
FIG. 10D depicts the E-VVORP engine of FIG. 10C during operation, wherein a snapshot of the orientation of the components of the engine are depicted at 45 degree intervals.

An alternate embodiment of an E-VVORP engine formed in accordance with the present invention is depicted in FIGS. 10C and 10D. The embodiment of the E-VVORP engine depicted in FIGS. 10C and 10D is a 2 stroke engine cycle wherein the rotor of the complete engine comprises a twin row or pair of parallel "rotors" connected directly together via a differential. FIG. 10C depicts three different modes of operation of the compressor stage of the illustrated E-VVORP engine. The mode of operation on the left of FIG. 10C shows the engine in a positive displacement compressor mode, braking mode. The mode of operation in the center of FIG. 10C shows the engine in a negative displacement pneumatic start, pneumatic-assist acceleration mode. The mode of operation in the right of FIG. 10C shows the engine in a zero displacement, neutral mode of operation. FIG. 10D depicts the E-VVORP engine of FIG. 10C during operation, wherein a snapshot of the orientation of the components is depicted at 45 degree intervals.

Figure 12:
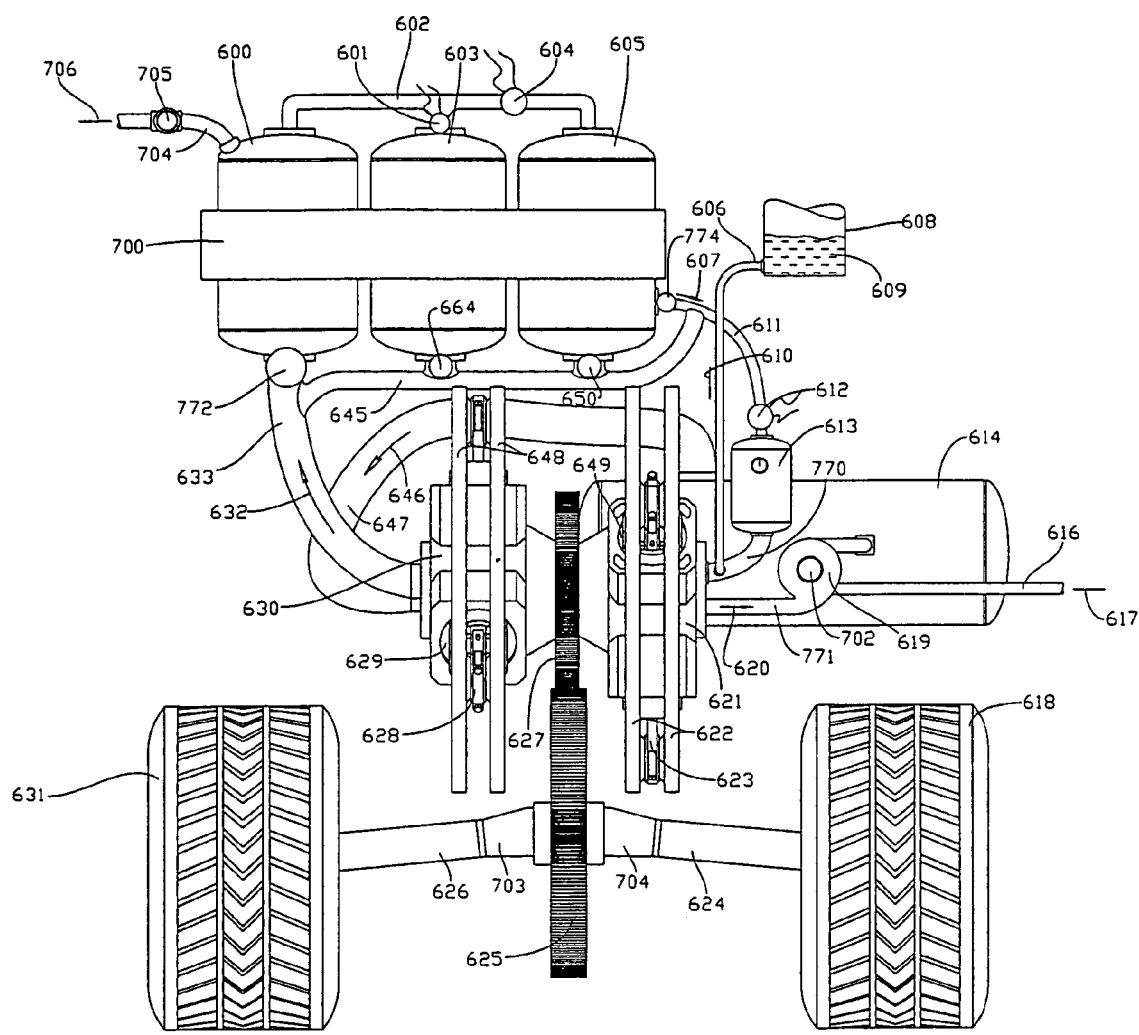
FIG. 12 is a diagrammatic view of an alternate embodiment of an engine formed in accordance with the present invention.

Referring now to FIG. 12, a diagrammatic view of an alternate embodiment of an engine formed in accordance with the present invention is depicted. The illustrated embodiment will be referred to as an E-VVORP engine for purposes of this detailed description. In this instance the E-VVORP engine shown is most preferably operated in a "two stroke" mode. However, the engine may be operated in 2, 4, 6, or 8 stroke mode. FIG. 12 shows an E-VVORP engine installation integrated with the drive wheels of a vehicle and is intentionally incomplete for reasons of clarity. The arrangement in FIG. 12 is intended to illustrate the relationship between and operation of the E-VVORP engine with its rotor 621 coupled with a compressor rotor 630 via a first differential with outer gear ring 627 and other integrated sub-assemblies. The crank rings 648 and 622 are shown exposed and without their respective bearings so as to more readily show the relationship and operation between each sub-assembly. The differential outer gear ring 627 engages with a second differential, outer gear ring 625. In turn, the second differential is connected to vehicle drive wheels 631 and 618 via drive shafts 626 with flexible coupling 703 and opposing coupling 704 with drive shaft 624 respectively. The engine and compressor assembly, with the first differential, is arranged to eliminate the need for a variable ratio drive or transmission and does not require a clutch as do other piston engines that have limited engine speed (rpm).

Adjustment of the valve rotor and the corresponding relative concentricity of the crank ring 648 with rotor 630 can enable its use in either a compressor mode or alternatively in a drive mode. The differential with outer ring 627 allows both modes to be achieved in either direction of rotor 630 and crank ring 648 rotation. This enables use of the compressor with rotor 630 as a braking system. For use as a brake system, the valve rotor is adjusted to reverse the flow of compressed air such that the compressor pistons are driven in an opposing direction.

Still referring to FIG. 12, two drive wheels 631 and 618 are depicted as connected to the driving mechanism. The arrangement is purposefully shown in an incomplete arrangement so as to enable a more readily understood arrangement. The drive arrangement provides a direct connection between the engine generating the power to enable motion of a vehicle without a clutch or variable ratio between the engine and the drive wheels needed. Drive wheels 631 and 618 with respective drive shafts 626 and 624 connect to the second differential with outer ring 625 and connected thereto via flexible couplings 703 and 704 respectively. A first differential with outer ring 627 connects the engine with rotor 621 and crank rings 622 to the compressor having a rotor 630 and crank rings 648. The said first differential connection enables the independent control of the engine and compressor in such a manner that allows the continued operation of the engine and the compressor when drive wheels 631 and 618 are stationary, operating at full speed, or at any selected speed between a stationary position and the full operating speed of the engine. This is achieved by adjusting the relative concentricity of the engine rotor 621 in relative position to crank ring 622, and the relative concentricity of rotor 630 with crank ring 648. The maximum displacement capacity of the engine is achieved when the eccentricity of rotor 621 and crank ring 622 is at its extreme position. Similarly the maximum total displacement of the compressor is achieved when rotor 630 and crank ring 648 are in their furthermost eccentric relative positions. The engine is capable of generating maximum torque when rotor 621 and crank ring 622 are in the furthermost eccentric relative positions. Similarly compressor with rotor 630 and crank ring 648 can offer maximum resistance when the rotor and crank ring are in the extreme furthermost relative eccentric positions. A fuel tank 608 with fuel 609 is connected to manifold 770 at injector port 701. Fuel can be injected into intake manifold 770 via connecting pipe 606 wherein fuel flows in the direction shown by arrow 610. Surge tank 613 which can be maintained at a constant pressure contains suitably pressurized air. Valve 612 enables control of air flow through conduit 611 from compressed air reservoir in the direction shown by arrow 607. Compressed air is stored in vessels 600, 603, and 605 at a suitable pressure. Said pressure vessels 600, 603, and 605 are connected by manifold 602 with valves 601 and 604, and manifold 645 with valves 644 and 650. Conduit 633 connects said pressure vessels to compressor in such a manner that compressed air can be transferred along conduit 633 in the direction shown by arrow 632. Valve 772 enables control of the flow of compressed air into pressure vessel 600 or alternately along conduit 645, and either directly into conduit 611 which can be isolated from storage vessels 600, 603, and 605 by valve 774, or alternatively directed to each of the vessels according to the position of the valves 772, 664, 650, 774, 604, and 601. A pressure release valve 705 is located in exhaust conduit 704 which enables release of air in the direction shown by arrow 706 as may be required. Compressor with rotor 630 is supplied by air at a positive pressure via conduit 647 in the direction shown by arrow 646, from vessel 614. Vessel 614 contains positive pressure air provided via conduit 615 after filtering and entry via port 702 and compression by turbo charged means 619. Exhaust manifold 771 connects directly to turbo charger 619, enabling the flow of exhaust gases thereto in the direction shown by arrow 620. Exhaust pipe 616 carries exhaust gases and releases to atmosphere in the direction shown by arrow 617. Drive wheels 631 and 618 rotate at a speed controlled by the eccentricity of compressor rotor 630 and crank ring 648, and engine rotor 621 and crank rings 622. This is achieved by adjusting the torque required to rotate drive wheels 631 and 618, and the resistance provided by torque required to rotate rotor 630. More particularly the greater the resistance provided by compressor 630 with crank ring 648, via the first differential to the E-VVORP engine with rotor 621 with crank ring 622, the greater will be the driving torque transferred from the first differential through the second differential with outer ring 625, and subsequently to drive wheels 631 and 618. When the resistance level offered by the compressor increases, to that torque value required to start rotation of drive wheels 631 and 618 is reached, said drive wheels 631 and 618 will start rotating. By increasing the resistance offered by said compressor, above this point of equilibrium, the energy transferred to said drive wheels will increase causing acceleration of the driven vehicle. The balance of resistance between drive wheels 631 and 618, and compressor with rotor 630, is controlled by adjusting the eccentricity of the compressor rotor 630 with crank ring 648. Such eccentricity is controlled by a suitable computer means according to the demand of the vehicle operator. For example, in a condition where the engine rotor 621 is providing sufficient driving means, the adjustment of relative position of crank ring 648 and rotor 630 controls the acceleration and/or speed of drive wheels 631 and 618. Conversely the speed of drive wheels 631 and 618, and the driven vehicle, can be reduced by a breaking action when the compressor rotor 630 relative position to crank ring 648 is adjusted such that the resistance offered by the compressor is greater than the engine output in combination with the drive wheels 631 and 618 and vehicle inertia. In this way the compressor can be used to brake and slow the vehicle, and in doing so compressed air thereby generated can be stored until required to accelerate the drive wheels and the vehicle. In yet another condition, compressed air stored in vessels 600, 603, and 605 can be directed to both compressor rotor 630 and engine rotor 621 as required to provide rapid acceleration of the drive wheels and vehicle.

Figure 13:
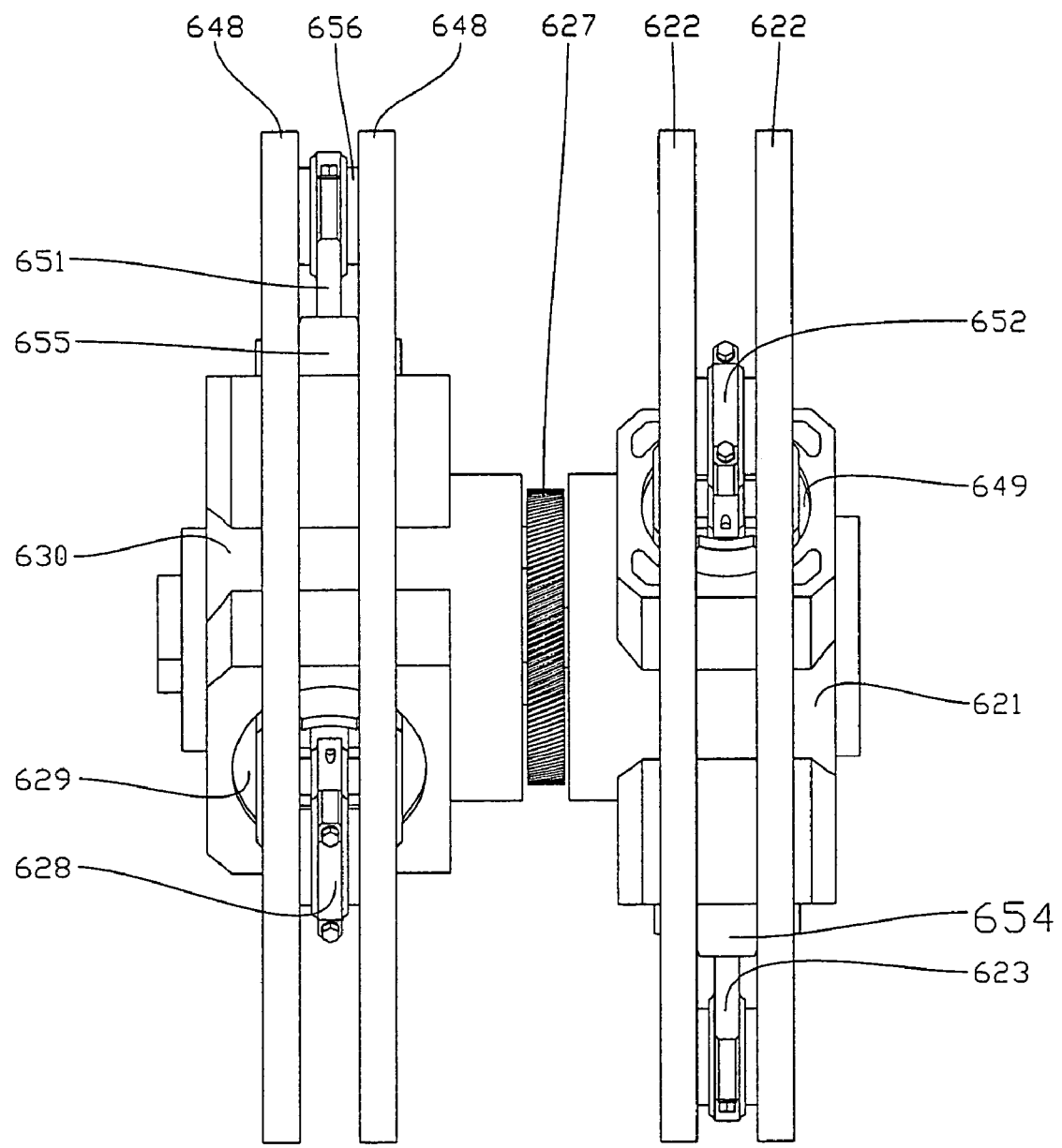
FIG. 13 is a side elevation of an engine rotor, with a crank ring connected to a compressor rotor and the crank ring, via a first differential with an outer ring.

Referring now to FIG. 13 a side elevation of engine rotor 621, with crank ring 622 connected to compressor rotor 631 and crank ring 648, via a first differential with outer ring 627 is shown. Piston 654 with corresponding connecting rod 623 can be seen, and piston 649 with bearing 652 is also shown. Compressor piston 655 with corresponding connecting rod 651 connected to bearing 656, are shown and piston 629 with bearing 628 are also shown in this elevation.

Figure 14:
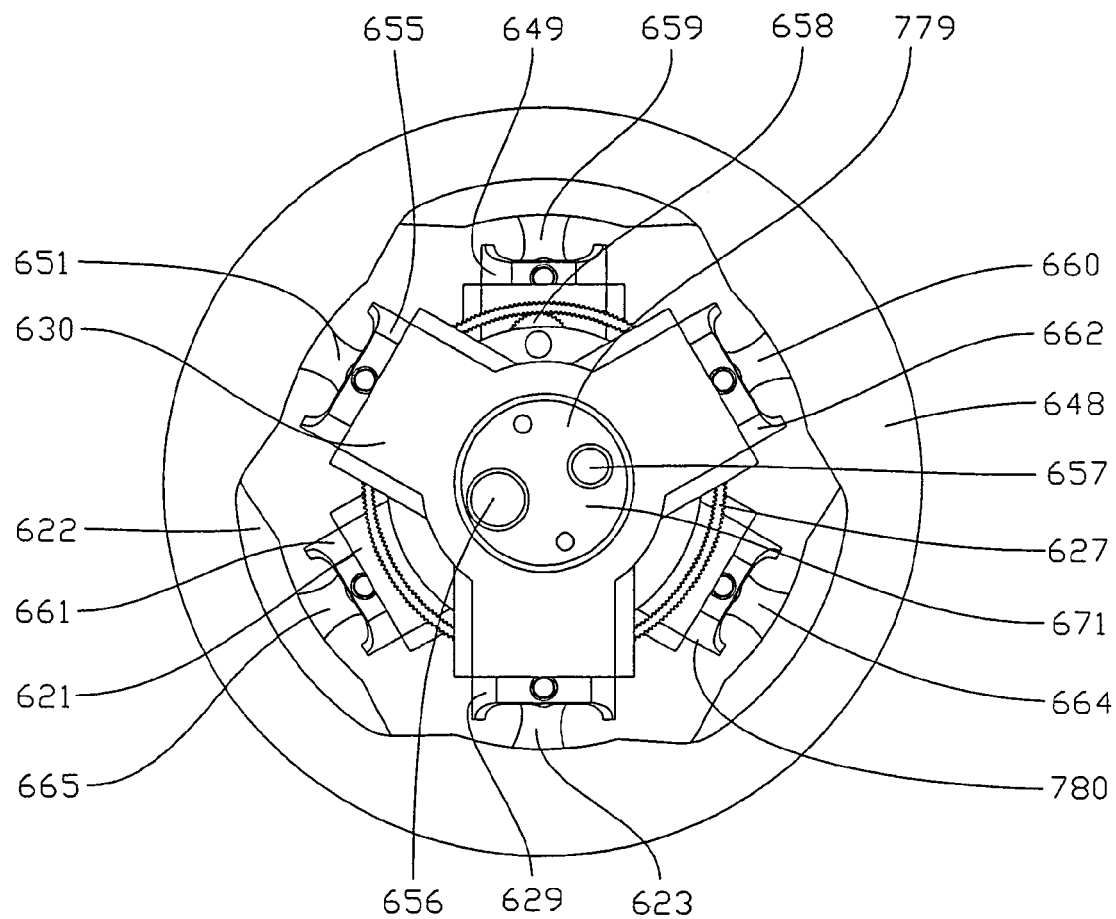
FIG. 14 is an end elevation of a compressor crank ring shown with connecting rods connected thereto, with respective pistons.

Referring now to FIG. 14, an end elevation of compressor crank ring 648 is shown with connecting rods 651, 660, and 623 thereto connected, with respective pistons 655, 662, and 629. Compressor rotor 630 with centrally located valve rotor 779 can be seen with air inlet 656 and compressed air outlet 657. Differential outer ring 627 is also shown with engaging pinion 658. Engine crank ring 622 can also be seen connected directly to connecting rods 665, 659, and 664 with respective pistons 661, 649, and 780, mating with rotor 621.

Figure 15:
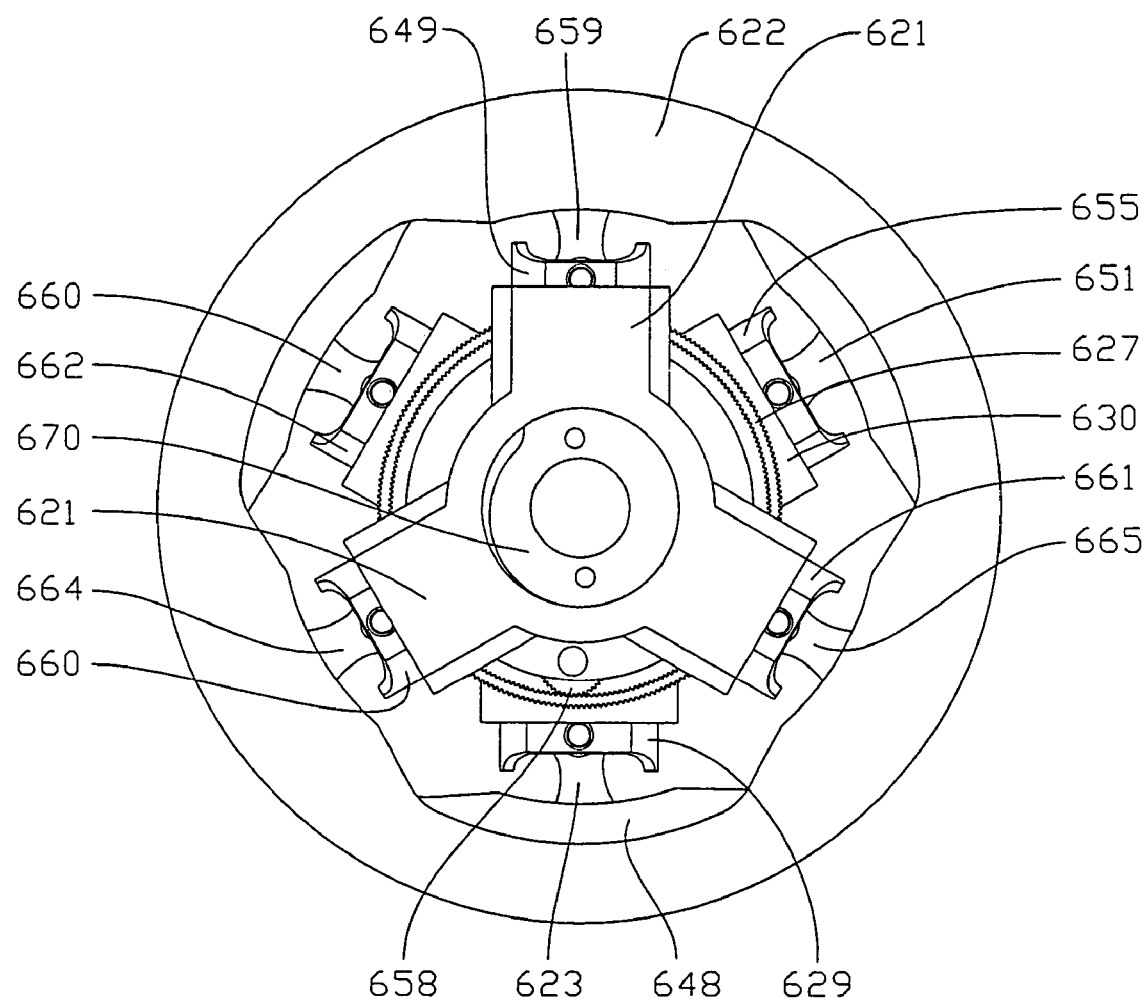
FIG. 15 is an end elevation view shown with crank ring connected directly to connecting rods with respective pistons mating with rotor.

Referring now to FIG. 15, an end elevation is shown with crank ring 622 connected directly to connecting rods 659, 665, and 664 with respective pistons 649, 661, and 660 mating with rotor 621. Exhaust valve rotor 670 is shown centrally disposed therewith. Crank ring 648 is also shown with connecting rods 623, 660, and 651 connected thereto, and respective pistons 629, 662, and 655 mating with rotor 630. Said first differential outer ring 627 mating with pinion 658 is also shown.

The preferred sequence of operation for the E-VVORP engine embodiment associated with FIGS. 12 through 15 is in a "two stroke" mode however, the pressurized intake stroke with fuel injection enables a more complete exhausting of spent fuels than a standard "two stroke" operation as described above. Furthermore, the E-VVORP operation is best suited to a "leaner" fuel and air mixture wherein the amount of air with a corresponding oxygen (injected into the cylinder) content is greater than is needed to enable complete combustion of the amount of fuel injected with the referenced volume of air.

A computer controlled balancing of the rotors is arranged with the integration of a suitable CPU, between the output "force" of the E-VVORP engine versus the opposing force of the drive wheel resistance combined with the E-VVORP compressor facilitates the forward (and reverse) movement of the drive wheels (and vehicle).

A significant benefit of storing energy in the form of compressed air is achieved by using the compressed air to drive the rotors of the E-VVORP engine to enhance vehicle acceleration as may be required. Additionally, the E-VVORP engine can drive the vehicle in which it is installed according to the disclosure in association with FIG. 12 through 16 at the same speed in either a forward or reverse direction. Compressed air can be used to power the E-VVORP compressor rotor in the opposite direction of the E-VVORP engine and at a speed (rpm) greater than the forward speed of the E-VVORP engine for a period of time limited by the available compressed air stored in the vessels. The CPU can be programmed to reverse the direction of the E-VVORP engine before the available quantity of compressed air is reduced to a predetermined amount. In a mode wherein the compressor rotor 630 is driven in an opposite direction to the E-VVORP engine rotor 621 and at a greater engine speed (rpm) the drive wheels 638 and 631 will rotate in the same direction as the compressor rotor 630 and in the opposite direction to the E-VVORP engine rotor 621. However, when the E-VVORP engine is rotating at a speed (rpm) greater than the compressor rotor 630, irrespective of the direction of the compressor rotor, the direction of the drive wheels 638 and 631 will be determined by the direction of the E-VVORP engine rotor 621. Whichever rotor rotates at the greater speed (rpm) will determine the direction of the drive wheels. The speed of the drive wheels will be controlled by the speed and direction of the rotors 621 and 630. More specifically, when the E-VVORP compressor rotor 630 and engine rotor 621 are rotating in the same direction the speed and direction of the drive wheels 638 and 631 will correspond.

Figure 17:
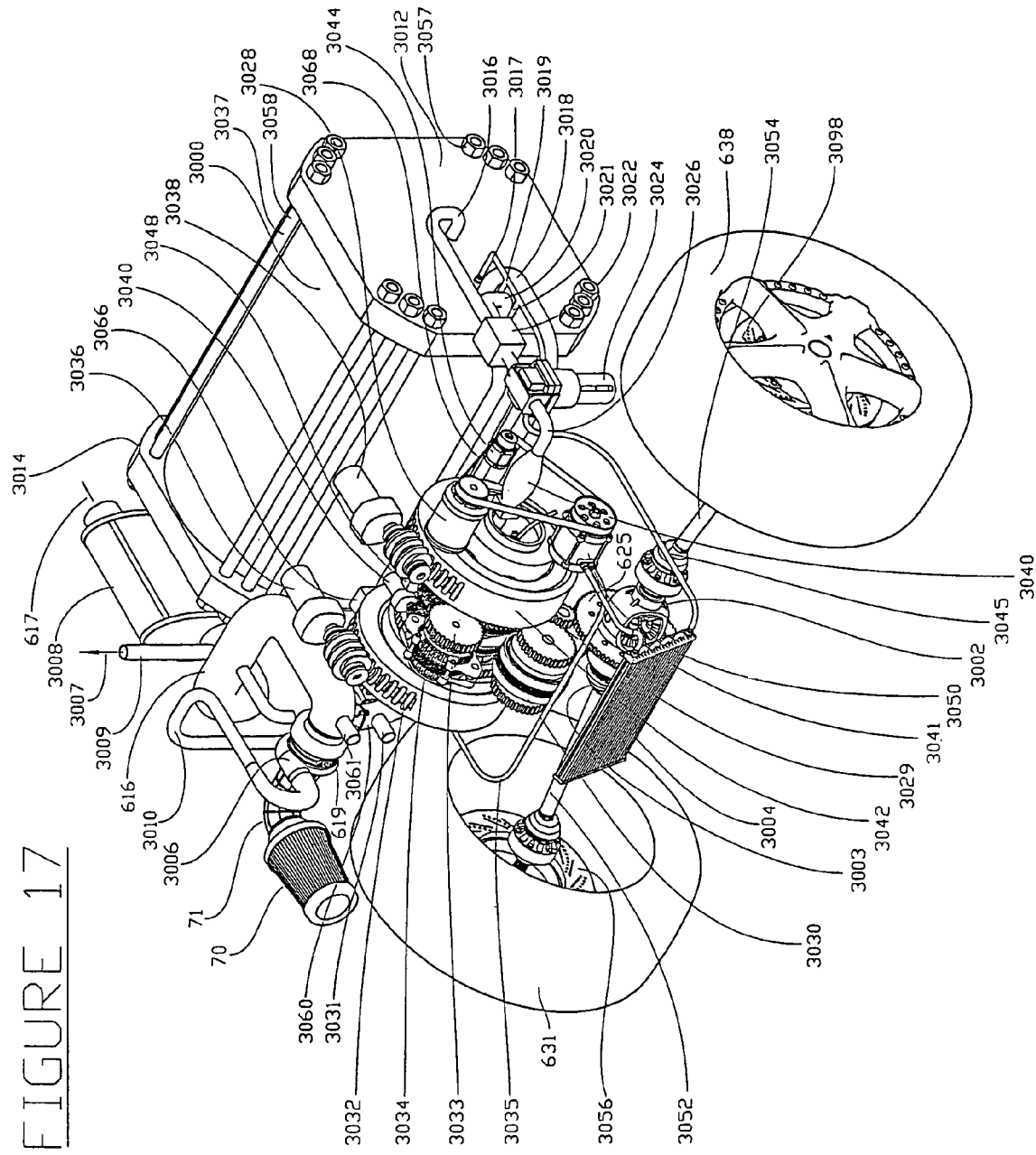
FIG. 17 shows a 3-D view of an E-VVORP engine assembly with the engine housing excluded and assembled with pressure vessels (concentrically assembled). The engine is arranged in a typical application as the means for driving a vehicle. First and second differentials and drive wheel assemblies with heat exchanger and liquid pumps are also shown.
Figure 18:
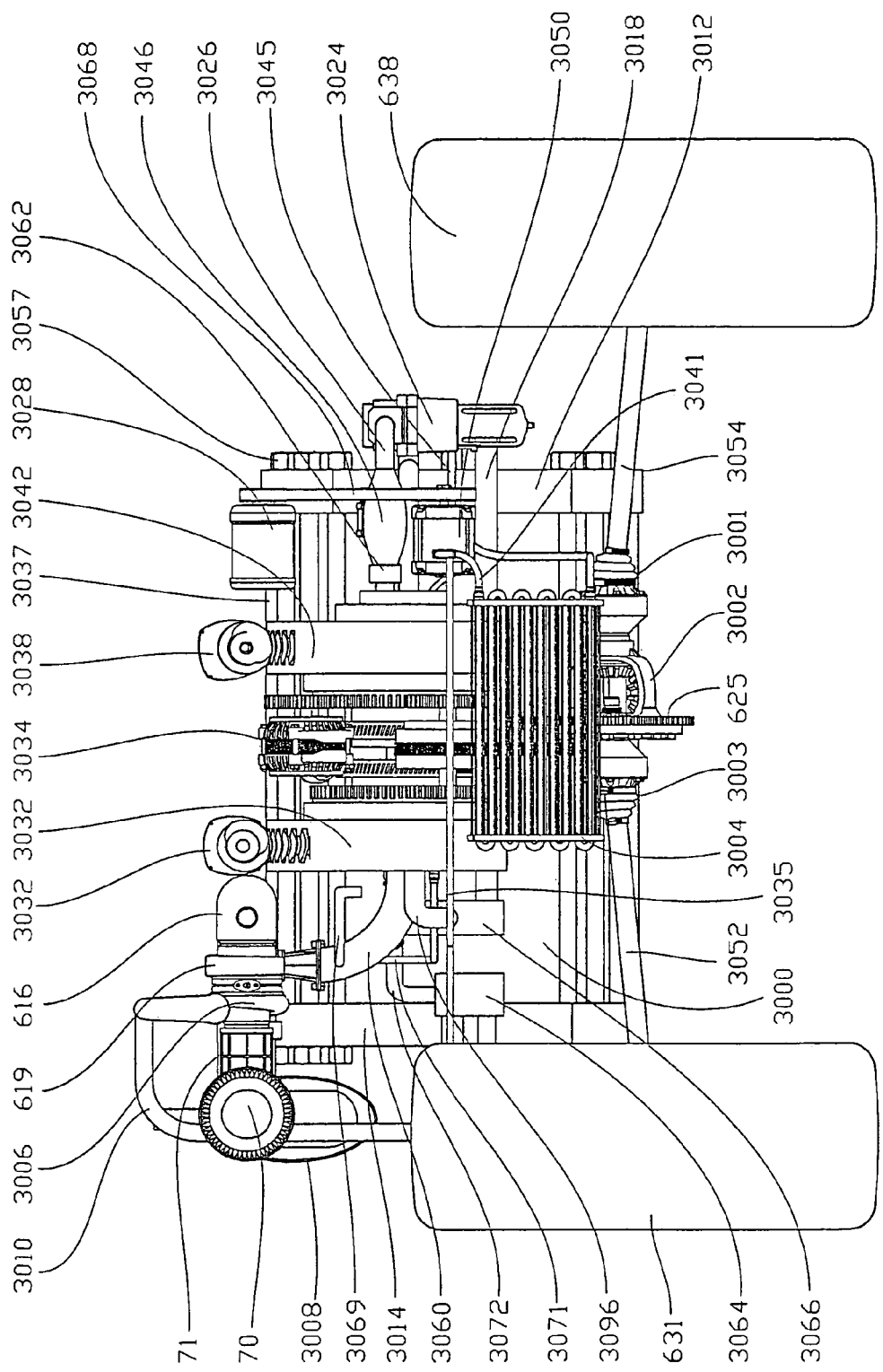
FIG. 18 shows a front view of the arrangement as shown in FIG. 18.
Figure 19:
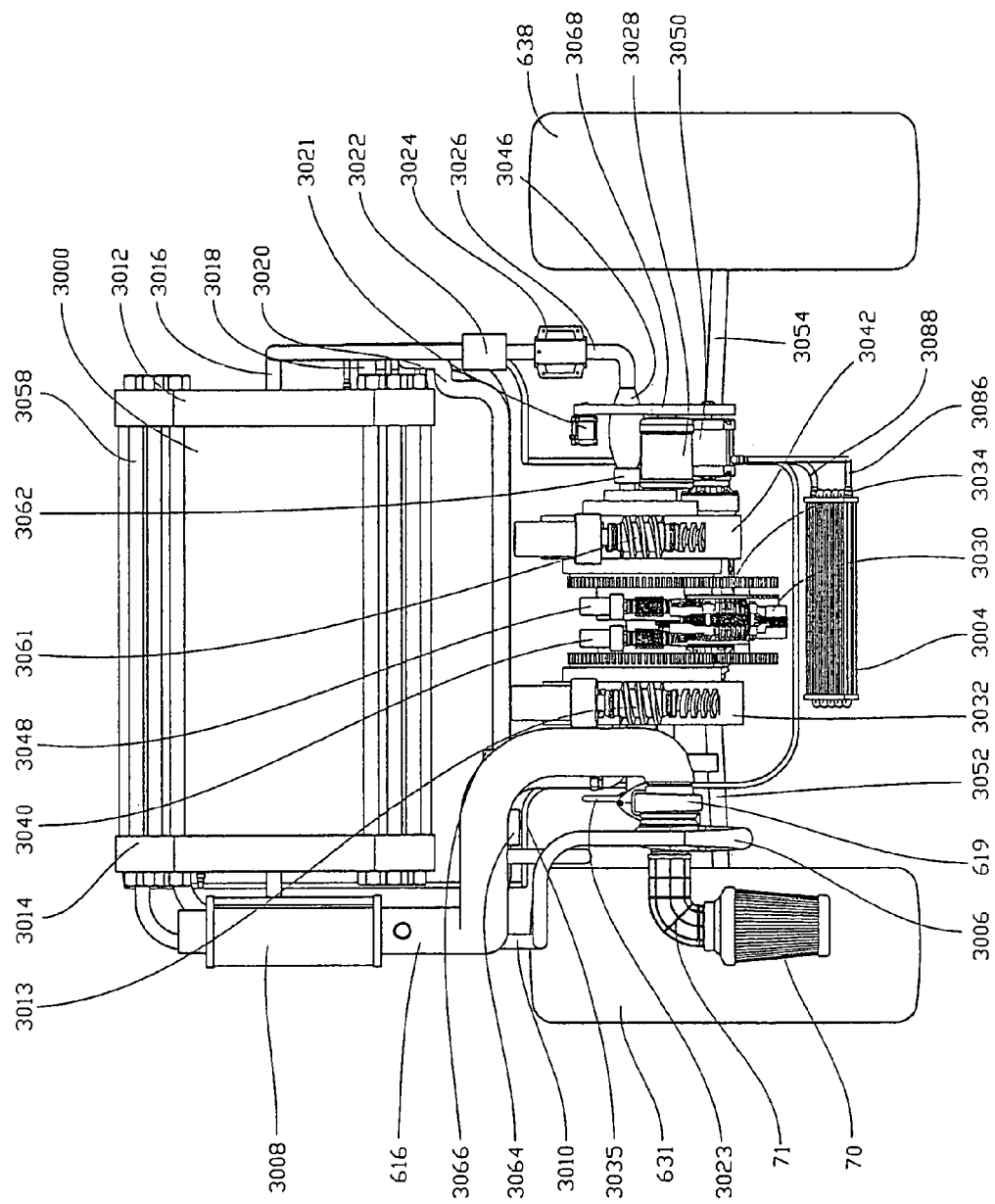
FIG. 19 shows a plan view of the arrangement as shown in FIG. 18.
Figure 20:
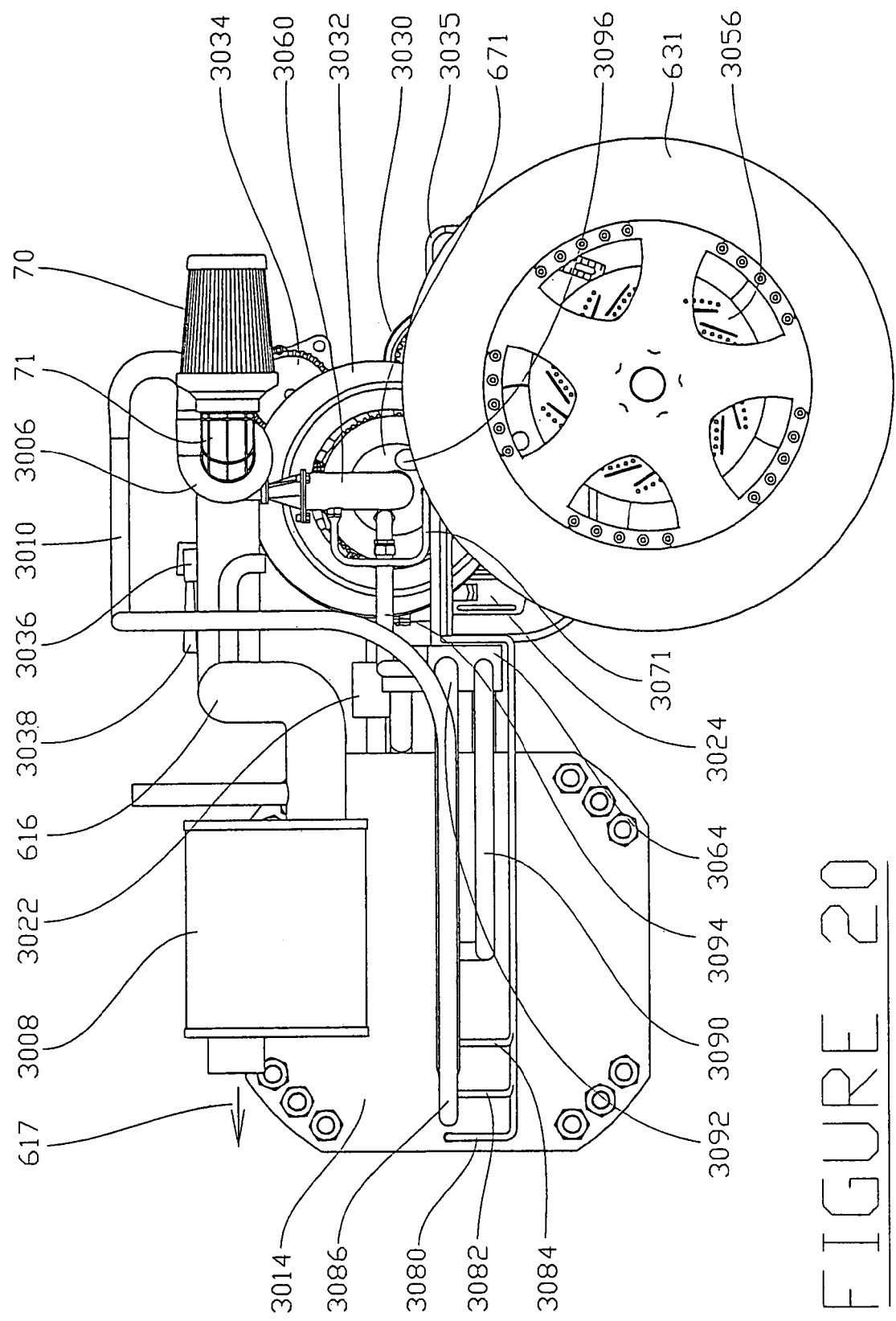
FIG. 20 shows an end view of the arrangement as shown in FIG. 18.

Referring now to FIGS. 17 through 21, various views of another preferred embodiment of the E-VVORP engine are shown. FIG. 17 shows a 3 dimensional isometric view showing the E-VVORP engine assembled, without the engine housing but arranged with pressure vessels 3000 and the drive chain as may be used when the E-VVORP engine is used as the drive for a vehicle. Two wheels 631 and 618 are shown connected via half shafts 3052 and 3054 to second differential 3002 which in turn is connected directly to first differential 3030. In this way the engine can be operating while the vehicle is stationary and this is enabled when the compressor rotor mounted within eccentric 3032 is rotating at the same speed as, but in the opposite direction of the combustion rotor mounted within eccentric 3042.

The combustion rotor, housed within eccentric 3042, rotates about a centrally disposed manifold through which fuel and compressed air is supplied in a computer controlled process according to demand. Operation of the combustion rotor assembly is disclosed below in further detail. The displacement capacity of the E-VVORP combustion rotor is variable within the lower and upper limits, by electric servo driven motor 3038 and worm gear 3061, which rotates eccentric 3042, and also servo motor 3048 rotates the combustion rotor relative to crank ring. The combustion rotor assembly held within eccentric 3041 is connected via first differential 3030 to compressor rotor held within eccentric 3032. Eccentric 3032 can be rotated by servo drive 3036 and worm gear 3013, thereby enabling adjustment of displacement capacity of the compressor rotor assembly mounted within eccentric 3032.

The compressor rotor and compressor crank ring can be adjusted in relative position to each other by servo drive 3040. First differential 3030 is connected by a suitable helical or spur gear 3029 directly to crown wheel 625. The crown wheel 625 is attached to differential housing 3002 and the differential mounted therein. Flexible coupling 3003 connects one differential output to driveshaft 3052 which in turn is connected via flexible coupling to wheel 631. The other differential output is connected to flexible coupling 3001 which in turn connects to driveshaft 3054 and via flexible coupling to wheel 638. Alternator 3034 is suitably connected directly via gear 3033 to the E-VVORP engine. Water pump 3050 is suitably mounted (mounting frame not shown) and driven via timing belt 3068. Air conditioning compressor 3028 and oil pump 3044 are also driven by timing belt 3068. Compressed air is supplied to the combustion rotor via conduit 3016, regulator 3022, filter and water separator 3024, and into conduit 3026 which connects to expansion chamber 3046, and then directly to combustion manifold via mass flow and pressure transducer 3062. Water separated from the compressed air supply at filter 3024 can be recycled for further use.

A controlled quantity of fuel is injected into combustion rotor 3034 by fuel injector 3039 with a measured quantity of compressed air to provide a selected fuel mixture in the combustion chamber. A spark plug 3065 suitably located to provide a continuous, timed, sequence of electrical discharge induced ignition sparks, within the combustion chamber of each cylinder, after compression of fuel mixture during each compression cycle of each cylinder and at an optimum time, during each rotation of each cylinder about the rotor axis. It should be noted that only a single spark plug has been shown in the combustion chamber of the subject E-VVORP engine however, more than one spark plug may be provided in a common combustion chamber as may be desired. Additionally, more than one fuel injector may be provided in the same fuel injection port or in suitably located and adjacent fuel injection ports. In such configurations the spark plugs may be arranged to "fire" simultaneously or alternately as required according to the engine timing sequence. Whenever multiple injectors (i.e. more than one) are incorporated, the corresponding simultaneous or alternate and sequentially timed fuel injection, by each fuel injector can be arranged.

The selected E-VVORP engine speed (RPM), engine drive or engine torque output, can be controlled by adjusting the volume and pressure of compressed air transferred into the combustion manifold via the pressure regulator 3022, electronically controlled in concert with control of the quantity of fuel injected via fuel injector 3039 and mixed with and according to the volume of air simultaneously transferred into the combustion chamber, according to the CPU and demand for engine performance needs. Cooling water can be recycled via a heat exchanger 3004, through suitably arranged conduits 3045 and 3035 by water pump pumping means 3050.

Figure 23:
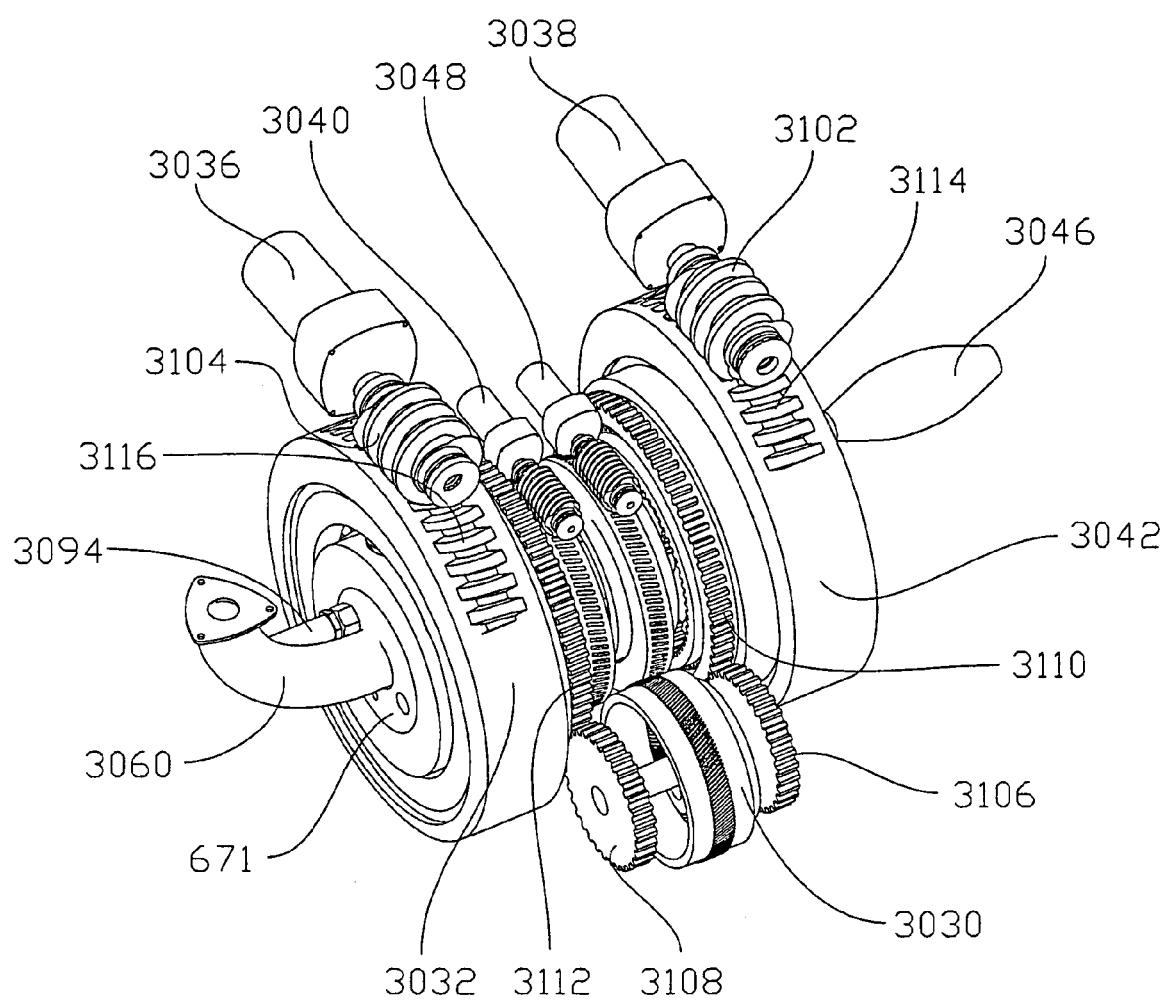
FIG. 23 shows a further 3-D view of the E-VVORP engine assembly without an outer housing.
Figure 37:
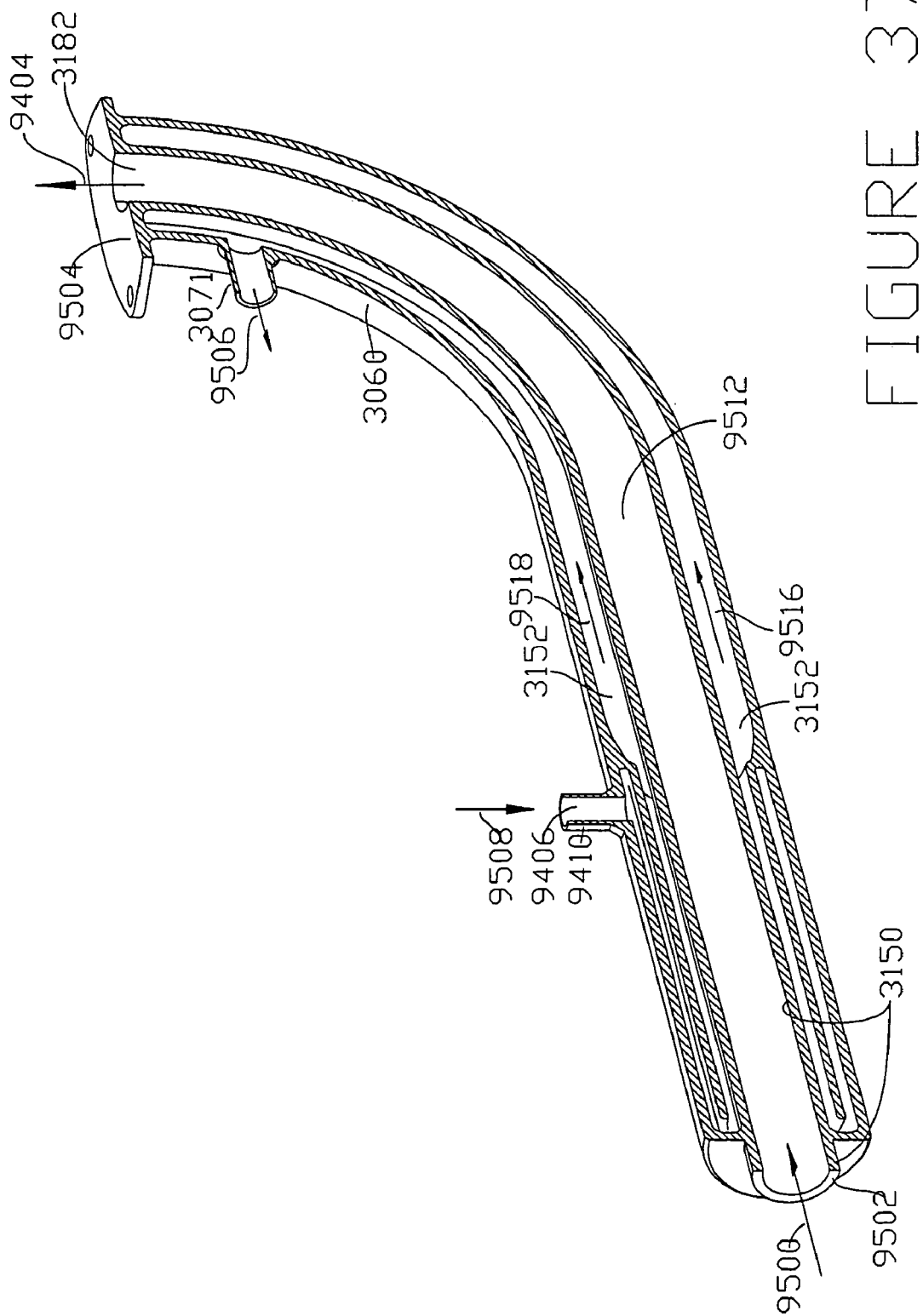
FIG. 37 shows a cross sectional view of the E-VVORP engine exhaust manifold.

Exhaust gases emitted from the combustion rotor 3034 are transferred via an exhaust conduit that follows a path through the center of the E-VVORP engine assembly, and then directly through the central section of the compressor rotor 671. The exhaust conduit 9514 as shown in FIG. 37 is contained within another larger conduit 3060, thereby providing a space 9510 between the inner exhaust conduit 9514 and the outer conduit 3060. The outer surface of the exhaust extraction manifold 3060 may be suitably insulated to retain heat therewithin for the more efficient purpose of producing usable steam wherein an outer sheath surrounding the outer steam containing conduit 3060 is provided in a manner that will insulate and minimize heat loss therefrom, as required. When fuels, such as hydrogen gas or gasoline, containing the element hydrogen burn in air, water is produced. This water can be in the form of a superheated gas which will, after adequate cooling, convert into steam and then liquid water. This water can be condensed and collected to enable re-use and for re-cycling purposes. Such collected water can then be stored and injected into the space between exhaust conduit and outer conduit 3060 in a controlled flow so as to enable continued vaporization of the injected water to produce steam (which may be superheated steam and/or gas), which can then be extracted via steam pipe 3071. Steam generated in this manner can be used to drive or assist in driving the compressor rotor by injection through port (8003 as shown in FIG. 23) of the compressor manifold 671.

Exhaust transferred from the combustion rotor, having been cooled by water injected into said space around the exhaust duct is then transferred directly into the drive segment of a super-charger with exhaust impeller housed within turbine housing 619. In this way, clean air, filtered by air filter 70, is drawn into compressor turbine housed within air compressor turbine housing 3006, through air intake conduit 71. Spent exhaust is transferred along an exhaust conduit housed within outer conduit 616. Water can also be injected into space between the exhaust conduit and outer housing 616 and/or outer housing 3060 via suitable injection ports such as 9410 (FIG. 37) 3061, and extracted via port 3009 in the direction shown by arrow 3007 or 9506 shown in FIG. 37. Steam generated in this way can be used to drive compressor rotor shown in the exploded view in FIG. 35 by controlled injection into port 8003 thence from port 8422 shown in FIG. 34, wherein the steam flow is controlled by a suitable valve (not shown).

Figure 32:
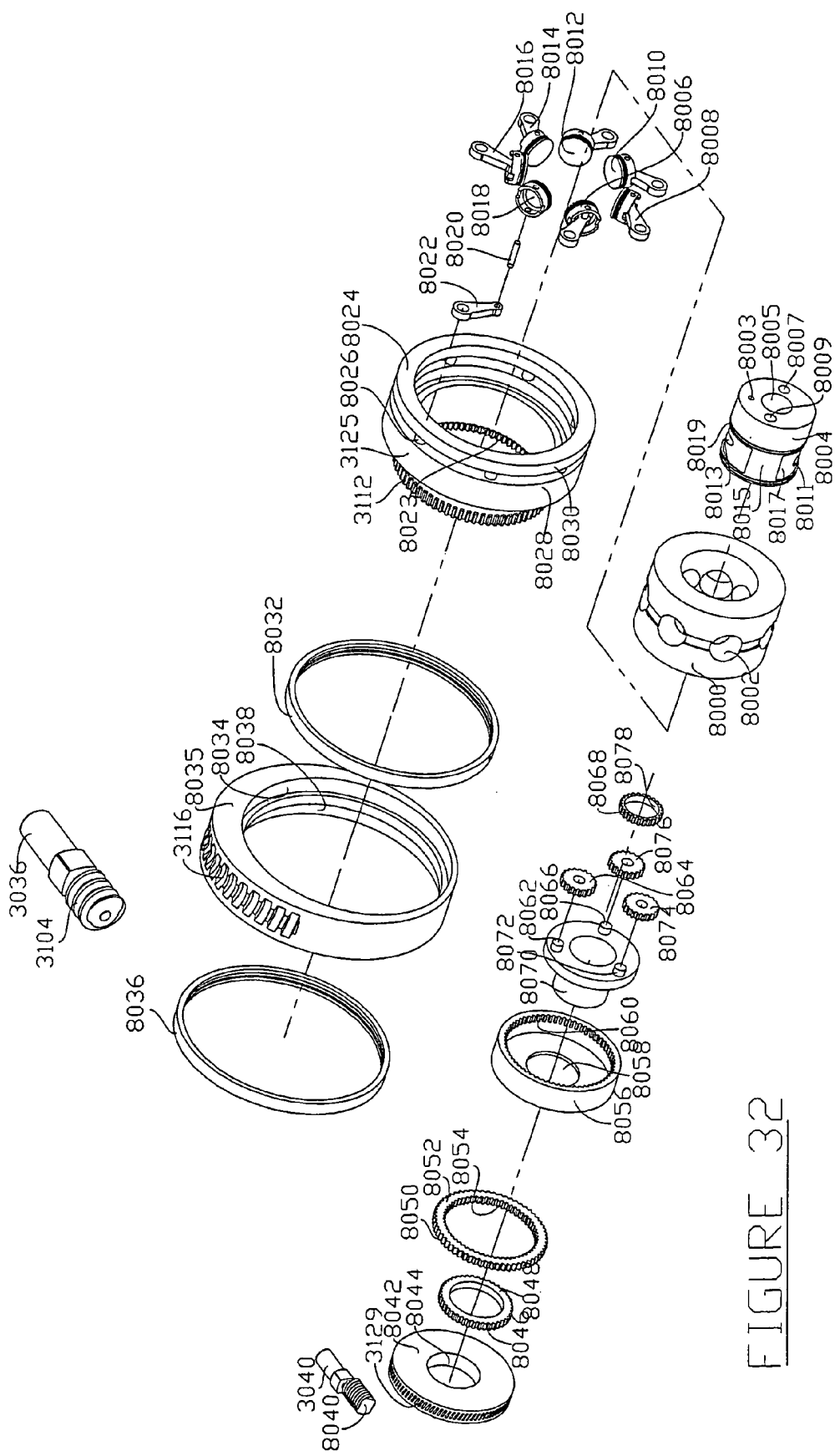
FIG. 32 shows an exploded view of the E-VVORP engine compressor rotor.

Water required for use in this way can be collected from a "water condensing apparatus" (WCA) installed in the exhaust conduit section between the turbo charger 619 and the exhaust silencer 3008. However, it should be noted that water used to generate steam as disclosed above is held in a substantially captive compressor circuit comprising compressor rotor 8000 (as shown in FIG. 32) and pressure vessel assembly, with end plates 3012 (FIG. 17) and 3014 (in FIG. 20), and connecting conduits and pipes 3072, 3096 (FIG. 18) including 3016, 3018, 3020, 3010 (FIG. 17) and filter/regulator 3024 and mass flow transducer 3022. Furthermore, exhaust impurities and undesirable toxins (IUT) can also be collected from the exhaust stream in the condensed water derived from the WCA system and transferred to the pressure vessels assembly for storage prior to progressive transfer for filtering through suitable filters (not shown) and filter 3024 (FIG. 17). Such impurities, pollutants and/or undesirable toxins (IPT), as regulated by the EPA (USA) and other government authorities of the respective countries in which the subject E-VVORP engine is operated, can be isolated in replaceable filters enclosed within filtering devices such as 3024. Such replaceable filters, after use according to the method described above, can be disposed of according to government regulations (for example according to EPA regulations in the USA, and even exceed minimum standards established by, for example the United Nations) and in a manner accordingly. The exhaust silencer 3008 is provided to reduce noise of exhaust emitted in the direction shown by arrow 617.

Pressure vessel assembly 3000 comprises a series of concentric vessels as described in further detail below. Three pressure vessels are arranged concentrically such that an outer space held within the outer pressure vessel, which is defined by an outer vessel with an inner vessel so arranged, consecutively, followed by a water jacket on the inside of the outer vessel which in turn is followed by a second pressure vessel having a space defined by an outer first water jacket and an inner second water jacket, and a third pressure vessel is arranged centrally disposed within the concentric pressure vessel assembly.

End caps 3014 and 3012 are shown bolted and held together by a series of 12 steel rods such as 3037 and nuts such as 3057. The end plates 3014 and 3012 hold the concentric pressure vessels in position and in such a manner that three spaces are provided with water jackets interposed. (The water jackets are arranged to enable heat exchange between the compressed air contained within the pressure vessels and the water contained within the water jackets. This can be provided in such a manner to allow temperature control of both water contained within the water jackets and the compressed air contained within the pressure vessels). Furthermore, in this way the outer pressure vessel space can be filled with air at an elevated pressure, having been compressed by turbocharger compressor 3006 then transferred via conduit 3010 and 3086.

The outer pressure vessel space is contained within first and second water jackets, and water having been chilled by transfer through heat exchanger 3004 can be pumped through pipes 3080 and 3082. In this way, first outer water jacket is filled via pipe 3080, second inner water jacket is filled by pipe 3082, and a third inner water jacket is fed by pipe 3084. Water is extracted from the water jackets via pipe 3021, 3019, and 3017 from first, second, and third water jackets respectively.

The arrangement of concentric pressure vessels allows for the storage of compressed air at three pressures, wherein the quantity of compressed air retained is separated via suitable valves. The highest pressure air is stored in the centrally disposed pressure vessel and is extracted there from for use, in the combustion rotor via conduit 3016. Multiple port valve 3064 is arranged to enable the extraction of air from any of the three compressed air storage vessels, and is arranged by computer control to systematically extract lower pressure compressed air from the outer vessel, and after suitable compression thereof, transfer higher pressure compressed air to the second pressure vessel for storage therein. Alternatively compressed air can be extracted from second pressure vessel, then compressed to a higher air pressure, and then transferred to the third and centrally disposed pressure vessel. In yet another sequence, low pressure compressed air may be extracted from the outer pressure vessel via conduit 3021, and then compressed to a higher pressure and transferred to the central pressure vessel via conduit 3090.

Compressed air extracted from the second pressure vessel via conduit 3018, may be transferred after compression via multiple port valve 3064 and conduit 3090, to the highest pressure central pressure vessel. Air extracted from the second pressure vessel via conduit 3020 may be transferred via multiple port valve 3064, and conduit 3090, and into centrally located pressure vessel. Alternatively air extracted via conduit 3020 can be compressed and then transferred via multiple port valve 3064, along conduit 3092 to said second pressure vessel.

Pressure and temperature transducers (not shown), are however located in all selected locations to monitor air, water, s, fuel, and oil pressure and temperatures, which are in turn interfaced with the CPU to enable the balanced and most efficient operation of the E-VVORP engine with the integrated equipment as herein described, and also any additional equipment or apparatus that may be selected to enable the efficient operation of the E-VVORP engine and system.

Servo motor 3036, which adjusts the displacement capacity of compressor rotor housed within eccentric 3032, in concert with servo motor 3040, are computer controlled to enable the balanced operation in concert with the computer controlled and balanced operation of combustion rotor housed with eccentric 3042, controlled by servo 3038 in concert with servo motor 3048. The efficient operation of the E-VVORP engine and system is optimized by the continuous CPU monitoring of the combustion rotor power output, and the compressor rotor via first differential 3030, which in turn drives differential 3002. The compressor rotor can be arranged to rotate in the opposite direction of the combustion rotor rotation by increasing the displacement of the compression rotor, such that the speed of rotation of the compressor rotor is reduced relative to the combustion rotor.

Simultaneously the displacement and power output of the combustion rotor can be proportionately increased such that a difference between the respective rotational speeds causes the first differential drive gear to rotate, thereby transferring a driving force to second differential crown wheel 625, via gear 3029. In this way, power is transmitted to wheels 631 and 638, causing the subject vehicle to move in a selected direction, accordingly. Additional proportional increases in displacement of the compressor rotor the combustion rotor, wherein the compressor rotor rotational speed is reduced relative to the combustion rotor, will cause acceleration of the subject vehicle.

In a braking condition, the compressor rotor will be driven by the forward motion of the vehicle, and in this situation the combustion rotor fuel and compressed air supply is reduced under precise computer control to ensure that the compressor rotor is driven by the energy and drive transferred from the wheels 631 and 638, and also while ensuring the combustion rotor slows to a minimum rotational speed. Suitable braking systems such as disc brakes are not shown but can be directly attached to the compression and the combustion rotors independently so as to enable to simultaneous braking of the compression and combustion rotors, or alternatively the independent and separate braking of either the compression rotor or the combustion rotor.

Even though it may not be necessary, for satisfactory operation of the E-VVORP engine and subject vehicle, a suitable arrangement of levers can be installed to enable the disengagement of spur gear 3029 to disconnect the E-VVORP engine from the drive wheels, if so desirable.

Figure 22:
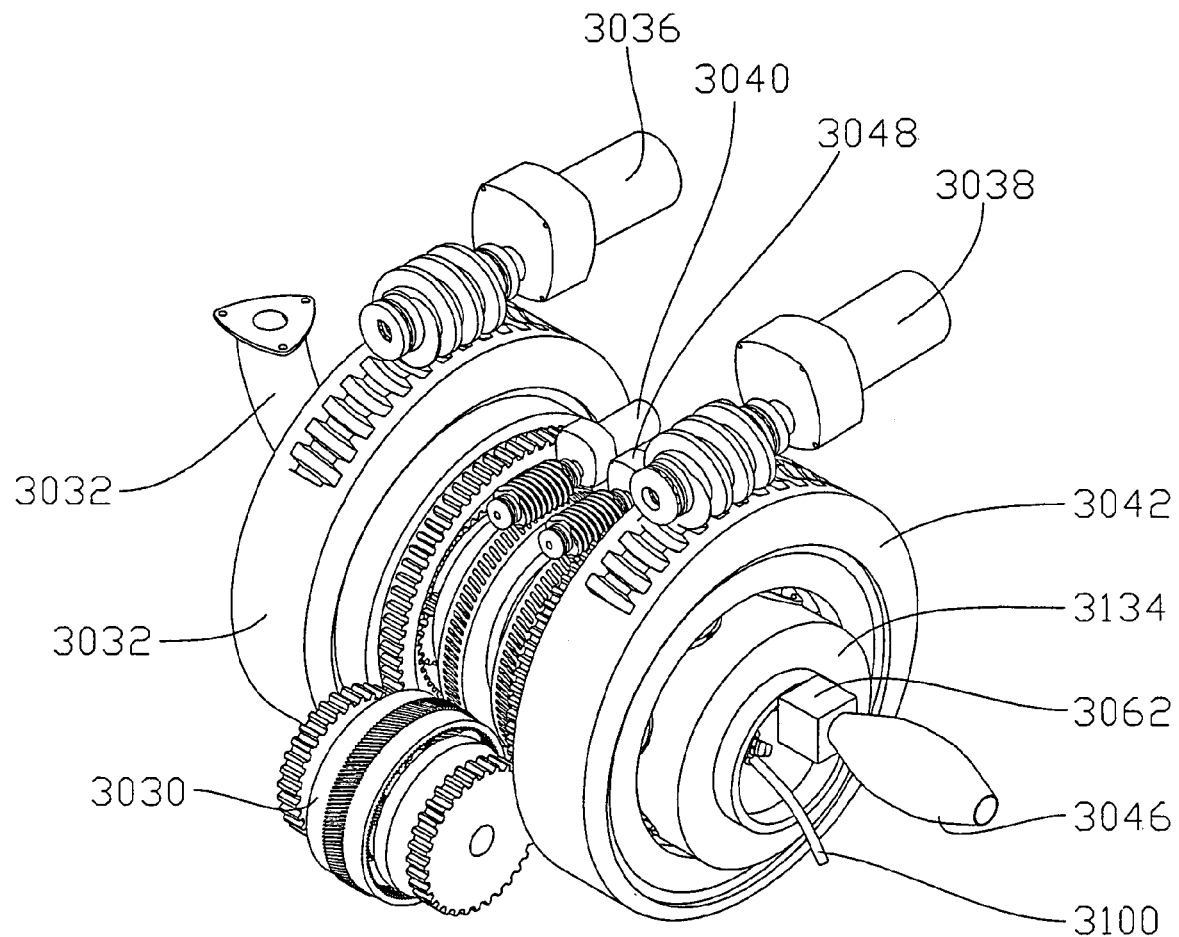
FIG. 22 shows a 3-D view of the E-VVORP engine assembly without an outer housing.
Figure 24:
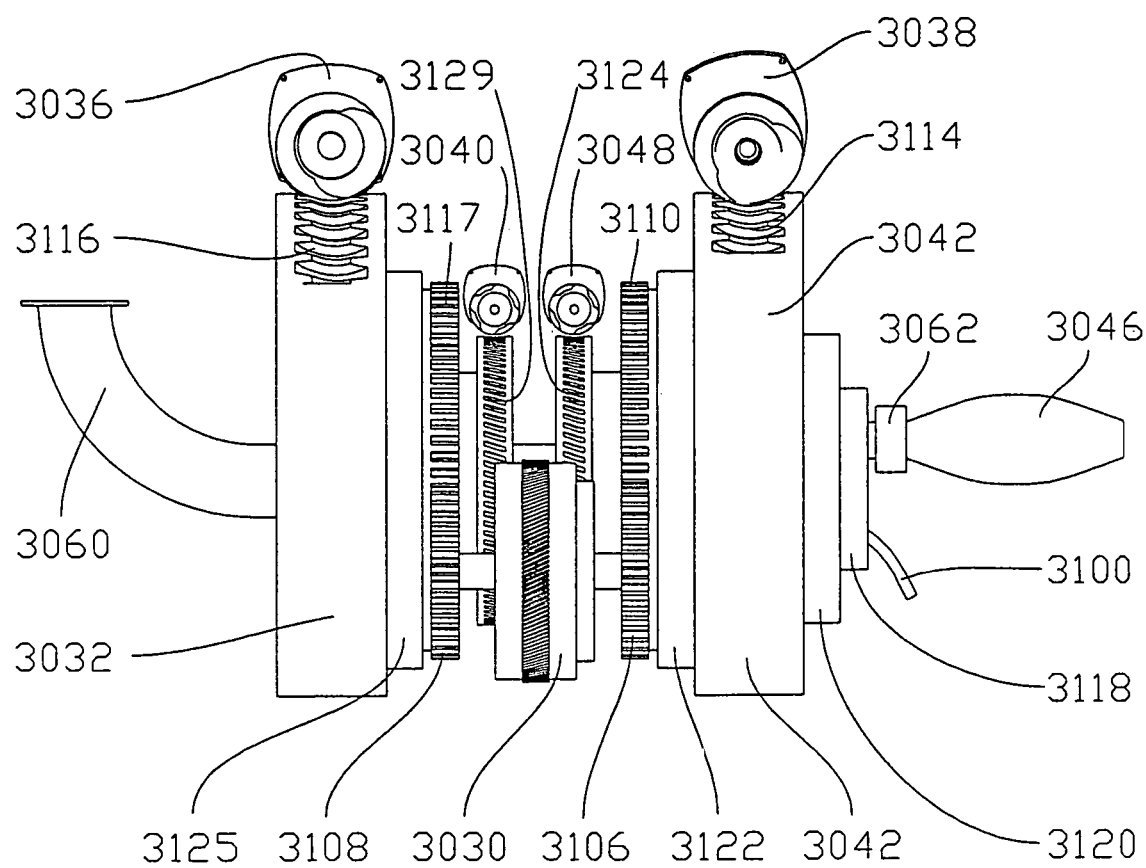
FIG. 24 shows a front elevation of the compressor and combustion components of the E-VVORP engine.

Referring now to FIGS. 22, 23, and 24, three views of the E-VVORP engine, including the combustion rotor, compression rotor, and first differential 3030 are shown, wherein FIG. 22 shows one 3-D view from a first perspective, FIG. 23 shows a second 3-D view from a second perspective, and FIG. 24 shows a front elevation of said E-VVORP engine assembly.

FIG. 22 shows combustion rotor eccentric 3042 with servo motor 3038, and worm gear engaged together. Combustion rotor 3134 with partial view of pistons and combustion manifold mounted therein with compressed air inlet vessel 3046 and flow pressure transducer 3062. Fuel supply line 3100 is shown connected to fuel injector and servo drive 3048 is also shown. Compressor rotor eccentric ring 3032 and servo motor 3036 with worm gear engaged there together. Combustion rotor and compressor rotor are connected directly via first differential 3030, and exhaust conduit assembly 3032.

FIG. 23 shows combustion rotor 3042 engaged with worm gear 3102 and servo drive 3038. Compression rotor drive gear 3110 is shown engaged with differential input gear 3106. Servo drive 3048 is shown engaged with corresponding worm wheel. Compression rotor 3032 is shown engaging with worm gear 3104 and servo 3036. Compression rotor manifold 671 is shown with air port 3094 and exhaust 3060.

FIG. 24 shows combustion rotor 3042 engaging with worm gear at 3114 with servo motor 3038. Compression rotor shoulder 3120 with crank ring 3122 fixed directly to gear 3110 engaging with first differential 3030 at input gear 3106. Combustion inlet manifold 3118 is shown with fuel line 3100 and inlet pressure vessel 3046 with flow and pressure transducer 3062. Servo drive 3048 and worm gear engages with worm wheel 3124. Compressor eccentric 3032 with machined worm threads 3116 engages with worm gear and servo drive 3036. Compressor rotor shoulder 3125 and gear 3117 is shown engaging with said first differential, second input gear 3108. Servo 3040 and worm gear engages with worm wheel 3129. Exhaust outer conduit 3060 is shown.

FIG. 25A shows an exploded view of the combustion rotor of the E-VVORP engine as also shown in FIGS. 22 through 24 in various views, wherein exhaust port 3182 enclosed by outer conduit 3060 with inner exhaust conduit 3150 providing space 3152 as shown in FIG. 37 which connects directly with combustion manifold 3118. Air inlet vessel 3046 may also serve as an expansion chamber and/or compressed air accumulator. An air/water separator, which is not shown, may also be installed in association with member 3046 wherein any water that may precipitate during a compressed air pressure drop as may occur in said accumulator 3046, can be extracted and transferred into the pressure vessel assembly (3000 in FIG. 17) to be stored until use for possible exhaust gas cooling and steam power generation associated with the exhaust assembly shown in connection with FIG. 37 or alternatively disposed of.

Figure 21:
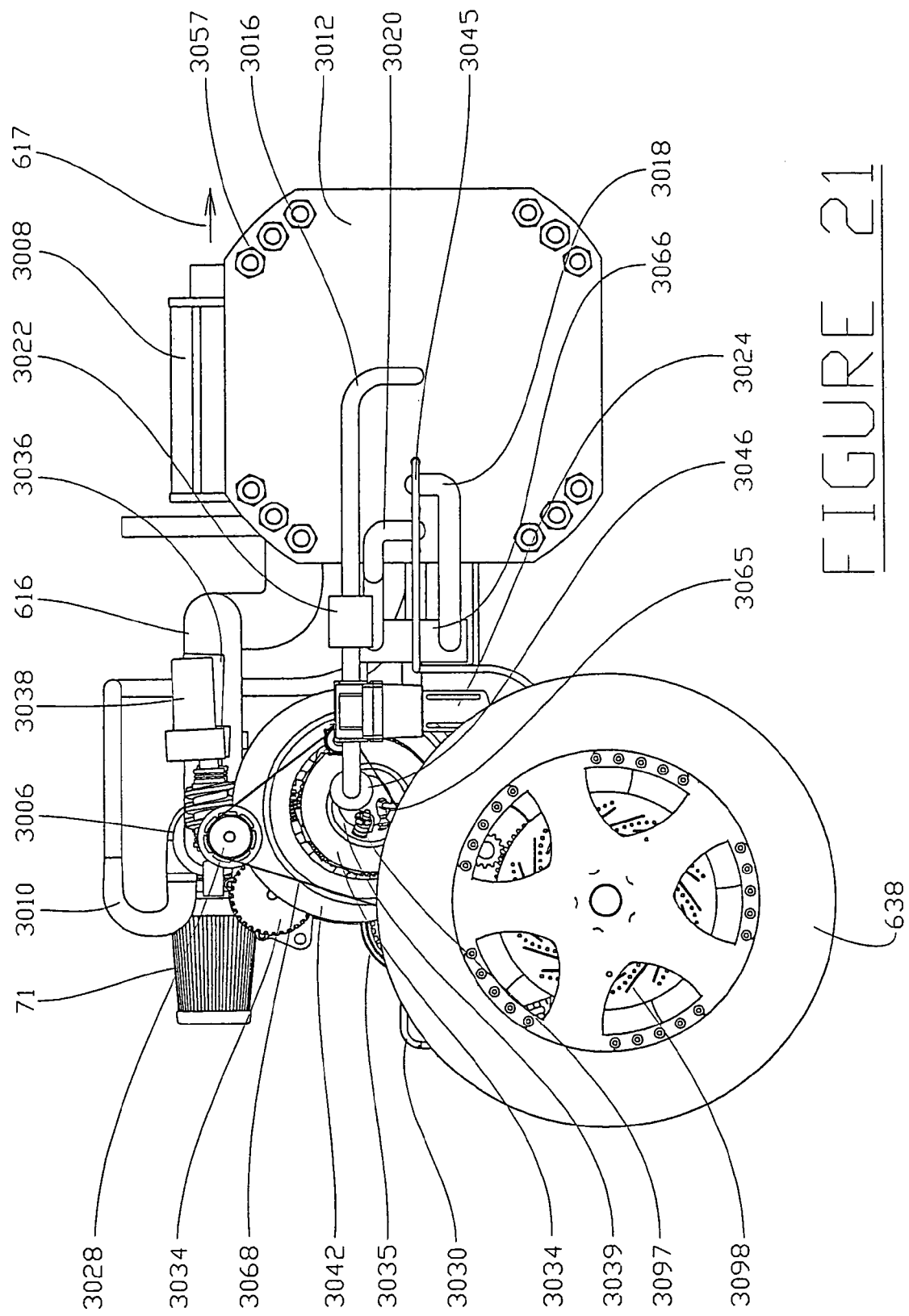
FIG. 21 shows an alternate end view of the arrangement as shown in FIG. 18.

Such disposal may involve storage in a vessel (not shown) specifically provided for this purpose and in which all toxic, undesirable exhaust compounds or elements, liquid solid or gas in solute can be stored and subsequently extracted, for example at a service station where facilities for such disposal can be conveniently provided. Turning to FIG. 25B, an aperture 8358 in the air inlet vessel 3046 connects to a mass flow and pressure transducer 3062 followed by a convenient connection via a conduit extension to manifold 3118 and finally to port 3192. A fuel line 3100, as shown in FIG. 24, connects to fuel injector 3097 shown in FIG. 25B and as also shown in FIG. 21, enables direct injection of fuel through port 3194 which is located adjacent to air injection port 9814 as also shown in FIG. 39.

Figure 33:
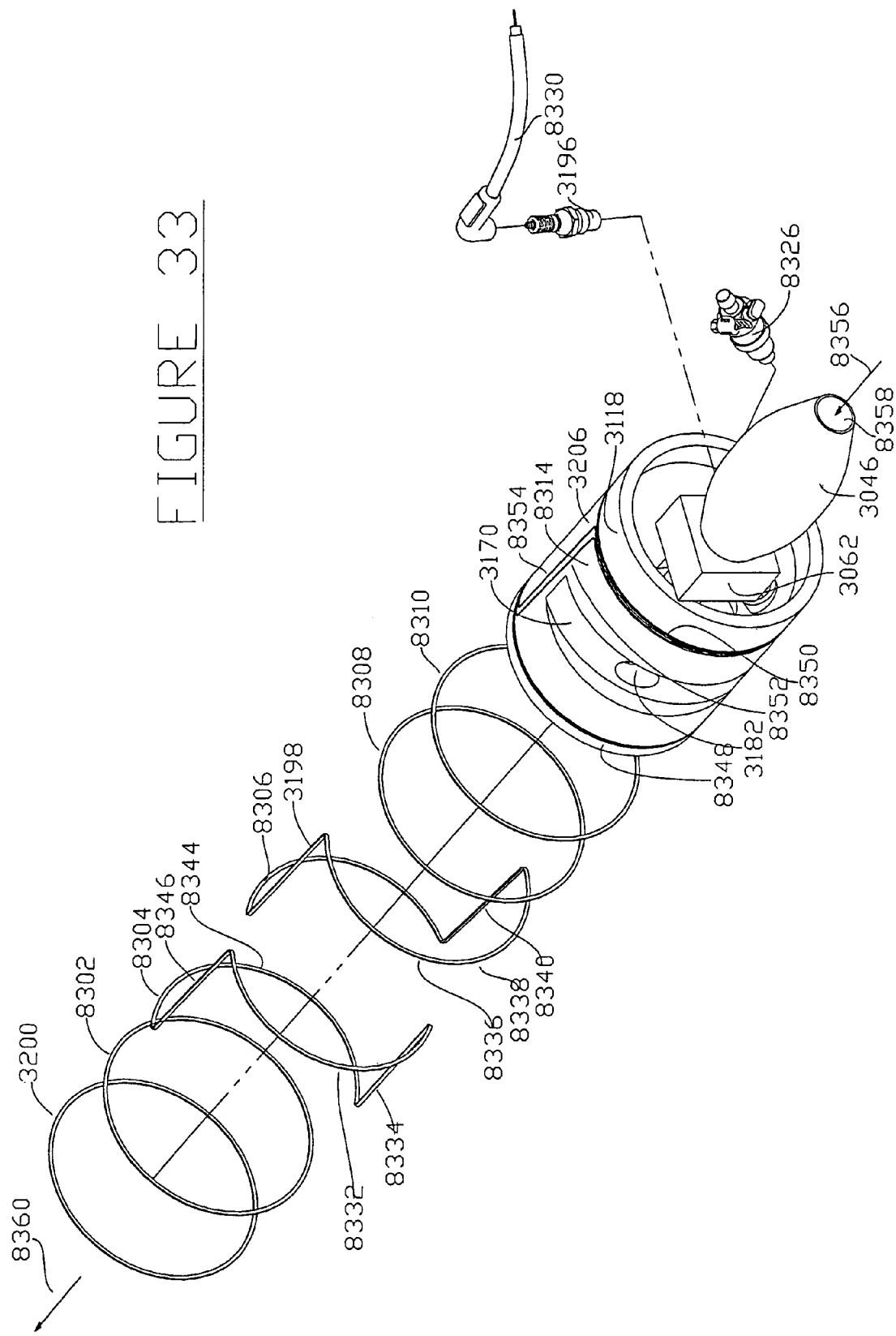
FIG. 33 shows an exploded view of the E-VVORP engine combustion rotor intake and exhaust manifold with fuel injector and spark plug.

Modified piston rings 3200 and 3198 are arranged to fit in machined grooves and to provide seals around the circumference of the manifold 3118 and also as 8318 shown in FIG. 33. Modified piston rings, also located in corresponding, suitably machined piston ring grooves, are provided around a path defining the perimeter of an area 9719 within which the air inlet port 9814 and fuel inlet port 3194 are located at a portion of the cylindrically profiled, outer surface of manifold cylinder 3118. The modified piston rings also define an area 3202 surrounded by modified piston rings in corresponding machined grooves in which the exhaust port is located, thereby substantially isolating the exhaust section 3202 with recess 3190 from the area shown as 3204 with fuel injection port 3194 (see FIG. 25B) and as shown in FIG. 39, and air injection port 3192 also in area section 3204.

An ignition (and combustion) section 3206, as shown in FIG. 25B and also in FIG. 33, with spark plug 3065 and spark plug lead 8330 wherein spark plug 3065 is fastened by a normal threaded spark plug arrangement into port 3196 located within section 3206. Exhaust channel 3190 connects to exhaust port 3182 via exhaust pipe 3150. The exhaust recess 3190 and the size of area 3204 can be arranged to be smaller or larger and as may be suitable to enhance or reduce the E-VVORP engine performance. In a broad aspect of the present invention it should be appreciated that a reduction of the size of area 3204 and/or reducing the length and/or width of exhaust recess 3190, the period of time available to allow pressurized exhaust gases to escape from the space above each piston would be reduced correspondingly. However such a restriction would also reduce the exposure of adjacent cylinder pressurized exhaust gases to a common exhaust port at the same time.

During the expansion phase of pressurized exhaust gases that are escaping from any particular cylinder combustion chamber (i.e., the space above each piston) a "shock" wave is created as the gases suddenly expand into an exhaust port. This shock wave can be arranged, by adjusting the relative timing of each cylinder exhausting phase, to enhance a more rapid removal of exhaust gases from the combustion chamber. Such exhaust phase (cycle) shock waves can interfere with efficient exhausting if adjacent exhausting phases coincide such as at a time which will cause such interference. It can therefore be seen that adjusting the area shown as 3204 and/or the profile of the exhaust recess and port 3183 can be optimized to enable efficient exhausting of exhaust gases.

A seven cylinder combustion rotor 3134 with central opening 3191 and seven cylinders bored therein such as 3133 is shown attached to sun gear 3145 with gear teeth 3146. Gear teeth 3146, in turn, engage with planetary gears 3142, 3144, and 3140 respectively which are mounted on gear pins 3186, 3188, and 3184. Said planetary gears in turn engage with gear teeth 3143 on the internal circumference of member 3141 with central opening 3139. Servo drive 3048 is arranged to drive worm gear 3180 which engages with worm wheel 3124 at 3123. Piston 3170 engages with combustion rotor cylinder 3133 and pistons 3158, 3160, 3162, 3164, 3166 and 3168 respectively engage with combustion ring 3134 also. Connecting rods such as 3154 connect to crank ring 3122 at pin 3172 and pin 3156 connects rod 3154 to piston 3158. Crank ring 3122 engages with white metal bearings 3130 with inner surface 3174 at 3825 and 3128 engages crank ring at inner surface 3174.

Suitably machined white metal bearings (journal bearings) 3128 and 3130 are arranged to engage with a suitably intimate contacting surface with the inner surface 3819 around the internal circumference of eccentric 3042. Eccentric 3042, with machined worm threads 3114 engaging with worm gear 3102 is driven by controlled and variable speed servo motor 3038. Referring now to FIG. 25B, another view of the combustion manifold 3118 is shown. Combustion manifold 3118 with air expansion and accumulation vessel 3046 with space 8358 therein is connected via pressure and mass flow transducer 3062. Fuel injector 3097 and spark plug lead 8330 are shown, and spark plug combustion chamber recess 3196 within area 3206 having a perimeter defined by piston rings 3200 and 3198. Exhaust recess 3190 is shown in area 3202 with area 3204 enclosing fuel injection port 3194 and air injection port 9184.

Figure 25:
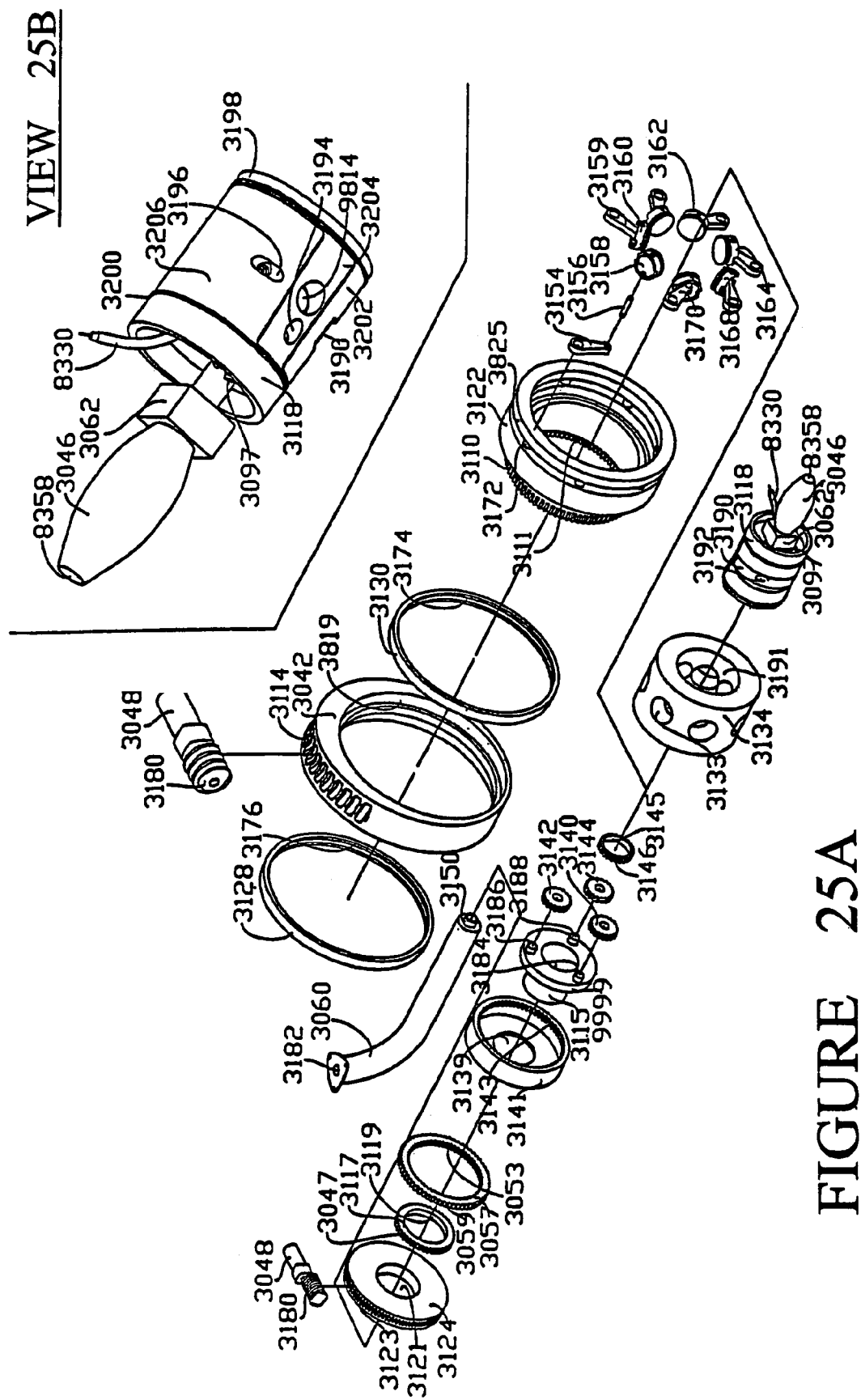
FIG. 25 shows an exploded view of the E-VVORP combustion rotor assembly.

Referring now to FIG. 26 an assembly of a single piston with connecting rod pin and compression piston rings is shown. Piston 3158 is fitted with compression suitable piston rings 3220, 3218, 3216, and 3212 with oil scraper ring 3124. The piston 3158 with piston rings is connected to connecting rod 3154 at opening (little end) 3224 by pin 3156. Connecting rod 3154 is provided with opening 3222 (big end) and a suitable journal bearing (not shown) can be fitted in opening 3222 which in turn can be attached to crank ring 3122 at pin 3172 as shown in FIG. 25, in such a manner as to allow a rotating movement of said connecting rod about pin 3172 in crank ring 3122.

Figure 27:
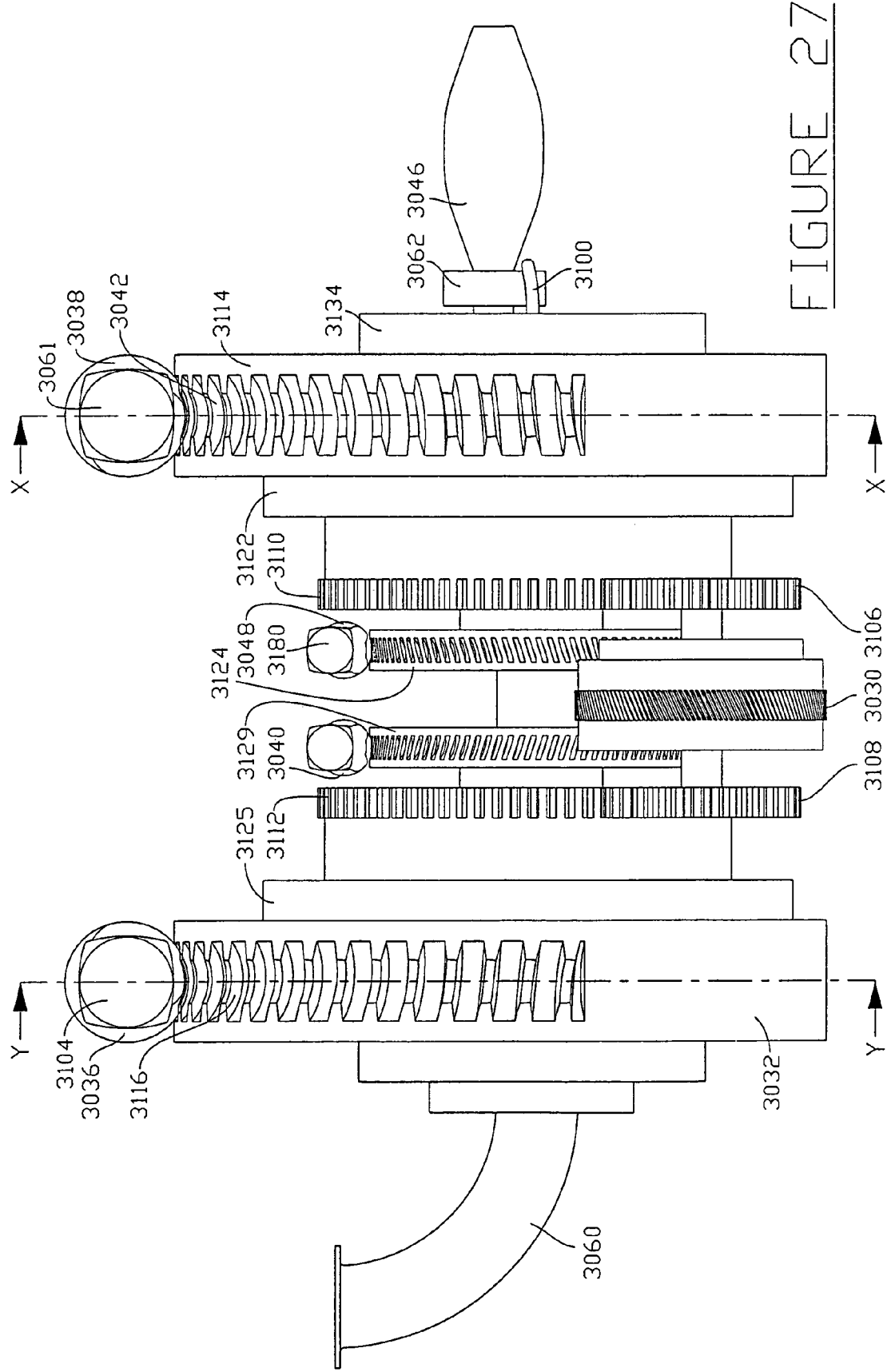
FIG. 27 shows a front elevation of the compressor and combustion components of the E-VVORP engine.

Referring now to FIG. 27, a front elevation of the compressor and combustion rotor components assembly of the E-VVORP engine, connected via first differential 3030, is shown with air inlet expansion chamber 3046 and exhaust manifold 3060. The sub assembly shown in FIG. 27 excludes the housing which can in part be seen in FIG. 36, member 9400 with the combustion and compressor sub-assemblies connected via first differential 3030 with input/output gears 3108 and 3106.

First differential input 3106 engages with gear 3110 which is attached directly to crank ring 3122. Eccentric 3042 encloses said crank ring 3122 with worm gear 3061 driven by servo motor 3038 and engaging with eccentric worm threads 3114 machined in the outer circumference of eccentric 3042. Combustion rotor 3134 is retained in position as shown. Exhaust manifold 3060 is located centrally passing from the fuel and air inlet manifold and exhaust port to which it is directly connected, directly through a central opening of the compressor. Compressor crank ring 3032 with worm threads 3116 engaged with worm gear 3104 which in turn is driven by controlled servo motor 3036. Crank ring 3125 is enclosed and retained by crank ring 3032 and connected directly to gear 3112 which in turn engages with the input/output gear 3108 of differential 3030.

Figures 28A, 28B:
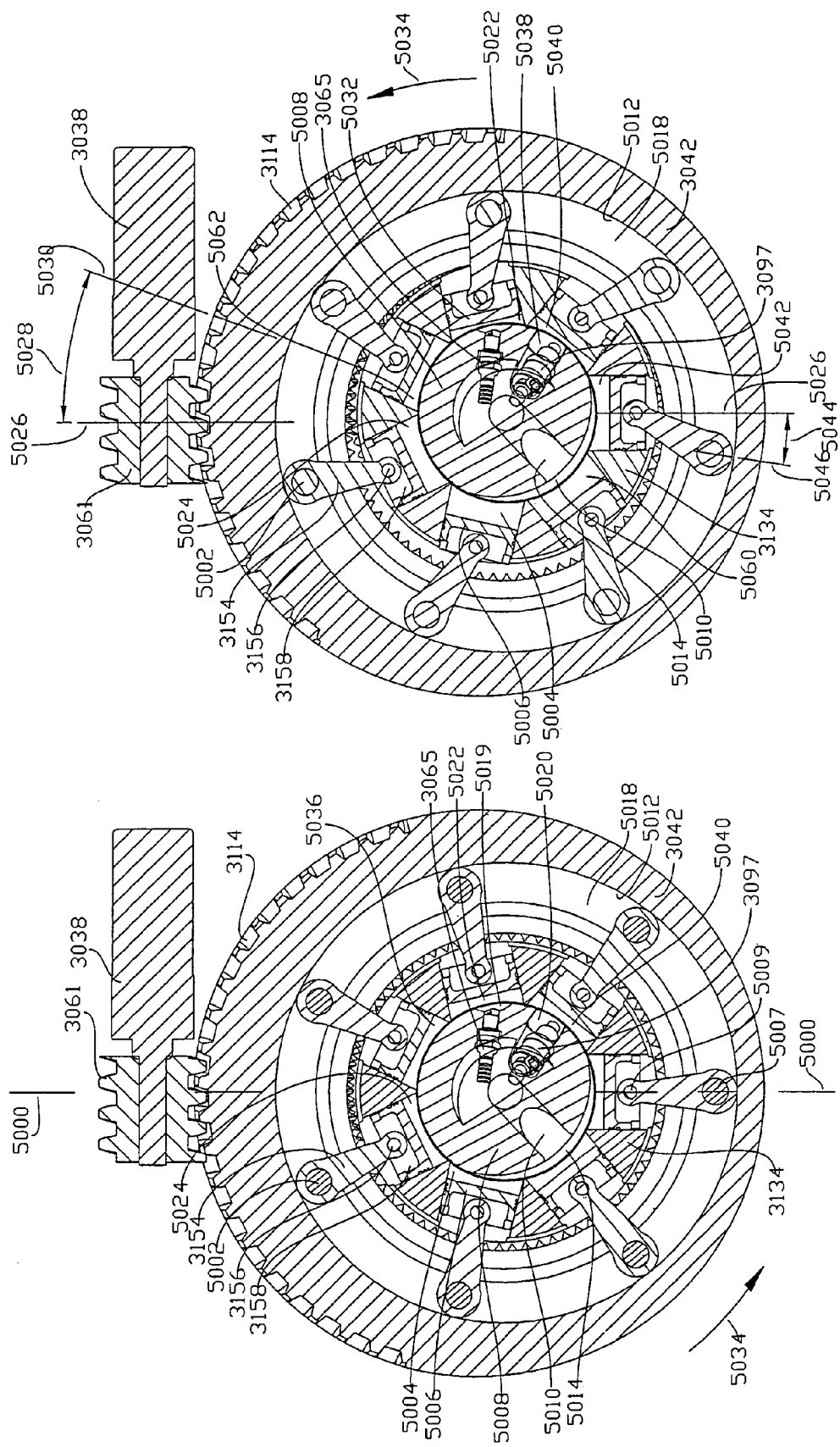
FIG. 28 shows two cross sectional views, FIG. 28A and FIG. 28B, through the X-X section shown in FIG. 27, of the combustion component of the E-VVORP engine.

Referring now to FIG. 28, two cross sectional views, FIG. 28A and FIG. 28B, through the X-X section of the combustion component of the E-VVORP engine are shown. A first cross sectional view X-X of FIG. 27 is shown in FIG. 28A. Eccentric 3042, crank ring 5018, compressor rotor 3134, and manifold 5008 are in a neutral position and positioned with common centers. In this disposition the rotation of crank ring and combustion rotor with pistons therein in the direction shown by arrow 5034 will result in no relative displacement or movement of pistons relative to the combustion rotor. In this disposition all pistons such as 3158 and 5006 including associated connecting rods and pins, with respective combustion chambers 5024 and 5004 will remain relatively static during rotation of the crank ring and rotor assembly.

A center line 5000 is shown passing through the center of piston and connecting rod pins 5007 and 5009. Center line 5000 also coincides with the center points of crank ring 5018, combustion rotor 3134, and manifold 5008. Worm gear 3061 engages with the corresponding worm threads 3114 machined in eccentric 3042. The inner circumference 5012 of eccentric 3042 is in direct and intimate contact with the outer circumferential surface of crank ring 5018. Combustion rotor 3134 is held within its outer bearing surface which is in intimate contact, engaging with corresponding bearing surface in housing 9400 in FIG. 36.

As shown in FIG. 25 three planetary gears 3140, 3144, and 3142 are mounted on bearings 3184, 3186, and 3188 which are fixed to member 3115. An opening 3121 is provided in worm wheel 3124 which in turn provides for member 3115 to be fixed to worm wheel 3124. Sun gear 3146 is fixed, with a common center, to combustion rotor 3134. Gear teeth 3143 engage with planetary gears 3140, 3142, and 3144. Member 3141 is fixed to gear 3117 at face 3119. Gear teeth 3047 engage with gear teeth 3053 on the inner circumference of member 3057. Gear teeth 3059 engage with the internal gear teeth 3111 fixed to crank ring 3122. Gear teeth 3110 engage with first differential input 3106 shown in FIG. 27.

Referring again to FIG. 28 exhaust recess 5014 connects directly with exhaust conduit 3010 in manifold 5008. Compressed air inlet port 5020 is arranged adjacent to fuel injector 3097. Spark plug 3065 is arranged to provide spark in recess 5019. Referring now to FIG. 28B (section X-X) it can be seen that servo motor 3038 with worm gear 3061 engaging with worm threads 3114 has been activated so as to rotate eccentric 3042 through an arc 5028. Said arc 5028 disposed between a vertical center line 5026 and center line 5030 shows the full extent of the movement of eccentric 3042, and it can be seen that the relative position of engine rotor 3134 has moved to an eccentric position.

Additionally servo motor 3048 as shown in FIG. 25, with worm gear 3180 engaging with worm wheel 3124 at worm threads 3123, has been activated so as to provide a controlled movement wherein the relative position of rotor 3134 and crank ring 5018 have been rotated through an arc 5044 between the extremes of center lines 5026 and 5046. The relative movements provided by servo motors 3038 and 3048 in FIG. 25 have enabled an adjustment of the relative displacement of the pistons wherein piston 5006 shows a substantially full displacement capacity in space 5004, compared with minimum displacement capacity shown in space 5022 directly between piston 5032 and manifold 5008.

In this way, when crank ring 5018 and rotor 3134, with pistons and connecting rods such as 3158 and 3154 respectively with connecting pins 3156 and 5002, are collectively rotated in the direction shown by arrow 5034, the relative movement of pistons such as 5032, 3158, 5006, follow a relative reciprocating action or movement showing a maximum displacement in position shown by space 5004 and minimum displacement shown by space 5022.

In a further broad aspect of the present invention, it should be appreciated that two independent movements enable the controlled and infinitely variability of piston displacement in the E-VVOPRP engine between limits that can be established according to the correspondingly variable capacity and output of any selected engine size. Referring again to FIG. 28, a first rotating movement of eccentric ring 3042, by servo driven worm gear 3061 engaged with worm wheel 3042, causes an offsetting of the crank ring 5018 (also shown as 3122 in FIG. 27) center point in relation to combustion rotor 3134 center point. A second rotating movement of the crank ring 5018, by controlled servo motor 3048 driving of worm gear 3180 engaged with worm wheel 3124, relative to the combustion rotor 3134 has the consequence of reducing the effective and relative stroke of the pistons, such as 5032, within the corresponding rotor 3134 cylinder.

Such an adjustment of the length of the piston stroke enables a corresponding adjustment of the rotor position relative to the crank ring position, with connecting rod assemblies attached thereto. In this way the compression of gases, such as a fuel mixture, injected into the enclosed space 9830 between the upper surface of any particular piston in the position shown as piston 9820 of FIG. 39B and the centrally located manifold 8318, expands, during a revolution of the crank ring and rotor assembly, to a maximum displacement (cubic capacity) as shown in space 9808 as shown between the upper surface of any particular piston in the position shown as piston 9820 and the centrally located manifold 8318. The effective displacement and compression ratio (i.e. volume of displacement at space 9827 proportionate to the cubic capacity of displacement at space 9808) can therefore be adjusted in a controlled manner by servo drives 3038 in FIG. 28 and 3048 in FIG. 17.

In another preferred embodiment the profile of manifold 5008 can be modified so as to facilitate improved sealing, in a liquid and gas tight manner, between the modified piston rings, such as 8344 in FIG. 33, located in suitably machined piston ring grooves provided in the manifold 5008. For example, while the profile of the manifold, as detailed in FIG. 28 is cylindrical, an alternative profile such as a "ring" or "doughnut" shaped manifold profile may be provided. In this instance a series of piston ring segments may be arranged located in parallel, correspondingly machined piston ring, segmented grooves, which are also parallel to the manifold centerline and wherein the piston ring segments each have two ends in direct and intimate contact, under suitable pressure, with the outer, circular piston rings arranged at each side of the manifold which are perpendicular to the manifold center line.

Referring now to FIG. 29, two cross sectional views FIG. 29A and FIG. 29B, through the X-X section of the combustion component of the E-VVORP engine are shown. Centerline 5026 and centerline 5033 are shown with arc 5028 in FIG. 29A. Referring to FIG. 29B centerline 5026 and centerline 5068 with arc 5048 is shown and in this disposition, it can be seen that combustion rotor 3134 relative to the position of crank ring 5018 is offset further than as shown in FIG. 29A. The consequence of this movement through arc 5048 is to enable an increased displacement such that space 5076 is substantially greater than space 5022 in FIG. 29B. In this way, a greater quantity of fuel mixture can be ignited when injected into space 5078 prior to compression and ignition.

Referring now to FIG. 30, two cross sectional views FIG. 30A and FIG. 30B, through the Y-Y section of the compressor rotor assembly of the E-VVORP engine are shown. In view FIG. 30A a perpendicular center line 7000 intersects the common center point of the crank ring 3032, compressor rotor 7016 and manifold 7014. In this condition the relative displacement of pistons such as 7010 and 7060 is static and spaces at 7030, 7026, 7032, 7040, 7042, 7056, and 7058 remain constant during a rotation of the crank ring, rotor and respective piston and crank shaft assembly. In FIG. 30B, however, the eccentric 3032 has been rotated through an arc 7072 between center lines 7070 and 7074 by servo motor 3036 and worm gear 3104. In this condition it can be seen that the displacement by pistons 7010, 7078, 7034, 7036, 7052, 7096 and 7060 progressively changes the volume of the spaces 7016, 7104, 7102, 7100, 7098, 7018 and 7030 respectively. It can be seen that the space 7102 is reduced substantially relative to space 7030. As crank ring 7006 and rotor 7016, with piston and connecting rod assemblies, rotate in the direction shown by arrow 7200, air drawn into space 7018 is compressed and can exit at port 7024 after compression.

Referring now to FIG. 31, two cross sectional views, FIG. 31A and FIG. 31B, through the Y-Y section of the compressor component of the E-VVORP engine are shown. FIG. 31A is as described in FIG. 30A and FIG. 30B shows a condition where crank ring 3032 has been rotated through an arc 7080 between center lines 7070 and 3082. In this condition space 7094 can be seen to be substantially greater than space 7112. When the crank ring and the rotor assembly is rotated in the direction shown by arrow 7200 air drawn in via port 7020 and recess 7018 (which can be shortened as required) is compressed and exits via port 7024 with recess 7022 which can also be adjusted in size to maximize the efficiency of the compressor rotor.

Referring now to FIG. 32 an exploded view of the compressor rotor of the E-VVORP engine is shown. Eccentric 8035 with machined worm threads 3116 are arranged to engage with worm gear 3104 and worm drive 3036 attached thereto. Eccentric 8035 is provided with machined surfaces 8038 and 8034. White metal bearing or other suitable bearing 8036, mates with surface 8038 and white metal bearing or other suitable metal bearing 8032 engages with surface 8034. Inner surface of 8036 engages with crank ring 3125 at surface 8028 and the inner surface of bearing 8032 engages with crank ring outer circumferential surface at 8030. Crank ring 3125 is machined to provide external gear 3112 and internal gear 8023. Seven pins such as 8026 are provided in crank ring 3125 and spaced equidistantly so as to engage with connecting rods such as 8022, 8016 and 8008.

Piston 8018 is connected to connecting rod 8022 by pin 8020. Pistons such as 8018, 8012, 8010 and 8006 are arranged to engage with cylinders such 8002 in rotor 8000. Sun gear 8068 is rigidly attached and fixed to rotor 8000. Planet gears 8074, 8064, and 8076 are mounted on pins 8072, 8062, and 8066 respectively and engage with sun gear 8068 and internal gear 8060 machined in member 8056. Member 8056 is provided with centrally disposed opening 8058 enabling penetration with clearance of member 8070. Gear 8048 is rigidly fixed and attached to member 8056 and external gears 8046 engage with internal gear 8054 of gear 8052. External gears 8050 of gear 8052 engage with internal gear 8023 in crank ring 3125.

Worm wheel 8042 is rigidly attached to member 8070 at 8044 and engages with worm gear 8040 at 3129. Servo motor 3040 is arranged to drive worm gear 8040 so as to rotate worm wheel 8042 and correspondingly member 8070 with planet gears such as 8074 mounted thereto. Such controlled rotation of worm wheel 8042 adjusts the effective stroke of pistons such as 8018 in cylinders such as 8002 of rotor 8000. The rotation of eccentric 8035 enables the adjustment of an offset between crank ring 3125 and rotor 8000, thereby enabling a corresponding adjustment of the displacement of each cylinder and therefore its capacity to compress variable quantities of air, or alternatively enable its use as a pneumatic motor.

Referring now to FIG. 33 an exploded view of the combustion manifold of the E-VVORP engine is shown. The combustion manifold 3118 corresponds with the combustion manifold and assembly as shown in FIG. 25 and in particular FIG. 25B thereof. Compressed air is transferred in the direction shown by arrow 8356 into space 8358 of accumulator 3046. Pressure and mass flow transducer 3062 enables measurement of compressed air provided prior to transfer into combustion rotor 3118 thereby enabling control thereof.

Compression piston rings 3200 and 8302 are arranged to fit parallel piston ring grooves at 8348. Compression piston rings 8308 and 8310 are arranged to fit in parallel grooves machined at 8350. Profile piston rings are arranged to fit in corresponding grooves such as 8354 and 8352 in parallel adjacent proximity thereby enclosing area 8314 with separation of area 3206 as shown. Profiled piston ring 8352 is arranged with offset segments 8332 and 8344 by parallel relatively straight sections 8344 and 8346, and arranged to fit in groove 8352 of manifold 3118. Corresponding and parallel piston ring with segments 8338 and 8306 is also arranged with relatively straight sections 3198 and 8340 and in a manner enabling positioning in corresponding piston ring groove 8354. External edge such as 8338 can be machined or surface ground to provide a profile that will contact intimately and enable sealing thereby between manifold 3118 and the corresponding combustion rotor 3134 as shown in FIG. 25.

Figure 34:
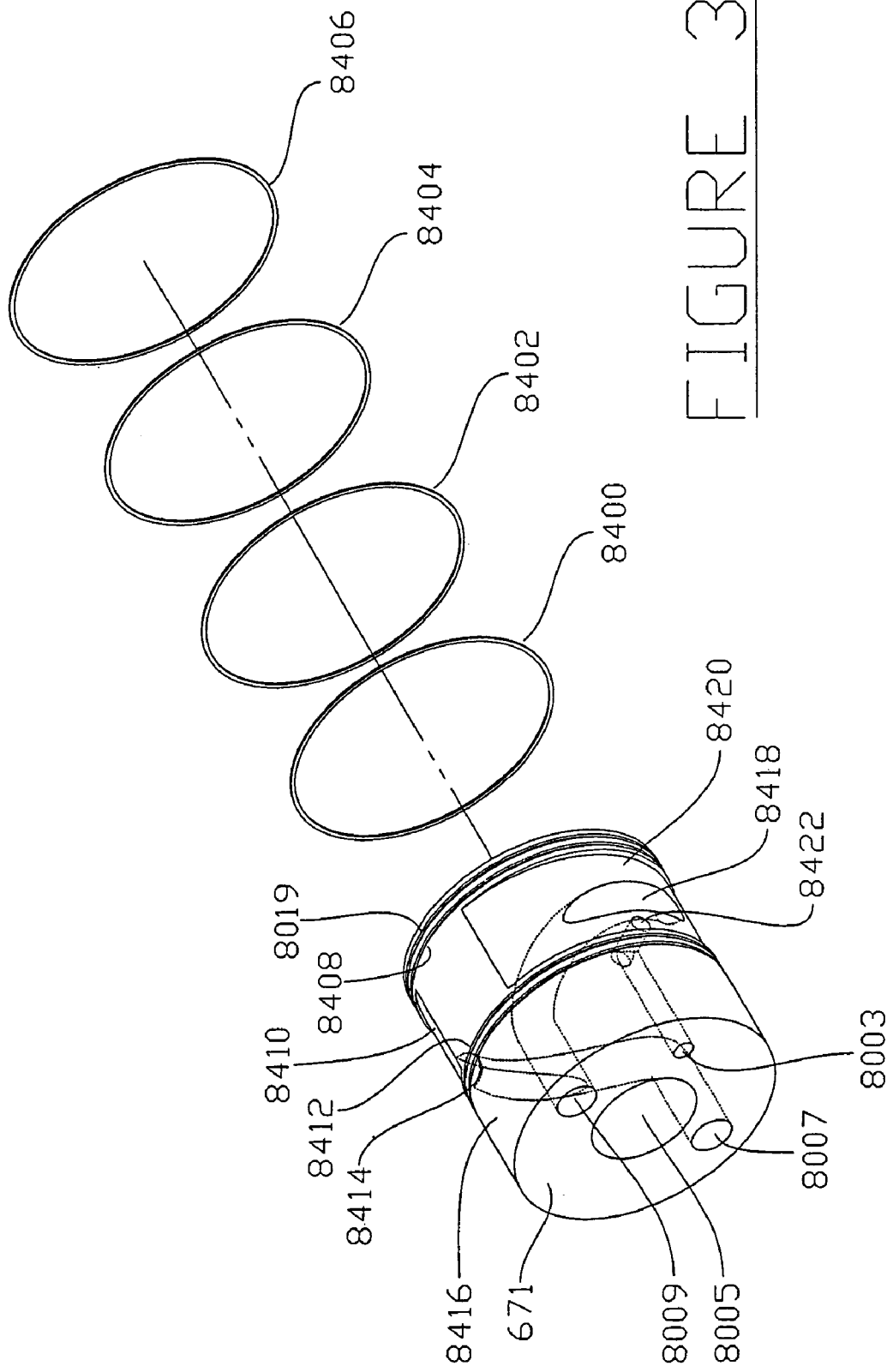
FIG. 34 shows an exploded view of the E-VVORP engine compressor rotor air and steam inlet and outlet ports.

Referring now to FIG. 34 an exploded view of the compressor rotor of the E-VVORP engine is shown. Manifold 671 is shown in 3-D view disposition with piston ring grooves 8414 and 8412 which correspond with piston rings 8400 and 8402 respectively. Piston ring grooves 8408 and 8019 correspond with piston rings 8404 8406. The piston rings are arranged in parallel pairs with a pair on each side of port 8418 in recess 8420. An additional steam conduit with injection port 8003 connecting to port 8422 which is also enclosed within recess 8420. Port 8007 allows intake or egress of compressed air and connects directly via a conduit to recess 8410. Port 8009 similarly allows intake or egress of compressed air and connects directly to port 8418 located in recess 8420 via a conduit.

Figure 35:
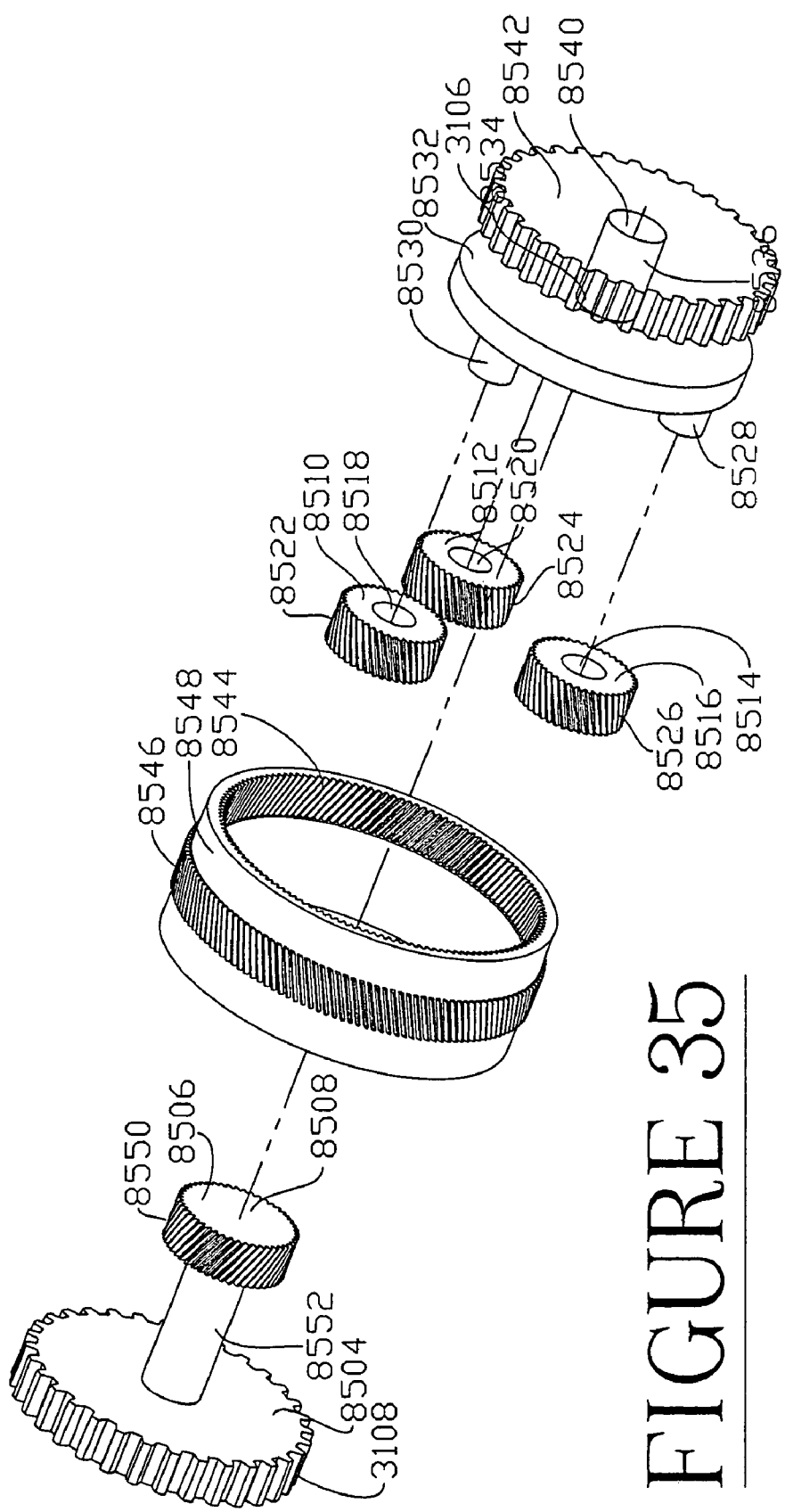
FIG. 35 shows an exploded view of the E-VVORP engine first differential assembly.

Referring now to FIG. 35 an exploded view of the first differential of the E-VVORP engine is shown. The exploded view of first differential as shown in FIG. 35 corresponds with the differential 3030 for example, as shown in FIG. 17. Member 8532 is rigidly fixed and attached to gear 8542 with gear teeth 3106 machined therein. Corresponding planet gears 8510 and 8516 are mounted on pins 8530 and 8528 respectively, and a third planet gear 8512 with opening 8520 is mounted on a third pin not visible in this view. External gear teeth 8522, 8524 and 8526 of each planet gear engage with internal gear teeth 8544. Sun gear 8506 rigidly attached to gear 8504 with machined gear teeth 3108 by shaft 8552 is arranged such that gear teeth 8550 engage with planet gear teeth 8522, 8524 and 8526. Gear teeth 8546 machined on external circumference of member 8548 provide a driving connection.

The first differential as shown in FIG. 35 corresponds with the first differential 3030 in FIG. 17 which is arranged in typical differential configuration wherein gear teeth 3108 of gear 8504 represent a first input/output connection to the first differential, gear teeth 3106 of gear 8542 represent a second input/output connection of said first differential and gear teeth 8546 of member 8548 represent a third input/output connection of the first differential. Such first, second and third input/output connections are represented and shown in FIG. 42 below.

Figure 36:
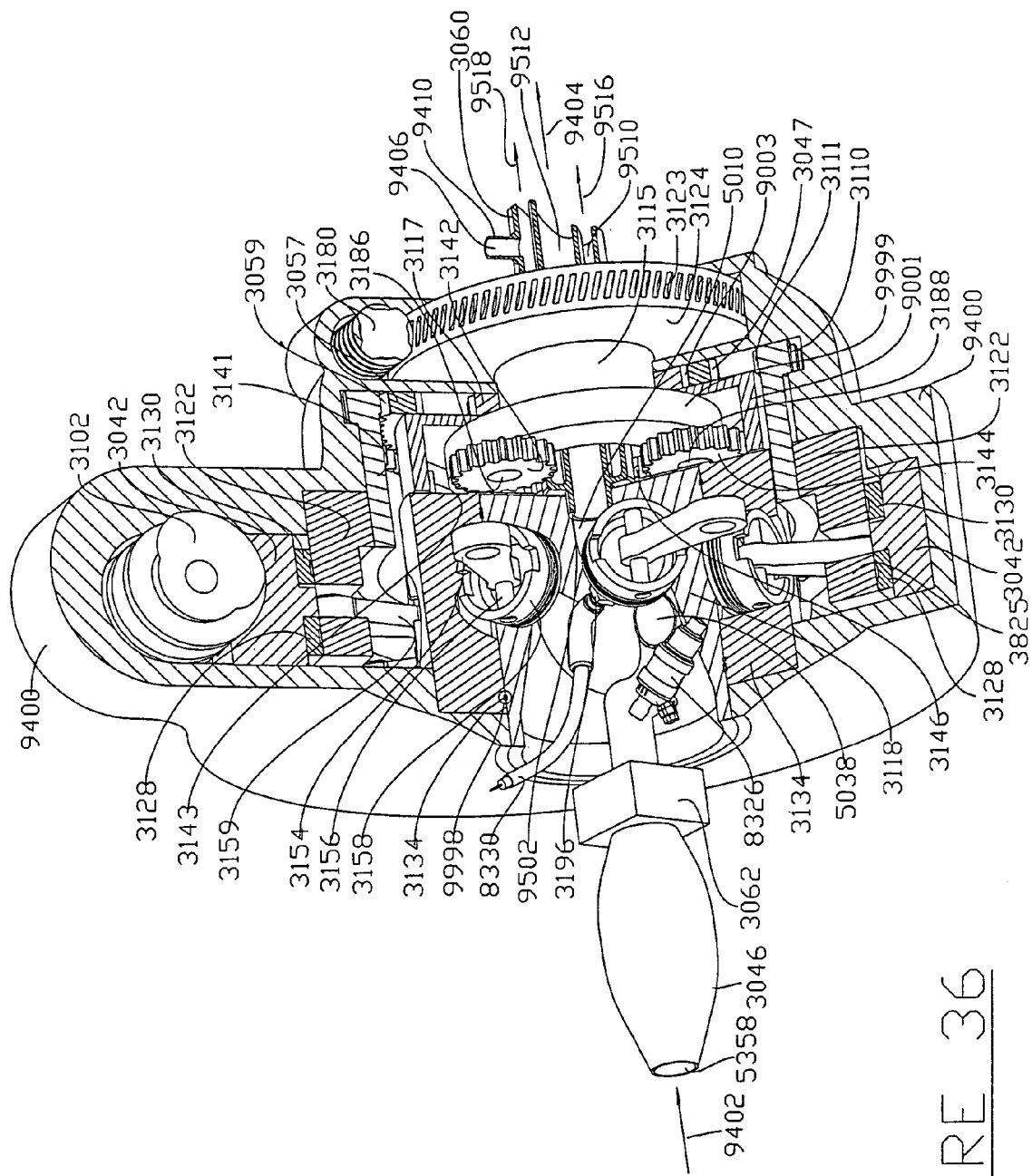
FIG. 36 shows a 3-D view of the E-VVORP engine with a cut-away section.

Referring now to FIG. 36 a 3-D view with cutaway section of the E-VVORP engine combustion component is shown. Housing 9400 encloses the engine crank ring 3122, bearings 3128 and 3130 in direct and intimate contact with eccentric 3042. Worm gear 3102 engages with eccentric 3042. Combustion rotor 3134 with manifold 3118 in direct contact with the centrally disposed opening of the rotor 3134 is provided with sufficient clearance to enable the substantially free variable speed rotation of rotor 3134 about manifold 3118. Piston ring seals are shown such as 9998. Connecting rods such as 3154 and 3159 can be seen with piston 3158 connected to 3154 at pin 3156. Exhaust port 5010 is connected to adjacent exhaust manifold at 9502. Compressed air provided in the direction shown by arrow 9402 into space 5358 of accumulator 3046, which connects directly with pressure and mass flow transducer 3062. Compressed air supplied enters manifold 3118 at port 5038. Injector 5326 has been superimposed to show its relative position in the cutaway section of the 3-D view.

Spark plug 3196 with electrical supply connection 8330 is shown in position in manifold 3118. Member 3141 is rigidly attached to crank ring 3122 and internal machined gear teeth at 3111 engage with teeth 3059 of gear 3057. Gear 3117 with gear teeth 9003 is rigidly attached to member 9001 and gear teeth 9003 engage with internal gear teeth of gear 3057. External gear teeth 3059 of gear 3057 engage with internal gear teeth 3111 of member 3141 which in turn is rigidly attached to crank ring 3122. Member 3115 is rigidly attached to worm wheel 3124 and machined worm threads 3123 are arranged to engage with worm gear 3180. Member 3115 is rigidly attached to member 9999 and planetary gears such as 3142 and 3144 are mounted to pins 3186 and 3188 respectively about which said planet gears can freely rotate. Planet gears such as 3142 and 3144 engage with internal gears 3143 machined in member 9001.

Housing 9400 is suitably profiled to enable member 3115 to rotate on a bearing provided but not shown. Exhaust conduit 9512 allows exhausting of gases in direction shown by arrow 9404. Annular space 9510 is enclosed by exhaust manifold 3060 and port 9406 in connection 9410 is provided to allow ejection of measured quantities of water into space 9510. Water injected into space 9510 provides cooling means and also the generation of steam which can flow in the direction shown by arrows 9518 and 9516. Such steam can subsequently be used to assist in driving compressor rotor of the E-VVORP engine.

Referring now to FIG. 37 a cross sectional view of exhaust manifold 3060 is shown. Hot exhaust gases are transferred directly from the E-VVORP exhaust port in connection with exhaust conduit end 9052, in the direction shown by arrow 9500. Hot exhaust gases can therefore flow along conduit 3150 in space 9512 and exit manifold 3060 at port 3182 in the direction shown by arrow 9404. A flange 9504 is conveniently provided to enable connection to a further section of exhaust conduit. Annular space 3152 enclosed by exhaust conduit 3060 with connection 9410 providing port 9406 enabling the injection of measured quantities of water or other fluids in the direction shown by arrow 9508. Measured quantities of fluids such as water injected into space 3152 via port 9406 will be subjected to very high temperatures and will therefore vaporize to produce steam. Steam will therefore travel in the direction shown by arrows 9518 and 9516 and can be extracted at port 3071 in the direction shown by arrow 9506. Steam extracted from port 3071 can be controlled by suitable valves and diverted via suitable piping and/or conduits, which can be connected directly to the compressor rotor of the E-VVORP engine, and in particular to port 8003 as shown in FIG. 34.

Figure 38:
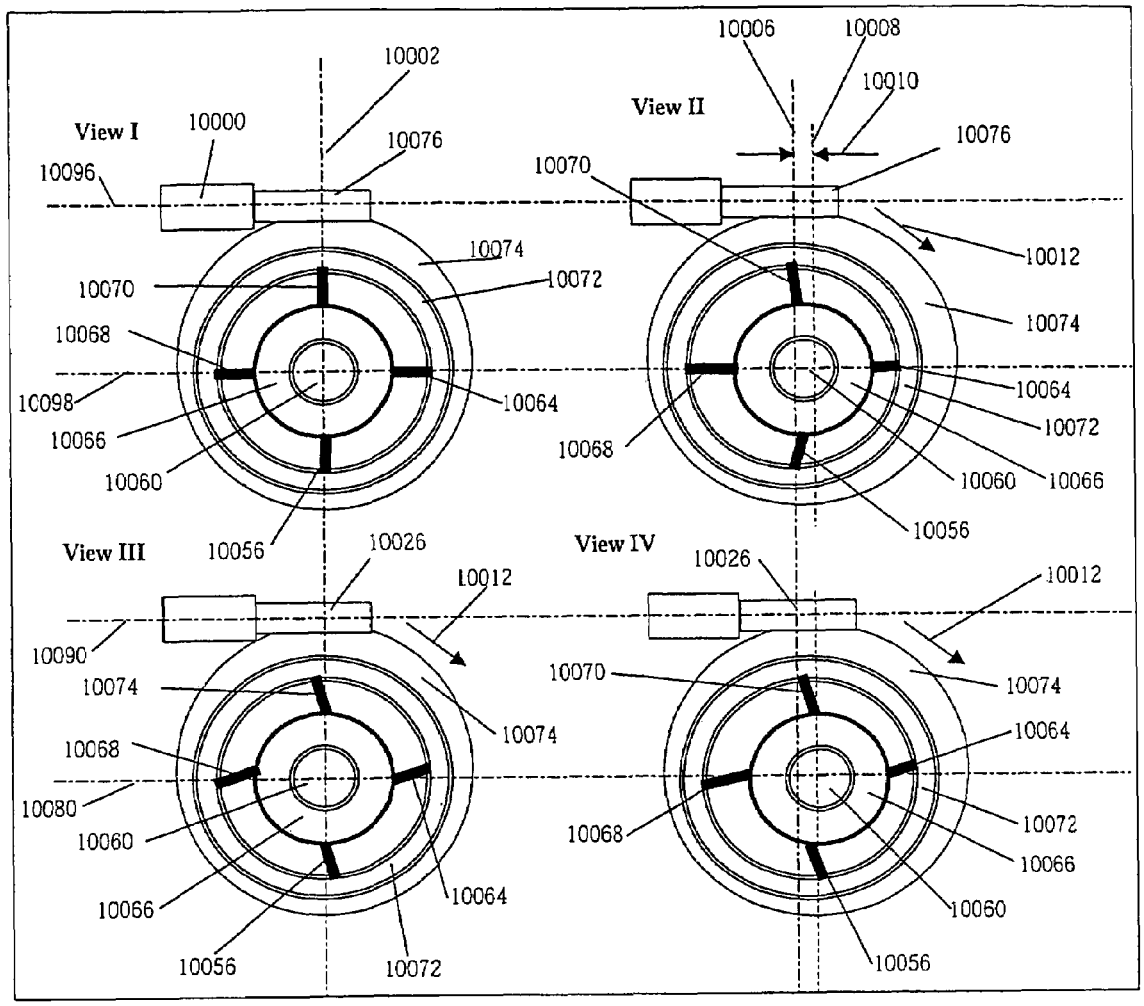
FIG. 38 includes four diagrammatic views detailing the cause and effect of adjustment of an eccentric upon a crank ring, rotor manifold, and other components of an engine formed in accordance with the present invention.

Referring now to FIG. 38, views I, II, III and IV are in diagrammatic format for the purpose of detailing the action of eccentric 10074, crank ring 10072, rotor 10066 and manifold 10060. In this instance four connecting rods are shown as 10070, 10064, 10056 and 10068. View I shows eccentric 10074, crank ring 10072, rotor 10066 and manifold 10060 concentrically positioned and all having a common center point at the intersection of perpendicular center line 10002 and horizontal center line 10098. In this condition when rotor 10066 and crank ring 10072, with corresponding connecting rods as shown, rotate together, pistons such as 3158 and 5006 in FIG. 28 will not reciprocate within their respective cylinders and space shown as 5024 and 5004 will remain constant.

Referring now to View II of FIG. 38 it can be seen that rotor 10066 is offset relative to crank ring 10072. The offset 10010 being the distance between perpendicular center line 10006 which intersects the center point of crank ring 10072 and the perpendicular center line 10008 which intersects the center point of rotor 10066 with manifold 10060 therein. Referring now to View III the center point of eccentric 10074, crank ring 10072, rotor 10066 and manifold 10060 are aligned together, however crank ring 10072 has been rotated through an arc in the direction shown by arrow 10012 while rotor 10066 is relatively fixed. This rotation causes the connecting rods 10070, 10064, 10056 and 10068 to change position as shown. However, the perpendicular center line 10002 and horizontal center line 10080 intersects at the center point of crank ring 10072 and rotor 10066.

Referring now to View IV it can be seen that crank ring 10072 and eccentric 10074 have both been rotated in the direction shown by arrow 10012 resulting in an offsetting of rotor 10066 and manifold 10060 relative to crank ring 10072, in addition to the adjustment of connecting rods 10070, 10064, 10056 and 10068 as shown. In this way the displacement of pistons such as 3158 and 5006 in FIG. 28 can be varied by the rotation of crank ring 3042 driven by servo drive 3038 (as shown in FIG. 28), and servo drive attached to worm gear 3180 as shown in FIG. 36.

Referring now to FIG. 39, a diagrammatic representation of various E-VVORP engine configurations, wherein the center point of each crank ring, rotor and manifold member are shown in relation to each other according to E-VVORP engine operating modes. FIG. 39C shows a section of manifold 8318 with two piston rings 8354 and 8352 recessed in grooves machined therein. A crank ring 3122 with combustion rotor 3134, pistons such as 9805 and 9810 with connecting rods such as 9801, is shown. The direction of rotation is shown by arrow 9806 and during a single revolution comprising a two stroke cycle of the E-VVORP engine. Pistons reciprocate in their respective cylinders in combustion rotor 3134. It can be seen that space 9808 is substantially greater than the space 9827 shown in FIG. 39B. Injector 8326 is shown injecting fuel in a spray 9816 and compressed air is injected into space 9830 via port 9814 in the direction shown by arrows 5022 and 9818. After compression fuel mixture in space 9827 is ignited by spark 9828 provided by spark plug 3196 above piston 5032. After expansion, exhaust gases are transferred from space 9808 into exhaust port 5010 in the direction shown by arrows 9800, 9802 and 9810 from spaces 9808 and 9810.

Referring now to FIG. 40 a chart showing the phases of a single cycle of the "two-stroke" phases of the E-VVORP engine, according to one broad aspect of the present invention wherein the direction of rotation is shown by arrow 9901. The two-stroke, cyclical sequences are repeated serially commencing, for example, at air intake 310 with an "overlapping" segment where air is injected while residual exhaust gases, that remain in the combustion chamber after the exhausting phase can be expelled. Air intake with fuel injection at 9906 enable a proportioned air:fuel mixture to be injected together. Compression occurs between 320 and the bottom dead center 0 followed by the ignition and combustion phase shown in red. The ignition spark is shown at 10 and the combustion and corresponding expansion providing the energy source occurs between 10 and 160. The exhaust phase 9900 commences at 160 through to 320. The phases as shown in FIG. 40 can be altered and rearranged to suit optimized performance of the E-VVORP engine as may be desired.

Figure 41:
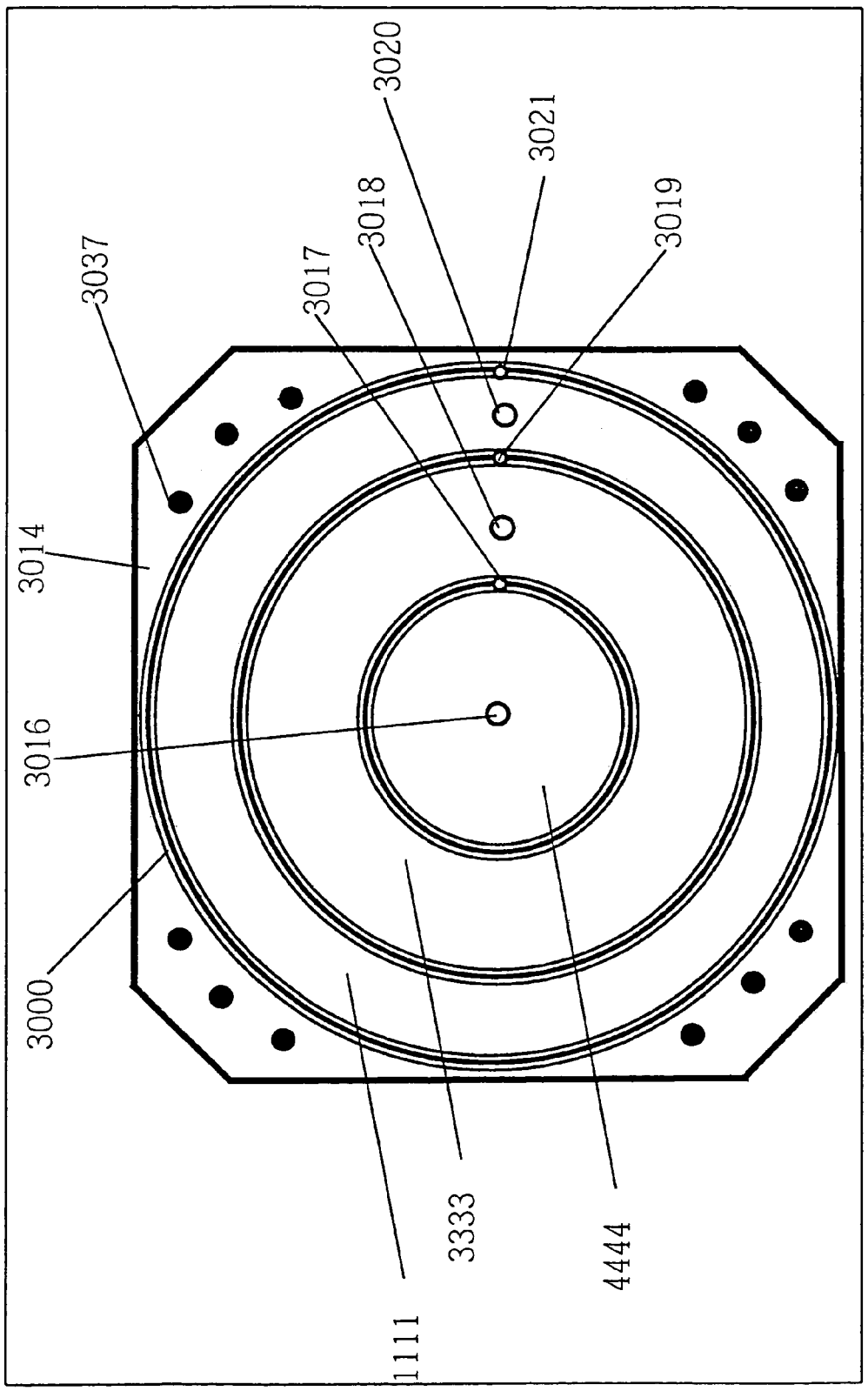
FIG. 41 shows a cross section through a series of concentric pressure vessels with interposed temperature adjusting water jackets.

Referring now to FIG. 41 a cross sectional, diagrammatic view of the concentric pressure vessels, as shown in FIG. 17, with interposed water jackets is shown. End plate 3014 is shown with external vessel wall 3000 enclosing space 1111. Pressure vessel space 3333 and space 4444 are provided with pneumatic ports 3020, 3018 and 3016. Water jackets with ports 3017, 3019 and 3021 are shown. A series of twelve tie rods such as 3037 are shown. Space 1111 can be arranged for lower pressure air. Space 3333 can be arranged to accommodate medium pressure air. Space 4444 can be arranged to store high pressure air.

Referring now to FIG. 42 a diagrammatic representation of the integration of an E-VVORP engine with the drive wheels of a vehicle is shown. A CPU is arranged to control the compressor and combustion rotors of an E-VVORP engine connected directly via a first differential. The first differential is connected via a first drive shaft to a second differential, which in turn is attached via second differential second input/output connection E and third drive shaft connection F.

Compressed air (air) can be injected via port 9814 and into that portion of the enclosed combustion chamber, such as 9827 in FIG. 39, immediately before the exhaust port at 5010 connected via recess 9810 (as shown in FIG. 39) is closed off by rotation of the piston such as 9805. This enables residual exhaust gases that can remain in the combustion chamber to be removed from the combustion chamber.

FIGS. 43-49 have been left blank intentionally.

Referring now to FIG. 50, another embodiment is shown wherein the crank is located at a central position with pistons and corresponding cylinders arranged in a radial formation about the central crank. An exploded, diagrammatic view of the screw compressor, throttle body, differential, eccentric drive assemblies, rotor, crank, pistons, connecting rods, manifold, turbocharger, and additional related components is shown. Air from atmosphere enters air filter 16810 and, after suitable filtration, is transferred to turbocharger 16710. Exhaust gasses exiting exhaust collector 16672 of engine manifold 16670, enter said turbocharger and drive exhaust turbine 16714, thereby causing compressor impeller 16712 to compress said filtered air and deliver it at a pressure of 20 psi or more or less above standard atmospheric pressure to screw compressor 16140 via throttle body 16220. Said exhaust gasses may then be released to atmosphere via any suitable exhaust arrangement such as exhaust pipe 16820. Pressure of said intake charge may be reduced or otherwise varied, as is required by dynamic engine conditions and requirements, by butterfly valve 16210 of throttle body 16220. Said butterfly valve may be operated by any suitable computer controlled actuator, so as to allow the mechanical load of said screw compressor to be increased or decreased or maintained in response to internal or external conditions and dynamic requirements. Said intake charge may then be compressed by intermeshing screws 16120 and 16130, and be elevated to any suitable pressure of between 100 psi and 300 psi or less or more, after which said compressed charge may be transferred directly to rotor manifold 16670 in any suitable manner such that the heat generated during compression is preserved until combustion. A portion of said compressed charge may be diverted through any suitable carburetor or fuel injection system such that said compressed charge may be mixed with the appropriate amount of fuel required for efficient combustion. Said means of carburetion or fuel injection may be adjusted via any suitable computer-controlled actuator or system of actuators such that fuel mixture may be dynamically varied in response to internal or external engine conditions and dynamic power requirements. Said compressed air/fuel charge may then be transferred to engine manifold 16670 via intake port 16674. Timing belt pulley 16110 is attached to said screw compressor and may be driven by timing belt pulley 16310 attached to differential output shaft 16390, via timing belt 16320. The device to which this E-VVORP embodiment is attached may be driven via timing belt 16330. Said timing belt is in mesh with timing belt pulley 16340 fixed to differential ring gear 16350. Differential planetary carrier 16370 may retain any suitable number of gears such as planet gear 16360, arranged in an equally spaced, radial configuration as shown, such that each planet gear engages with a centrally disposed gear such as sun gear 16380 and any suitable ring gear such as planetary ring gear 16350. Differential planetary carrier 16370 may be attached to crank shaft 16650. Differential sun gear 16380 may be fixed to output shaft 16390 so as to drive screw compressor 16140 via timing belt 16320 in said manner. Rotor shoulder 16470 may be bolted to engine rotor 16610 with provided bolt holes or may be otherwise attached in any suitable manner so as to support said engine rotor in rotor bearing 16472. Said rotor shoulder is provided merely as a means to improve efficiency by reducing the internal diameter of said rotor bearing, and may be eliminated to reduce complexity and rotational inertia, as long as a suitable means is provided to reduce power losses associated with said rotor bearing. Said rotor bearing may be fixed rigidly within inner eccentric member 16450. Said inner eccentric member may be located within outer eccentric member 16440. Said eccentric members may be rotated or otherwise adjusted relative to each other in any suitable manner such as the hydraulically operated gear racks held within eccentric adjustment case 16460. Eccentric rotor drive gear 16430 may be attached to rotor shoulder 16470 and may be kept in mesh with internal eccentric drive gear 16420. Said internal eccentric drive gear may be supported by any suitable bearing such as eccentric drive bearing 16422. Said eccentric drive bearing may be located within inner eccentric member 16440 and rotated about center of eccentric drive case 16405 with said gear rack arrangement. Crank shaft gear 16410 may be attached to crank shaft 16650 and may mesh with internal eccentric drive gear 16420 so as to allow rotor shoulder 16470 to be driven by said crank shaft. Eccentric drive gears 16410 and 16430 may have an identical number of teeth so as to preserve a 1:1 drive ratio between the rotor shoulder with crank shaft. Said crank shaft may be supported by any suitable bearing such as crank shaft bearing 16412. Eccentric drive assembly 16500 may be identical to eccentric drive assembly 16400 described above and may be likewise attached to crankshaft 16630 and rotor shoulder 16570. Eccentric drive assembly 16500 may be eliminated to reduce overall dimensions and to reduce system complexity as long as an alternative means of suitably supporting crankshaft 16630 and rotor shoulder 16570 is provided. Cooling fan 16660 may be attached to engine rotor 16610 to facilitate air cooling of said engine rotor.

Figure 51:
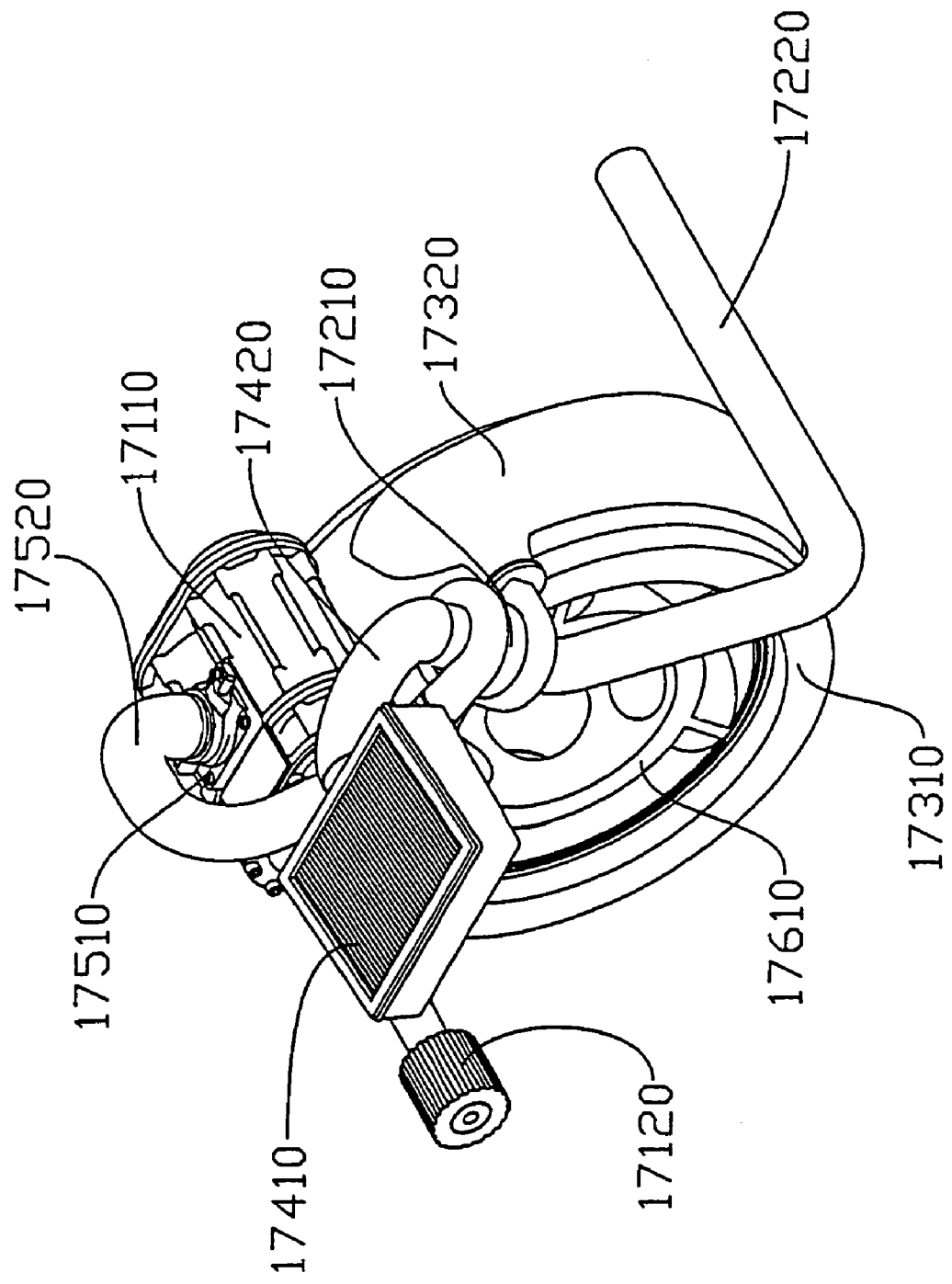
FIG. 51 is an assembled view of the combustion engine of FIG. 50.
Figure 55:
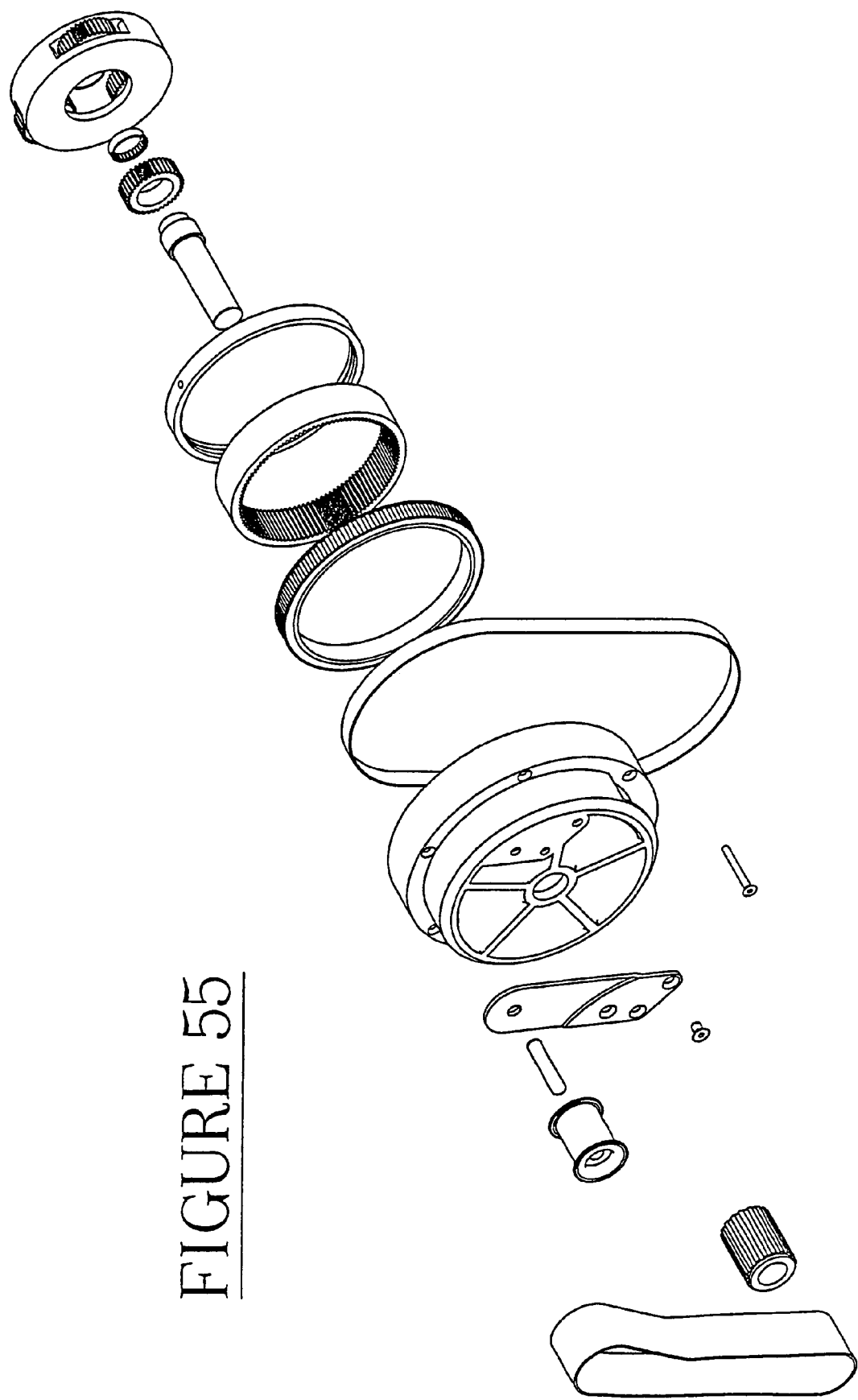
FIG. 55 is a detail view of a portion of the combustion engine depicted in FIG. 50.

Referring now to FIG. 51, a diagrammatic view of the intake and exhaust systems including a throttle body, screw compressor, compressor drive pulley, air filter, turbocharger, manifold, rotor and associated piping are shown. Although the function of this sub-assembly is described in the previous paragraph, this figure serves to show the intake and exhaust system components alone and in an assembled configuration. Air filter 17410 may serve to remove particulate contaminants from the incoming air stream, resulting in cleaner combustion and a reduced risk of wear or damage due to such particles. Subsequent to removal of such particles, air charge is delivered via intake plenum pipe 17420 to compressor side of turbocharger 17210. Turbocharger 17210 is driven by pressure of the exhaust gas exiting exhaust manifold 17320 and increases the pressure of incoming air charge by 20 psi or more or less. Exhaust gasses driving turbocharger 17210 are extracted from cylinders of engine rotor 17610 after sufficient combustion of the air-fuel charge. Exhaust pipe 17220 may connect to a noise-reducing muffler and may serve to reduce the temperature of exhaust gasses prior to their release to atmosphere. Air charge leaving compressor side of turbocharger 17210 is delivered to throttle body 17510 via intake pipe 17520. Throttle body 17510 may serve to reduce the pressure and/or flow rate of the air charge so as to vary the mechanical load on screw compressor 17110. Throttle body 17510 may be controlled by computer as described in the previous paragraph. The screw compressor may be driven from differential assembly shown in detail in FIG. 55 via timing belt pulley 17120. A portion of the air charge leaving the screw compressor may be diverted through any suitable carburetor or fuel injection system prior to combustion in engine rotor 17610.

Figure 52:
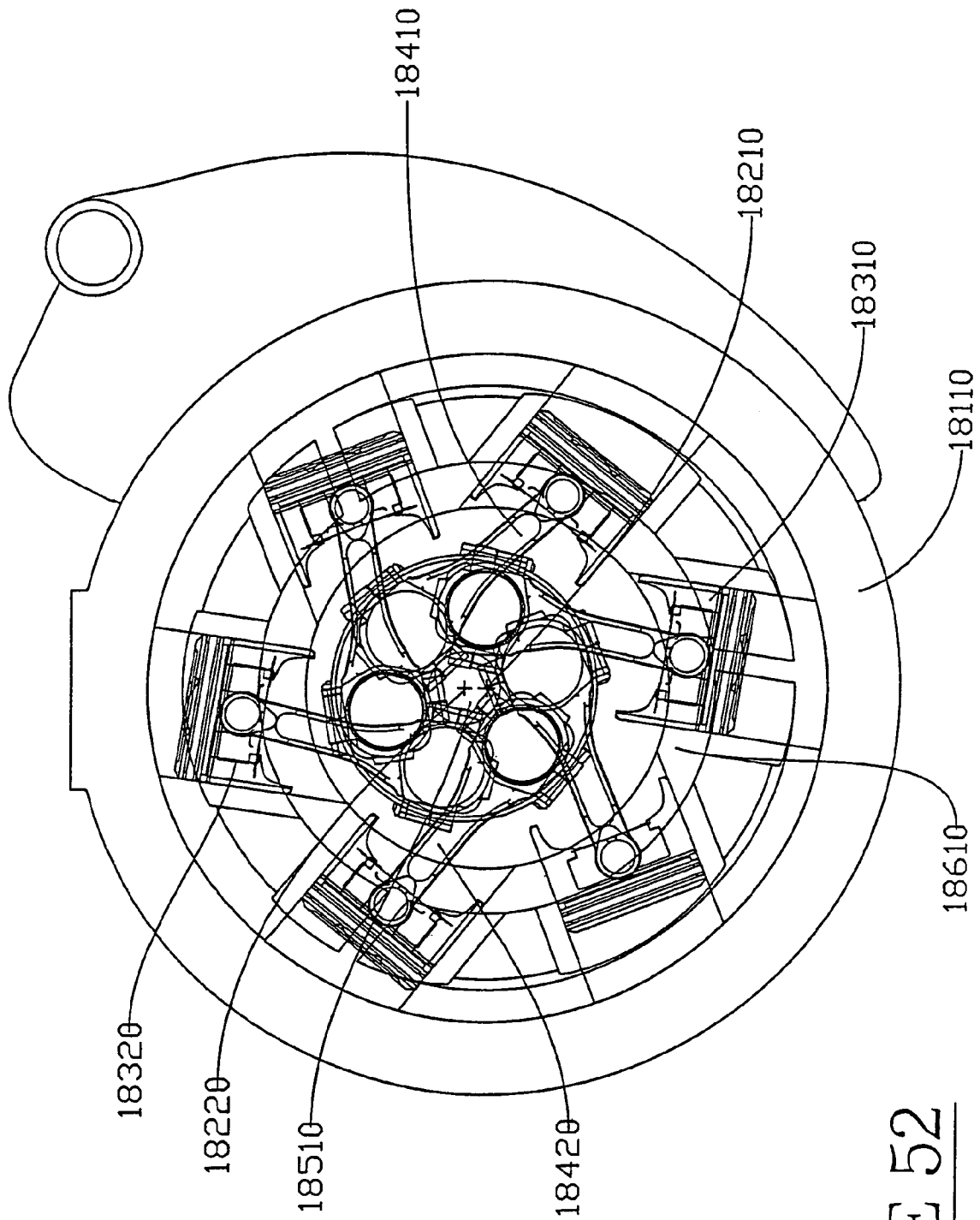
FIG. 52 is a partial cutaway side elevation view showing a main rotating assembly of the combustion engine shown in FIG. 50.

Referring now to FIG. 52, a diagrammatic view of the main rotating assembly, including the rotor, crankshaft, connecting rods, pistons, and the manifold as it is located relative to the rotating assembly. Crankshaft 18510 and rotor 18610 each rotate about their own axes, shown by center-points 18220 and 18210, respectively. Engine displacement is influenced by two factors, the eccentricity of the rotor and crankshaft, and the relative angle between the crank and the rotor. An increase in eccentricity will tend to move the piston closest to the screw compressor (not shown in this figure), hereafter referred to as top dead center, or TDC, towards the manifold, and will also tend to move the piston on the opposite side of the rotor, hereafter referred to as bottom dead center, or BDC, in the opposite direction. This eccentricity is adjusted via the mechanism detailed in FIG. 53. It is in this manner that engine displacement is primarily controlled. In order to preserve a constant distance between the face of the piston at TDC and the manifold, a relative angle between the crankshaft and the rotor is introduced that will, in the case of an increase in this angle, tend to pull all pistons towards the center of the rotating assembly, or in the case of a decrease in the angle, tend to push all pistons away.

Figure 53:
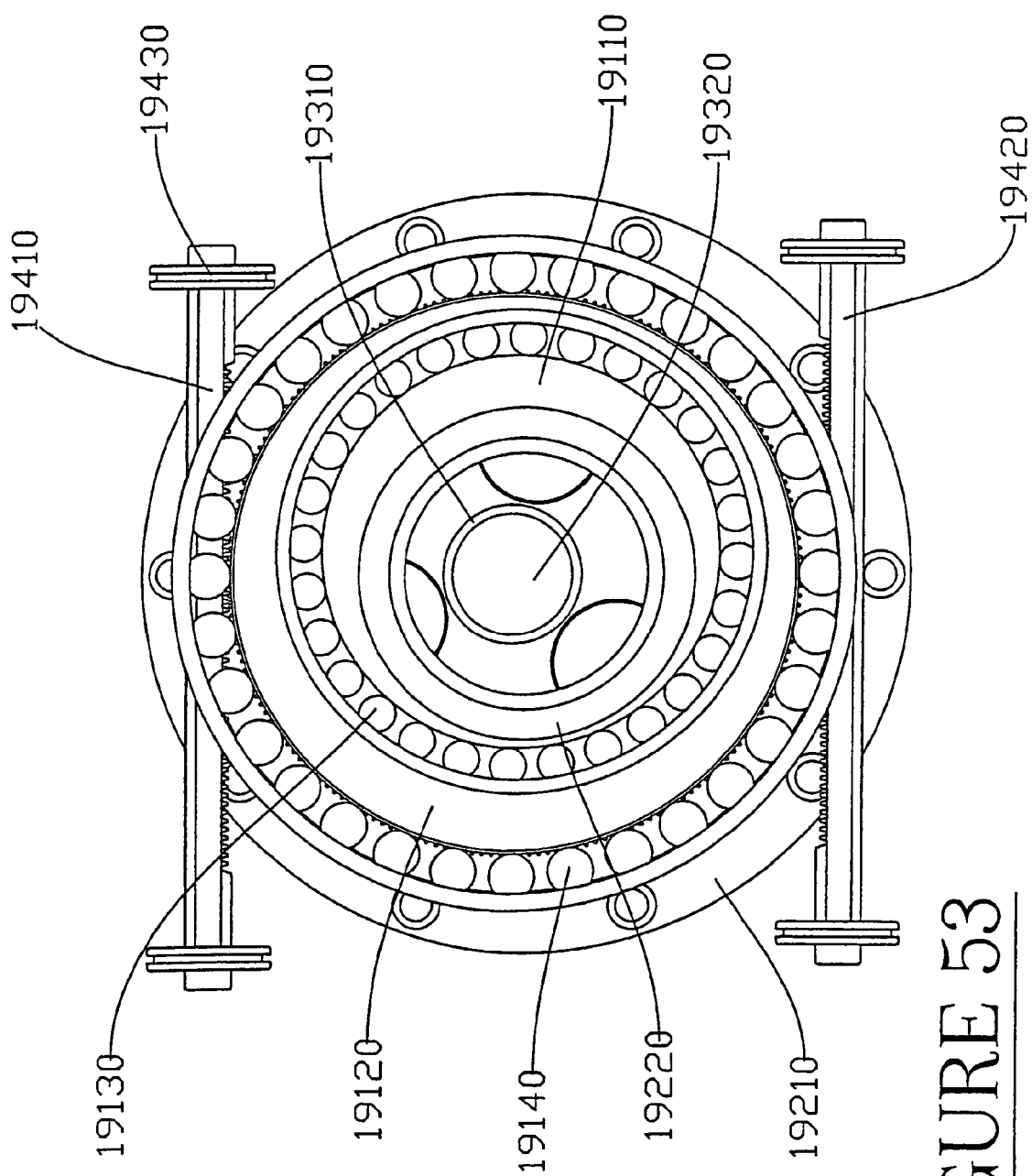
FIG. 53 is a partial cutaway side elevation view showing a displacement adjustment assembly of the combustion engine shown in FIG. 50.

Referring now to FIG. 53 a diagrammatic view of the displacement adjustment assembly, including a pair of eccentrics, a crankshaft, a rotor shoulder, suitable bearings as required, adjustment gear racks and associated, enabling components.

FIG. 54 has been left blank intentionally.

Figure 56:
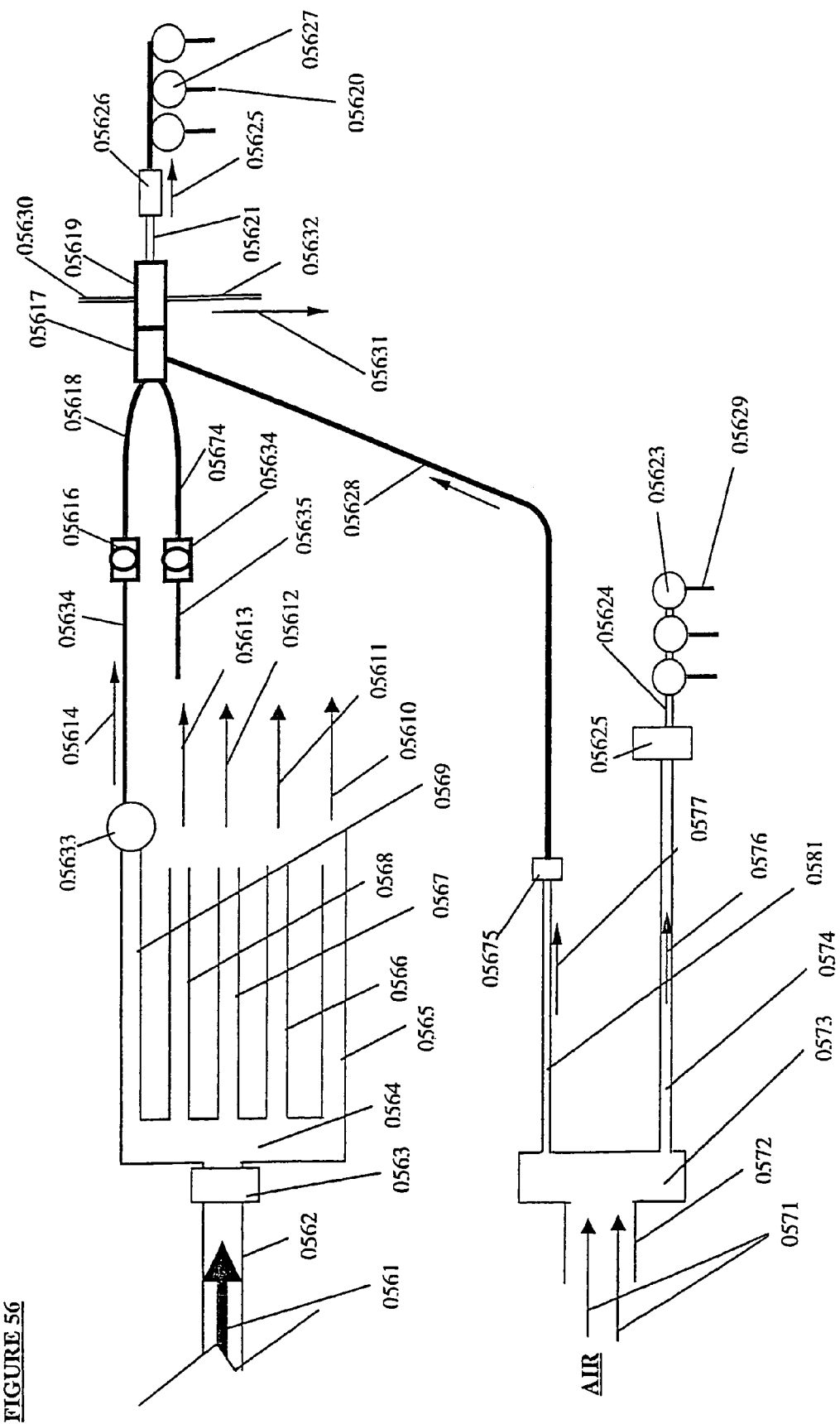
FIG. 56 is a diagrammatic plan view representation of processing equipment used in processing waste streams.

Referring now to FIG. 56 a diagrammatic plan view representation of processing equipment is set out. The processing equipment is intended for installation at selected locations such as slaughtering plants and where waste streams are generated as a by-product of the plant. The referenced waste streams may be intestines, blood, hooves, neural matter, and all protein and fat, partly digested animal feeds such as cellulose, and plant proteins and the like, and which is presently either incinerated or used in production of non-food items but is generally discarded with copious quantities of processing water subsequently treated in expensive waste water treatment equipment required by law. Other waste streams such as effluent comprising human waste, which is presently transferred via sewage systems typically comprising a series of progressively larger pipelines which accumulate effluent from large populations, for example in cities, and an effluent flow controlled by gravitational effect such that a single large diameter sewage pipe delivers the effluent to a sewage treatment facility, wherein bacteria is encouraged to consume proteins and fats in large sewage treatment tanks. The tanks are aerated with compressed air in massive quantities which feed bacteria with their requirements to generate huge quantities via reproduction, wherein the effluent is ultimately consumed almost entirely by the bacteria, and in this process massive quantities of carbon dioxide and water are exhausted into atmosphere in a demonstration of a squandered waste of energy that is not exceeded in size by any other example of wasted energy caused by burgeoning human population in the world. A more beneficial process for treating human effluence can be arranged wherein a waste stream shown as 0651 in FIG. 56 is treated according to the description herein given below. The equipment as detailed in FIG. 56 in diagrammatic form is intended to provide an efficient method of transforming waste fats and oils into fuels used in electrical energy production or to manufacture bio-diesel for example, that can be used to power vehicles in which the E-VVORP has been installed. Additionally, the equipment can be used to separate selected protein matter from the waste stream 0561 for conversion into other biodegradable polymers that can subsequently be further processed to produce thermoset packaging items. Cellulose and other combustible wastes can also be selectively separated from the waste stream and used in fuels for subsequent production of electrical energy or steam generation, most preferably at the plant at which the apparatus has been installed. Finally, waste water can be used for irrigation or alternatively, suitably filtered and heat treated enabling recycling within the referenced plant for selected processes such as sanitation wherein the processed waste water would be combined with selected chemical sanitizing materials prior to use.

In FIG. 56 a single conduit 0562 is shown connecting by direct communication the waste water stream 0561 to a homogenizing apparatus 0563. It should be noted that several waste streams may be arranged to transfer selected waste items such as blood for processing in equipment that may not be similar to equipment herein described such as dehydrating plant. However the layout shown in FIG. 56 shows a single waste stream 0561 transferred from the source of the waste stream 0561 in an enclosed pressurized conduit. Homogenizing equipment 0563 reduces the largest particle size in the waste stream to a size equal to the maximum particle size selected thereby enabling efficient separation of the waste stream into at least five, or less or more, separate streams as may be required. A vertically disposed column 0564 is arranged to allow extraction via conduits 0565, 0566, 0567, 0568, and 0569, in the direction shown respectively by arrows 05610, 05611, 05612, 05613, and 05614. Waste fluid represented by arrow 0561 and transferred via conduit 0562, to apparatus 0563, can be heated and pressurized to any suitable pressure and temperature prior to direct transfer into vertically disposed column 0564. The least dense fluids such as fats and oils cab be extracted from the highest extraction point from column 0564 at a suitable connection with conduit 0569 in the direction shown by arrow 05614. Fats and oils extracted via conduit 0569 in the direction shown by arrow 05614, can be stored in enclosed pressurized storage vessel 05633. Substantially all water is separated from the fats and oils transferred at the most elevated conduit 0569 and the stream of fats and oils are transferred in enclosed pressurized conduit 0569 to a suitably pressurized enclosed storage vessel 05633. Temperature of all streams can be adjusted by transfer through suitable heat exchangers (not shown) wherein the temperature of the waste stream is controlled as required for efficient processing. Conduit 0568 is arranged in direct communication between the vertical column 0564 and a suitable storage vessel (not shown) in the direction shown by arrow 05613. Proteins can be extracted via conduit 0567 which will generally carry a quantity of animal fats with some oils derived from feed that may have remained in an undigested condition in the alimentary canal and stomachs of the slaughtered animals which is transferred with the entire animal alimentary canal into a waste stream 0561. Proteins and a minimum amount of fats and oils carried therewith can be extracted via conduit 0568 and stored, awaiting further processing into such items as biodegradable polymers for use in packaging materials, Conduit 0567 enables extraction from column 0564 such as cellulose and waste products of similar density and transferred directly to an enclosed storage vessel suitable for the storage of such products. A quantity of water will be transferred with said cellulose and similar items so as to allow pumping of the fluid transferred along conduit 0566 in the direction shown by arrow 05611. Such waste products as cellulose can be extracted from the combined fluid separated and transferred along conduit 0566 and subsequently blended with such combustible fuel items selected according to their suitability such as pulverized anthracite and diesel oil (which may be bio-diesel), blended with the cellulose and used as a fuel to power a boiler for example. The most dense waste items which will most likely be predominantly water, is transferred along conduit 0565 in the direction shown by arrow 05610, providing a direct communication between the lowest most extraction port in column 0564 and a suitable storage vessel. Waste water extracted via conduit 0565 may be used for irrigation purposes or alternatively, further processed and treated with such suitable anti-microbial processing aids such as ozone (O3), chlorine dioxide (ClO2), chlorine gas, or any other suitable anti-microbial including heat most preferably derived from other process/s where residual heat may be derived from higher temperature processes. The temperature to which the water derived from the waste stream in the manner described herein above, should be the most suitable temperature such as about 160 degrees F., or less or more, but most preferably a temperature that will. Ensure the death of all pathogens, viruses, and undesirable organisms. Such water extracted via conduit 0565 will most preferably be filtered by the most efficient methods such as centrifugal extraction of solids from the water, or any other filtering method. Pump 05616 is attached directly to input conduit 05634 and output conduit 05618 so as to enable pressurization of fluid transferred from a source storage vessel such as 05633, and after pressurizing the fluid by high pressure pump 05616, the fluid which most preferably will be comprised of suitable oils and fats is transferred under suitable pressure via conduit 05618 to furnace at 05617. The quantity of said fluid comprising fats and oils transferred at selected pressure to furnace 05617, may be blended with other suitable fuels such as may be transferred via conduit 05634 with pump 05674, supplied via conduit 05635, and suitably pressurized, with oxygen provided via conduit 05628. Any selected combination of fuels provided via conduits 05618 and 05634, with any other fuels transferred via other conduits (not shown) such as pulverized anthracite or bio-diesel blended together to provide a suitably homogenized blend of animal fats and oils, a component of vegetable oils, optionally added fossil fuels at the lowest levels necessary, and then under pressure, most preferably atomized or vaporized, in a pre-combustion chamber with oxygen and at proportions enabling most preferably, complete combustion in a fuel and oxygen combination that may be described as lean such that when the fuel and oxygen mixture transfers from a pre-combustion chamber and into a combustion chamber at a mass flow rate selected as required, the combustion of the fuel will be complete thereby extracting the maximum available energy from the fuel which will most preferably necessitate a quantity of oxygen slightly greater than the exact amount of oxygen that would allow complete combustion only. In this way, the fuel provided into combustion vessel 05617 will decompose and produce exhaust gases comprised predominantly of carbon dioxide, with water and small quantities of oxygen, carbon monoxide, nitrogen, and noble gases. Exhaust gases are then transferred via heat exchanger 05619, and there from to compressor 05626 via conduit 05621, and in the direction shown by arrow 05625. Said exhaust gases transferred via heat exchange 05619, thereby enable the efficient transfer of heat produced by the combustion of fuel and oxygen in combustion chamber 05617, to a selected fluid transferred into heat exchanger 05619 via conduit 05630, and after fluid is heated, transferred from heat exchanger 05619 in the direction shown by arrow 05631. Fluid transferred via conduits 05630 and 05632 will most preferably be selected according to their suitable properties for this application, and such fluids may be selected from the following list: water, carbon dioxide, solutions comprising water and any suitable additive, nitrogen, ammonia, zeon, or any combination thereof. Said fluid transferred via heat exchanger 05619 may be retained within an enclosed loop wherein the fluid is recycled within said loop. Exhaust gases, having been chilled in heat exchanger 05619, by the heat exchanging process, are transferred along conduit 05621 and into compressor 05626. Exhaust gases may alternatively be exhausted to atmosphere, however most preferably they will be retained and recycled for further use. Such use may be in the refrigeration process such as direct injection of liquid carbon dioxide via bottom injectors in the well known and universally practiced method of CO2 bottom injection, into ground meat blending vessels. Apparatus 05626 may most preferably comprise a means of separating carbon dioxide from the exhaust stream transferred via conduit 05621, and the compression of carbon dioxide gas and storage after transfer thereto, in any suitable quantity of suitable vessels, such as 05627, and which may be supplied by BOC Gases, in New Jersey, USA. CO2 gas stored in vessels such as 05627 will most preferably be in a liquid phase retained under pressure of approximately 300 psi and at a storage temperature of 0 degrees F., or less or more. Apparatus shown in FIG. 56 includes a plan view of an air compressing and separating apparatus 0573. Air is filtered and transferred via enclosed conduit 0572 in the direction shown by arrows 0571. Conduit 0572 provides direct transfer of filtered air to air separation apparatus 0573. Apparatus 0573 may be arranged to separate nitrogen and oxygen derived from atmospheric air, via membrane methods. The process of separating oxygen and nitrogen in this manner, is a well known and developed technology and such equipment is available from BOC Gases, Murray Hill, N.J. Such membrane method of separating nitrogen and oxygen can be arranged to provide large volume processing of air. Two conduits are shown in direct communication with apparatus 0573 wherein a first conduit 0581 provides an enclosed conduit and transfer there through of gas comprising predominantly oxygen, having been separated from air to compressor 05675 in the direction shown by arrow 0577. Compressor 05675 can be arranged to compress gas to a suitable pressure prior to direct transfer into conduit 05628 or alternatively into suitable storage vessels. Gas compressed by compressor 05675 may comprise oxygen and nitrogen in relative ration combinations of, for example, 50 percent nitrogen and 50 percent oxygen, 25 percent nitrogen and 75 percent oxygen, or 5 percent nitrogen and 95 percent nitrogen, or any suitable ratio, however the ratio of oxygen and nitrogen will be arranged to enable the most efficient combustion of fuels blended therewith in combustion vessel 05617.

Conduit 0574 is arranged to transfer predominantly nitrogen gas in the direction shown by arrow 0576 to compressor 05626. Compressor 05625 is arranged to compress gas which in this instance shall most preferably be predominantly nitrogen gas, and after compression and suitable temperature adjustment by means of transfer through a suitable heat exchanger, transfer to storage vessels arranged as required wherein any number of suitable storage vessels such as 05623, may be installed with conduits such as 05629 provided to enable the transfer of the nitrogen gas for use in any suitable refrigeration process such as the chilling of any food items.

In a preferred embodiment, waste stream can be emulsified by equipment shown as 0563 prior to separation in vertical column 0564. The least dense component of the waste stream after emulsification will accumulate toward the upper end of column 0564 and the most dense component of the emulsified waste stream will accumulate at the lower end of the column 0564. The example shown in FIG. 56 wherein vertically disposed column 0564 is shown in a side elevation view with five extraction conduits, it should be noted that any suitable number of conduits can be arranged along the full length of the vertical separation column 0564 wherein the lightest components float to the upper end and the heaviest components sink toward the lower end of the column, and ultimately a separation of all components according to their specific weight, separate along the full length of the vertical column, the heaviest component at the bottom with the next heaviest component directly there above, and so on, to the upper end wherein the lightest component of the emulsified waste stream will accumulate. The lightest most energy rich components will most likely accumulate at the upper end and these shall comprise fats derived from the animal (or human) waste. Animal fats can be extracted via conduit 0569 and, if so desired, blended with other fuels and then pressurized and atomized into a chamber containing oxygen gas also pressurized, and most probably containing a quantity of nitrogen gas in addition to low levels of noble gases. However, when the atomized fuel is blended with a suitable corresponding quantity of oxygen gas, a very high temperature stream of combusting oil and oxygen enclosed within a suitably heat resistant conduit can cause the generation of a plasma stream wherein the fuel molecules decompose and a plasma stream can enable the collection of electrical energy directly there from. As the plasma cools, carbon dioxide and water will form and this stream of exhaust can be separated and carbon dioxide compressed and stored for use in refrigeration and for anti-microbial applications according to inventions by Anthony Garwood, one of the inventors of this present disclosure.

Figure 57:
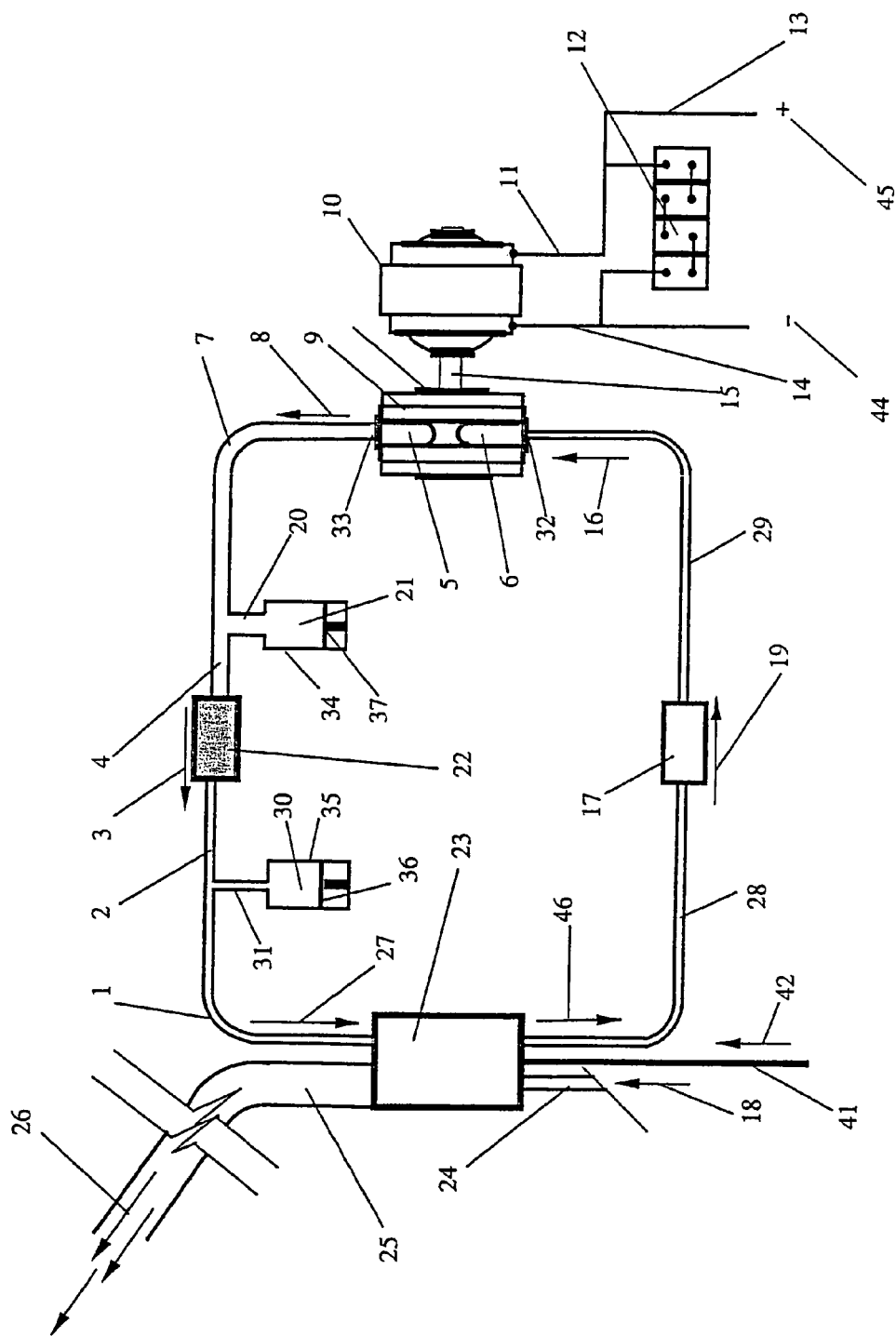
FIG. 57 is a diagrammatic plan view of processing equipment formed in accordance with the present invention for treating waste streams to generate energy suitable for use with the combustion engine of FIG. 50.

Referring now to FIG. 57 a diagrammatic plan view of an apparatus intended for the purpose of generating electricity by the combustion of waste products such as fats and oils derived from any suitable waste stream such as described in association with FIG. 56 herein above. A continuous conduit forming a loop is shown wherein a part of the loop 1 comprises a reduced diameter conduit transferring a condensed recycled fluid such as water or carbon dioxide, or any other suitable fluid, into a heat exchanger 23. Heat exchanger 23 may be similar to that heat exchanger 05619 described in association with FIG. 56. Conduit 24 is shown directly connected to heat exchanger 23 and therein is provided a continuous pressurized temperature controlled stream of fluidic fuel provided in the direction shown by arrow 18. Conduit 41 provides oxygen blended with other atmospheric gases in a controlled ration wherein the ratio of oxygen has been elevated above the ratio of oxygen in atmospheric gases. For example, the oxygen content in said fluid transferred under suitable controlled, variable, pressure and at a selected controlled and variable temperature in the direction shown by arrow 42, via conduit 41, may be for example 50 percent oxygen with a balance of nitrogen plus other atmospheric gases, or alternatively the ratio of oxygen may be as high as 90 percent, or less or more, wherein the balance will be atmospheric gases and substantially all water will have been removed from the blend of gases transferred under pressure through conduit 41, or alternatively controlled at an optimum content which may be less than, but shall not exceed, the amount of water required to saturate the gases transferred through conduit 41 at the controlled temperature and pressure, enabling optimized operation of furnace 23 and the combustion of fuel transferred therein. The controlled variable pressurized fuel blend transferred via conduit 24, which may include a predominant proportion of animal fats blended with a slurry of diesel oil and pulverized anthracite or lignite, or any suitable coal, is atomized and blended with oxygen gas transferred via conduit 41 in a pre-combustion chamber enclosed and pressurized vessel with uninhibited and direct communication with an adjacent combustion chamber. The blended oxygen fuel and other gases is ignited by elevation to a temperature at which ignition will occur and the combusting fuel is contained within a conduit allowing unimpeded combustion wherein a high temperature stream of plasma can be generated. The proportion of fuel and oxygen is arranged most preferably so as to burn lean to the extent that a greater quantity of oxygen is provided in a controlled stream than would otherwise be provided in an amount precisely equal to an amount of oxygen sufficient only to enable complete combustion of the fuel. More particularly, the amount of oxygen provided is slightly greater that the precise amount required for complete combustion of the fuel. These conditions which are generally described as "lean" or "lean burning conditions" can enable the production of the highest available temperature at the pressurized conditions in which the combustion occurs. Exhaust gases from the stream of plasma or otherwise most preferably completely combusted fuels are transferred into conduit 25 after exposure to a heat exchanger at 23 that extracts substantially all available heat from the exhaust gases by heat exchange with a fluid transferred through conduit 1 in the direction shown by arrow 27, and then arrow 46. The fluid phase in conduit 1 may be liquid and the fluid phase in conduit 21 will most likely be gas. Fluid transferred in the direction shown by arrows 46 and 19, along conduits 28 and 29, pass through valve 17 and ultimately in the direction shown by arrow 16. E-VVORP engine 9 is arranged with inlet manifold 6 and outlet manifold 5. Conduit 29 communicates directly with inlet manifold 6 at 32 and outlet manifold 5 communicates directly with conduit 7 at 33. High pressure fluid gases transferred via conduit 29 and into inlet manifold 6, drive the E-VVORP engine rotor so as to provide rotating shaft 15 connected to E-VVORP drive shaft via a magnetic coupling at 43. In this way E-VVORP engine 9 can be sealed with an enclosed system similar to that of a modern refrigerator in reverse. The magnetic coupling enables a rigid connection between the E-VVORP drive and shaft 15. High pressure gases entering manifold 6 provide the energy to drive the E-VVORP and the expanded spent gas exhausts through outlet manifold 5 and into conduit 7 in the direction shown by arrow 8. Gases exhausted and expanded, transfer via conduit 7 and 4 in the direction shown by arrows 8 and 3. An accumulator 34 is connected via conduit 20 to conduit 4, providing space 21 and with the piston 37 exerting a selected pressure onto any gases that may accumulate in space 21. In this way, gases transferred via conduit 7 and 4 can flow at a constant rate even though the demand and supply of gas transferred through conduit 7 and 4 may vary according to demand. Exhausted fluids in conduit 7 and 4 are transferred to compressor 22 in the direction shown by arrow 3. Compressor 22 is arranged to compress expanded fluid transferred via 4 and into conduit 2. Compressor 22 is also provided as required with a gas condenser and heat exchanger such that fluid transferred from conduit 4 to conduit 2 via compressor 22 can be cooled as required. Liquefied fluid transferred via conduit 2 and 1 in the direction shown by arrow 3 and 27 may also accumulate in space 30 of accumulator 35 by transfer through connecting conduit 31, and at a pressure maintained by piston 36 arranged to substantially maintain a set but variable pressure in space 30 by exerting a selected pressure via piston 36 and onto the contents of space 30. Condensed fluid can then be transferred via conduit 2 and 1 in the directions shown by arrow 27 into combustion chamber with heat exchanger at 23. Fluid can then be recycled in the direction shown by arrow 46.

Exhaust gases from combustion chamber at 23 can be transferred via enclosed conduit 25 in the direction shown by arrows 26. Gases transferred via conduit 25 may comprise a blend of several atmospheric gases with a predominance of carbon dioxide and water vapor. Carbon dioxide may be separated from the exhaust stream, filtered and compressed, and then stored at a suitable temperature and pressure for subsequent use as a means of refrigeration and as described above in association with FIG. 56. An alternator 10 is arranged on direct connection to drive E-VVORP engine 9. Electricity generated by alternator 10 can be transferred via cables 14 and 11 such that positive cable 45 and negative cable 44 deliver electricity to the slaughter plant from which the waste stream derived fuels are sourced, or alternatively sold to the national electricity grid supply. Batteries 12 provide a means of storing sufficient electrical power as may be required in an unanticipated equipment failure, or for other reasons such as the requirement to shut down the electricity generating equipment for maintenance purposes. Exhaust gases 26 may be used to provide a source of heat as required for central heating. Alternatively a turbo charger can be installed in exhaust conduit 25.

In all instances where possible and appropriate, the operating temperature of furnaces arranged to burn fuels derived from slaughtering plants can be arranged to operate at temperatures that will ensure the decomposition of such proteins as prions that may cause human death from bovine spongiform encephalopathy (BSE).

The loop conduit at 28 and 29 may be arranged at a high pressure of zero psig or 1 bar up to 10 to 20 bar, or more or less, and at a temperature of 50 degrees C. to 500 degrees C. or more or less. Loop sections at conduit 1, 2, 4, and 7 may be arranged at low pressure such as 2000 psi to 10,000 psi or 150 bar to 600 bar or more or less. Superheated steam at a temperature of for example 500 degrees C. or more or less, and a pressure of 1000 psi or more or less, in the high pressure segments of the loop may be utilized. All components will most preferably be insulated to maintain optimum operating temperatures and prevent loss of energy. The equipment will most preferably be computer controlled in a manner that will most effectively manage the engine energy output and the energy conversion most efficiently, but as required to meet demand. Most preferably exhaust gases will be reduced to the lowest temperature possible such as 100 degrees C. or lower. Water may be extracted from the exhaust gases by condensing in a suitable condensing equipment thereby providing an effective source of clean and pure water with few components. Other byproducts of the process such as potash may be collected and packaged for subsequent use in arable farming.

Water derived from the waste streams may be used in hydroponics facilities to produce fruit and vegetable products. Most preferably and as shown in association with FIG. 57, the E-VVORP engine would be used, however other equipment such as stationary steam turbine could be used as an alternative to the E-VVORP engine.

The arrangement as shown in connection with FIG. 57 wherein an E-VVORP engine is driven by recycled fluid suitably heated in a furnace arrangement with a heat exchanger, can be also arranged so as to provide the driving means on such transport vehicles as ships, trucks and even cars. In this case, the E-VVORP engine with alternator (EEA) would be arranged to provide the electrical power required to drive electric motors arranged by direct connection to a ship's propellers or in the case of road vehicles, the electric motors may be mounted in direct connection to the wheels of the vehicle. The electricity output and size of each complete EEA system can be adjusted and sized to suit each application. For example, the electricity output required to drive a 20,000 tons ship may be in the range of 20,000 to 30,000 hp. Alternatively, if such a system is required to drive a road vehicle, the drive energy output may be in the order of 500 hp or less but also up to 5000 hp or more. In any event the specific requirements of each application will require a suitably sized E-VVORP engine with electricity generating arrangement and therefore the size of the equipment may be adjusted accordingly.

As required, any selected bearings which may be ball, roller, magnetic bearings or suitable bushings, can be provided and installed to enable the efficient operation of the E-VVORP engine.

In another preferred embodiment, steam generated such as by injection of water at any suitable pressure into the exhaust manifold and as described above (by means of a water injector), wherein the water may be pre-heated, into the annular cavity surrounding the exhaust conduit, can be directed via a controlling valve (not shown) and conduit to the compressor rotor and thereby provide a source of rotor driving force. Additionally, water, having been collected from the exhaust flow and then filtered, may be injected into the combustion cylinder chamber, immediately after combustion of the air and fuel mixture injected therein, so as to enable additional gaseous expansion thereby providing more power (i.e., extracting more energy from the combusting fuel and air mixture).

The E-VVORP engine starting procedure will now be described in detail. The E-VVORP engine starting procedure may involve the pneumatic driving of the compressor rotor as shown in FIG. 32, and when the combustion rotor (as shown in FIG. 25) is rotating at sufficiently suitable speed (RPM), appropriate air and fuel injection, via air inlet 3045 and fuel injector 8326 (as shown in FIG. 33) at which time electrical current required by the spark plug to enable suitable controlled sparking can commence. Stopping the E-VVORP engine may be achieved by cutting supply of fuel and air and/or cutting or disconnecting, via a suitable switch, the electrical system and/or electricity supply to the spark plug(s).

In a preferred embodiment the E-VVORP engine is divided into two components comprising a first engine component (shown in exploded view FIG. 25), variable displacement (capacity) combustion segment and a second, engine compressor component (shown in exploded view FIG. 32) comprising alternately, a duel operation, variable displacement (capacity) compressor or pneumatic motor segment. The first engine (combustion) component is shown in cross sectional format in FIGS. 28 and 29 and the second engine (compressor) component is shown in cross sectional format in FIGS. 30 and 31). The respective combustion and compressor engine components are connected together via input/output drive gears engaging with a first differential (3030 shown in FIG. 27 and in an exploded view in FIG. 35) wherein the first combustion engine component crank ring is connected to the second compressor engine component at one of two opposing input/output differential engaging gear connections wherein compressor crank ring 3125 (FIG. 27) engages at crank ring gear 3112 at first differential input/output gear 3108 and combustion crank ring 3122 (FIG. 27) engages at crank ring gear 3110 at first differential input/output gear 3106. Alternatively, the crank rings of the respective compressor and combustion engine components may be connected via a rigid drive shaft wherein the differential mechanism could be excluded from between the engaging gears 3108 and 3106.

In another preferred embodiment, the compressor and combustion manifolds (as shown in exploded views respectively in FIGS. 34 and 33) may be, in another preferred embodiment, rigidly connected together, by for example, direct rigid shaft connection such as via the exhaust conduit assembly, in such a manner that the respective manifolds are rigidly engaged and if any rotational movement of one occurs, a corresponding and equal movement will occur in the other. Furthermore, the compressor and combustion manifolds can be attached to suitable drive mechanism(s), such as by suitable series of levers, worm and worm wheel drive or any suitable gearing, to enable rotation of the manifolds relative to the respective compressor and combustion rotors.

In broad aspects of the variable displacement capability of the E-VVORP engine provides a uniquely effective means of efficient conversion of fuel to a usable driving force. Increasing the E-VVORP engine displacement enables the conversion of proportionately greater quantities of fuel to a usable driving force and conversely reducing the E-VVORP engine displacement enables the conversion of proportionately lesser quantities of fuel to a usable driving force. In this way, the driving force delivered by the E-VVORP engine can be adjusted according to output needs proving the most efficient use of fuel. Furthermore the compressor rotor such as 7016 as shown in FIG. 31 can be controlled by adjusting it's displacement capacity independently of the adjustment of the combustion rotor 3134 displacement capacity such as disclosed in association with FIG. 28.

Accordingly the rotational speed (RPM or velocity) of the respective compressor and combustion rotors can be varied such that, for example the RPM of the compressor rotor such as 7016 shown in association with FIG. 31 can be less than the corresponding RPM of the combustion rotor but at the same time. Conversely, the rotational speed (RPM or velocity) of the respective compressor and combustion rotors can be varied such that, for example the RPM of the combustion rotor such as 3134 as shown in association with FIG. 28 can be less than the corresponding RPM of the compressor rotor 7016 but at the same time. In this way the speed of the subject (driven) vehicle can be controlled as required, according to the torque and engine RPM output of the combustion rotor versus the corresponding force required to rotate the compressor rotor at a selected RPM and the torque required to drive the compressor rotor at such RPM and according to desire and any particular controlled aspect of the E-VVORP engine speed and it's corresponding driving force output.

In another preferred embodiment, a "limited slip" differential mechanism may be installed in association with, for example, the second differential as shown in a position interposed between drive shafts 626 and 624, in FIG. 17, to limit the difference between the revolutions per minute (rpm) of each wheel to a maximum difference. Limited slipped differentials may also be installed to limit the first and second differentials as shown in association with FIG. 17-21.

In another broad aspect of the present invention, the crank ring 5018 as shown in FIG. 28 and combustion rotor 3134 can be rotated, relative to each other, wherein for example, the combustion rotor 3134 is rotated through an arc while the crank ring is relatively stationary or alternatively in the opposite direction of a rotation of the crank ring, while all connecting rods are connected to the crank ring and in position with pistons enclosed within their respective cylinders. Such a relative movement of the crank ring and combustion rotor the effective connected rod length is shortened or lengthened corresponding with the extent of the rotation (i.e. the distance/ movement from one end of the arc to the opposite end of the arc). In this way, the displacement of each cylinder is also adjusted correspondingly and in a proportionate amount to the extent of the movement through said arc.

In another preferred embodiment with the E-VVORP engine, the effective motion of the rotor cylinders in a direction toward the intake of air (and fuel mixture) wherein the cylinder effectively travels over and around the air and fuel mixture. More particularly, if we consider the air and fuel mixture is in a relatively stationary disposition to the respective piston, the cylinder is, in fact, moving over the stationary air (as opposed to the air being "drawn" into the combustion space above the cylinder and inside the confinement of the cylinder walls.

In another preferred embodiment with use of the E-VVORP engine, a fuel mixture comprising gasoline and/or methanol and/or ethanol and/or hydrogen, and/or propane, butane, and/or methane and air and/or nitrous oxide proportioned to substantially ensure a complete combustion after ignition by means of a spark from a spark plug or any other suitable means of ignition (such as another source of ignition which may be from an adjacent combustion chamber having commenced a combustion cycle earlier than the subject combustion chamber, as can be arranged with the present invention) can be provided in a first part and in a second part to providing a fuel mixture into one individual (or more) combustion chambers of the respective E-VVORP cylinder a fuel mixture comprising a proportioned quantity of air with, for example diesel fuel and/or aviation fuel and/or kerosene and/ or suitably processed, filtered and purified beef fat (as may be required to prepare the beef fat so as to enable desirable and effective use as a fuel). In this way, a small quantity of gasoline can be used as an ignition means for other heavier and less volatile fuels (such as diesel or bio-diesel).

In another broad aspect of the present invention two types of fuel, such as a first gasoline (alternatively methanol or ethanol or other volatile, readily ignited type of fuel) type fuel and a second diesel (or kerosene, aviation or paraffin, high energy source fuel which may be typically less readily ignited) type fuel may be used as the energy source to drive the E-VVORP engine. In this particular instance diesel type fuel may be the predominant fuel and the gasoline type fuel used only for the purpose of igniting the diesel type fuel. A diesel and air fuel mixture may be injected into or drawn into the combustion chambers of the E-VVORP engine followed by an amount of gasoline (and air) fuel mixture. The gasoline can therefore be ignited by a suitable spark provided by a spark plug arranged for this purpose and the ignited gasoline fuel can then provide the means of igniting the diesel type fuel mixture. Gasoline will ignite more readily than diesel type fuel mixtures. Diesel type fuel mixtures can yield more energy than gasoline (more volatile) fuels, however, diesel type fuel mixtures, when used in isolation, can require higher temperatures to enable ignition thereof. The gasoline type fuel mixture can ignite at a lower temperature and therefore, in this way the diesel type fuel can be ignited at a lower pressure (i.e., similar to the temperature at which the gasoline type fuel mixture will ignite) and temperature than may otherwise be required for efficient combustion of a fuel mixture including a diesel type of fuel.

In another broad embodiment of the present invention a pilot ignition method and apparatus can be used to ignite each quantity of fuel mixture after transfer of the fuel mixture into each combustion chamber. An enclosed first pilot ignition chamber (PIC) of suitable size which can be lined with any suitable heat resistant ceramic. Said first PIC can be located in the manifold that contains the piston rotor. The PIC is arranged with a fuel mixture inlet port and in this instance, two pilot ignition ports. The pilot ignition ports extend along two conduit paths, each being a reflection of the other, and extending in opposite direction perpendicular to the transverse and common, first, center line of the rotor and manifold. Each pilot ignition port, extending outward from the first chamber have open ends terminating at an intersection with each of the second and third centerlines (one to each of the two rows of cylinders and wherein the first, second and third centerlines are parallel). The open ends of the pilot ignition ports can therefore be in direct communication between the PIC and each combustion chamber of each row of cylinders as the combustion rotor rotates past the open end of the respective open ended ignition port. In this way a direct communication from a combustion chamber to the PIC is provided in alternate sequencing between combustion chambers in the first bank of cylinders followed by a combustion chamber in the second cylinder bank, wherein firstly a direct communication from a first combustion chamber in the first cylinder bank to the PIC occurs and this is followed by a direct communication between a combustion chamber located in the second cylinder bank and the PIC via the opposing port and conduit in connection with the common PIC. An injection port capable of transferring a suitable fuel mixture such as gasoline and air is located at a generally central position and in direct connection with the PIC. In this way measured quantities of fuel mixture can be transferred to the PIC to enable a continuous combustion of fuel mixture, at a suitably elevated temperature such as 2,000 C, to be present in the PIC. Furthermore, in this way a lower combustion fuel such as diesel with air, animal fats with air or aviation fuel with air can be firstly transferred to the combustion chambers and as each such chamber rotates to a position of direct communication with the PIC.

In yet another embodiment a conduit connecting a path that follows a circumferential centerline of the two banks of cylinders can enable the ignited fuel mixture in a combustion chamber in a first cylinder bank to a corresponding second combustion chamber in a second cylinder bank. Such a conduit enabling an indirect but sequenced communication between the respective combustion chambers in each cylinder bank can allow transfer of a controlled quantity of ignited and exploding fuel mixture from the first cylinder combustion chamber to the corresponding combustion chamber in the second bank of cylinders. In this way such fuel mixtures as diesel or paraffin and air or other oxygen source (such as nitrous oxide) having been transferred into the combustion chamber of a second cylinder can be ignited by the explosion of a fuel mixture in a first combustion chamber which had itself been ignited by another explosion of fuel in another combustion chamber. In this way a method of igniting such fuels as diesel which may otherwise require high temperatures generated by, for example a suitable compression of the subject fuel mixture. Furthermore, continuous ignition of fuel in the progressively sequenced cylinder combustion chambers, as they travel around a circular path within the manifold and about a centerline which is adjusted by offset against the centerline of the crank, is enabled without a need for high compression of the fuel mixture.

Referring now to FIGS. 40, 41, 42 and 43 various views of a preferred E-VVORP engine configuration are shown. FIG. 40 shows a 3-D view of a preferred embodiment of the E-VVORP engine wherein a rotor 9006 with two rows of pistons such as 9007 is arranged to rotate about an axis. An extension of rotor 9006 is shown at 9008 with a spur gear 9009 directly attached and fixed thereto and engaging with an internal spur gear 9010. A housing 9004 has a matching housing on the opposite side of the combustion rotor 9006. A timing belt drive 9001 is shown in position and engaging with a pulley fixed to shaft 9011. A differential arrangement 9002 with outer drive ring 9003 is also shown. Impellor fan 9005 is arranged to provide air cooling to the combustion rotor 9006. In FIG. 41 differential 10002 is shown in a fixed relative position to drive shaft 10003, eccentric 10001 with needle bearing 10004 is shown in position. Crank 10006 with connecting rods such as 10007 and pistons 10008 can be seen wherein the rotor as shown in FIG. 40 has been removed. Ramp sealing bars 10005 can be seen also. FIG. 42 shows a cross section through the present preferred E-VVORP engine embodiment with rotor 11006 shown in place. Crank drive shaft 11001 with eccentric 11005 is shown in relative position. Differential sun gear 11003 directly attached to crank shaft 11001. Shaft 11002 is attached to a frame in which planet gears of the differential as shown in FIGS. 40 and 41, with a pulley attached thereto, engaging with timing belt 11004. FIG. 43 shows the differential with sun gear 12003, three planet gears such as 12002, and outer drive ring 12001. Timing belt 12004 engages with pulleys wherein a first pulley is attached to planet gears such as 12002, via above said frame and in such a way that timing belt 12004 drives a twin screw air compressing impellors of twin screw air compressor 12005. The air compressor 12005 is arranged by direct mounting to a manifold which engages with and surrounds the combustion shown in FIG. 40 as 9006.

In another embodiment as shown in FIG. 40, the air flow and fuel mixture is controlled by adjustment of a valve located in the conduit connecting the timing belt driven twin screw second compressor directly to the turbo charger first compressor. The speed of the second compressor (in RPM) is also determined by the balancing of (or with) the speed (RPM) of the rotor both of which are connected together via a differential.

In another embodiment a valve and/or exhaust gas flow regulator may be installed to restrict flow of exhaust gases from the E-VVORP engine and thereby elevate the exhaust gas pressure prior to release into atmosphere. This can enable a "balancing" (according to the description of "balancing" described above) feature between the compressor (such as a twin screw type compressor). Additionally, a gas flow and pressure regulator which my comprise a suitable "butterfly" type valve may be installed between the twin screw compressor and the atmospheric (and most preferably suitably filtered) air intake to control E-VVORP engine speed in concert with the adjustment of the rotor displacement capacity. In this way fuel mixture transferred into the combustion chambers is limited by the capacity of the combustion chamber during the fuel mixture transfer and in direct proportion to the volume of the combustion chamber during such transfer of the fuel mixture. In this way the speed and energy output of the E-VVORP engine can be controlled as required for the particular application for which the E-VVORP engine is being used.

A significant benefit of the E-VVORP engine, wherein the engine is generally divided into two components assemblies comprising a first, separate combustion component assembly and second compressor component assembly, is derived from a capability to allow gases to expand beyond the equivalent limitations of a typical reciprocating combustion engine. More particularly, if the typical 4 stroke cycle of a reciprocating engine is considered, the compression ratio is defined as the ratio of the volume of air (and fuel) in a cylinder and above a piston when the piston is at bottom dead center, compared to the volume of compressed air and fuel when the piston has moved to its position at top dead center after compression of the air (and fuel). This ratio maybe 11:1 and is fixed according to the limitations of the particular engine. In a gasoline engine this ratio maybe 8:1 and for a diesel engine it maybe 14:1 or perhaps even 26:1 but for any particular reciprocating piston engine, this ratio is fixed. Heat generated during compression of the air could be absorbed by the air in the following expansion stroke but any heat generated by the fuel combustion is additional to that amount of heat required by the compressed air to enable it to return to it's original temperature prior to compression. The limitation in any reciprocating piston engine is determined by the engine stroke or compression ratio which is fixed. Any heat generated by combustion must be dealt with and removed from the engine, typically by heat exchanging with water in a water cooled engine or by exchange with air in an air cooled engine. On the other hand, the E-VVORP engine can limit the volume or quantity of selectively and correctly compressed air and fuel transferred into the combustion chamber and then further allow an expansion of this fuel with air mixture after combustion, to a selected "ratio" which, compared to the equivalent conditions in the fixed reciprocating engine may be a much more favorable ratio of say 30:1 or even 40:1 or more or less. More specifically, a volume of compressed air and fuel can be selectively allowed to expand to a much greater volume when compared to the initial volume prior to combustion. This allows conversion of heat generated in the combustion event, to usable energy and simultaneously, by the inherent physics, (N.B. as described in the Ideal Gas Laws, Boyles Law, Charles Law, Henry's Law, Grahams Law of gas diffusion and the Real Gas Laws) of expanding gases, provides cooling of the gases. In this way alone, the efficiency of the T-VVORP engine is more favorable than an equivalent internal combustion, reciprocating piston engine. By way of further explanation, a selected pressure can be provided at combustion which may have an equivalent value to the pressure of a fuel and air mixture in a 9:1 ratio combustion engine but the E-VVORP engine can allow the expansion of gases after ignition to expand to a lower pressure such as the pressure that would be equivalent to the expanded volume after ignition of, say, the fuel mixture in said 9:1 equivalent combustion chamber to as much as the equivalent of a 30: or more or less, expanded volume in a reciprocating piston engine.

In another broad aspect of the present invention, the torque generated by the E-VVORP engine is affected by the angle of repose or disposition of each cylinder such as 9805 as shown in FIG. 39, in relation to a straight line drawn through the center point of the rotor. As shown in FIG. 39, the sides of each cylinder are parallel with a center line drawn through the center of the cylinder bore that also intersects the center point of the rotor. In another embodiment, the sides of each cylinder may be offset by any selected number of degrees from a center line intersecting the center point of the rotor. In this instance each cylinder provided in any given rotor can be arranged to have equal offset from each cylinder's respective centerline intersecting the center point of the rotor. Each cylinder may also be arranged to have a center line that does not intersect the rotor center point; in this instance the point of each cylinder centerline that is closest to the center point of the rotor can be arranged to be an equal distance to the distance from such point at all cylinder centerlines for each cylinder in the same rotor. In this embodiment all other associated components can be adjusted according to needs, such as piston connecting rod length and corresponding crank ring profile. Additionally, the rotor profile at the end of each cylinder which is closest to the centrally located manifold can be profiled to follow a contour of the piston when the respective piston is in an operating position closest to the centrally located manifold.

Modifications may be made to the inventions as would be apparent to persons skilled in the engine building arts. These and other modifications may be made without departing from the ambit of the invention, the nature of which is to be determined from the foregoing description.

In another broad aspect of the E-VVORP engine, installation in any selected vehicle, such as an automobile or truck, the elimination of coil, leaf or any type of tensioning spring can be substituted with pneumatic cylinders of proportionate size and capacity, with a suitable source of compressed air provided by the compressor rotor of the E-VVORP engine.

In another broad aspect of the present invention, various planet and sun engaging geared mechanisms with helical and/or spur gear profile and others have been disclosed herein, in association with preferred embodiments of the E-VVORP engine exemplifying configurations disclosed, however it should be clearly understood that such arrangements are described for exemplary purposes and do not limit the use of any style or type of geared configuration or any suitable drive transmission that can be conveniently or effectively integrated with the E-VVORP engine.

Gears may also be provided with helical, spur or any other suitable profile and as may be selected according to any needs without departing from the general scope of the present invention. Any configuration, with or without integrated gear reducing assemblies, variable drive or transmission configurations can be provided to enable effective use of the E-VVORP engine and as can be assembled according to requirements. Furthermore, it should be noted that the number of cylinders arranged in any rotor, whether the rotor is required for use as a compressor or driving engine purpose, can be selected as desired; for example 3 cylinder, or less or more, rotor configurations can be provided with any selected E-VVORP engine configuration and can be provided to suit any purpose or use according to the particular application for which the E-VVORP engine is designed and arranged. Additionally, the diameter of any crank ring (as herein before shown) may be of any suitable diameter as may be selected for effectiveness and E-VVORP engine efficiency of operation in any particular application.

Any suitable fuel or alternative fuel, in the form of a gas such as hydrogen, a dense or liquid gas such as liquid air, any blend of gases, solution or any suitable agent for enhancing fuel performance and effective energy yield, may be substituted and/or included with any suitable gas or blend of gases, liquids that has/have been specified for any use or application in this disclosure in connection with use as any fuel for powering the E-VVORP engine.

The E-VVORP engine may be manufactured from any suitable material of any kind and may also be substituted with any other material used in and for any application as disclosed herein as may be desired or determined to enhance efficient E-VVORP engine operation or for any other reason or purpose whatsoever, whether the material is metal, plastic or ceramic. For example, where it may be indicated in this disclosure, that aluminum can be used to manufacture any particular E-VVORP engine component it should be noted that titanium, magnesium, any suitable ceramic material or any material whatsoever can be substituted and used to manufacture any component required to build the E-VVORP engine as may be desired.

Wherever suitable any subassembly or assembly such as, for example, a compressor or differential mechanism of any kind, may be substituted for any other subassembly for any purpose whatsoever and whenever convenient to make a substitution for any reason.

In another embodiment and explained below fat extracted from a Ground Beef Lean/Fat separation process can be used in a bio fuel process; and carbon dioxide used in the Ground Beef Lean/Fat separation process can be used in a subsequent gasification or Fischer-Tropsch process.

As disclosed in pending U.S. Patent Application No. 60/561,128 entitled Methods for Separating Single Ingredient Boneless Beef using Liquid Carbon Dioxide and Carbonic Acid at Elevated Pressure and filed on Apr. 9, 2004 by Anthony J. M. Garwood (incorporated herein by reference), carbon dioxide is used in the process to separate lean beef from fat in certain portions (boneless beef) of slaughtered and processed cattle. The resultant lean beef has significant immediate commercial value, while the fat and carbon dioxide are waste products. However, both the fat and carbon dioxide can be used to form biofuel. Referring to FIG. 56, The fat can be used as a waste material 561 and introduced into the homogenizing apparatus 563. As discussed above a resultant product of this system is the formation of carbon dioxide gas from the liquid carbon dioxide that can be used in the process to separate lean beef from fat. Once the carbon dioxide has been used in the lean/fat separation process it can be used to form fuel in a gasification process. Specifically, the carbon dioxide can be used in a gasification process to form syngas (a blend of CO and H2) or in a Fischer-Tropsch process to form a bio-diesel fuel. Carbon dioxide is used in these processes by forming carbon monoxide which can be accomplished by the introduction of oxygen. Oxygen in turn can be provided through electrolysis of water or air. The amount of oxygen required depends on the amount of fat and carbon dioxide by products that are formed in the system along with any other organic material introduced into the system.

As disclosed in U.S. Patent Application No. 60/561,128 a method of separating beef fat from ground beef is disclosed wherein blended ground beef and suitably pressurized liquid carbon dioxide are allowed to stratify wherein the beef fat floats because it has a specific density less than that of the liquid carbon dioxide and the lean beef sinks because it has a specific density greater than the specific density of the liquid carbon dioxide in which it is blended. After separation, the beef fat can be homogenized and subsequent to any other processing such as required for the extraction of collagen, the carbon dioxide and beef fat can be transferred to a gasification process wherein steam is added in measured quantities with measured quantities of oxygen. The combined mixture of fluids is heated under pressure such that the two gases of carbon monoxide and hydrogen are formed in relative quantities as desired and determined by the relative quantities of each fluid. More particularly, the gasification process is a commonly used process with the production of liquid fuels such as diesel from fossil fuels such as natural gas. In a typical gasification process steam, oxygen (wherein the oxygen is derived from an air separation process comprising the compression and liquefaction of air, enabling the stratification of atmospheric gases and the separation of oxygen accordingly), and natural gas are blended together, compressed to a suitable pressure such as 300 psi or more or less, and a suitable temperature such as 1500 degrees F. or more or less, the two gases of carbon monoxide and hydrogen are produced. This process is known as gasification. Information regarding a gasification process is shown on website http://www.gasification.org/story/explaine/explaine.html incorporated herein by reference. It is proposed that the beef fat and residual carbon dioxide, with a suitable quantity of oxygen and a suitable quantity of steam, be gasified in the same way as natural gas is gasified, the difference being that the beef fat and CO2 will be substituted for the natural gas. In this way, beef fat and the carbon dioxide, or alternatively the beef fat alone, can be blended with suitable proportions of steam and oxygen heated and pressurized to suitable levels, enabling the production of carbon monoxide and hydrogen gases.

In the gasification process with beef fat, any impurities such as sulfur compounds or nitrogen compounds will be separated during the gasification process such that the carbon monoxide and hydrogen alone, and arranged in proportions as required, will be transferred into a Fischer-Tropsch apparatus wherein diesel fuel, or alternatively methanol, can be produced. Catalysts manufactured by Johnson Matthey PLC, of London, are provided to enable the production of diesel fuel in the Fischer-Tropsch process. A trimming process is often required which is interposed between the gasification and the Fischer Tropsch process where catalysts are arranged to adjust the quantity of carbon monoxide versus hydrogen by the introduction of carbon dioxide under heat and pressure, arranged at suitable levels. It can therefore be seen that when carbon dioxide is used as the medium for separating the lean beef and beef fat, the beef fat and carbon dioxide can be used together to produce a useful fuel such as diesel, or alternatively methanol, paraffin wax or any other suitable fuel.

In another embodiment, bio-diesel and glycerin can be produced in a process including the actual shipping process itself. Beef fat removed from ground beef may be emulsified at the point of separation which may be at a beef packing plant, and mixed with a quantity of sodium hydroxide (or potassium hydroxide), and ethanol (or methanol), wherein the ethanol comprises approximately 12% by weight of the resultant mixture, and then the mixture can be transferred directly into a storage vessel which may be a suitable road or rail tanker. The tanker can then be used to carry the mixture of beef fat, sodium hydroxide and ethanol, to a central processing facility, where the mixture of beef fat, ethanol, and sodium hydroxide, is transferred into a vessel and series of conduits and connecting vessels, so as to allow for stratification of the resultant fluid. In this way, emulsified beef fat blended with sodium hydroxide and ethanol at the point of separation, is processed during the shipping period such that, given that the period of shipping is of sufficient time, the production of bio-diesel and glycerin can occur during the shipping process. It can be seen that the method of transporting the combination of materials comprising beef fat, ethanol and sodium hydroxide in this way, provides for efficient production of bio-diesel and glycerin.

The combination of materials may comprise any selected materials most suitable for the production of bio-diesel and can be pumped into a large plastic pouch that can be contained inside a shipping container such as any standard 20 foot or 40 foot shipping container. Such large plastic pouches, capable of holding a suitable quantity of liquid such as 40,000 lbs by weight, are manufactured by Scholle Corporation of Irvine Calif. Information about pouches manufactured by Scholle Corporation can be seen on website www.scholle.com.

In yet another embodiment, glycerin separated from the blend of bio-diesel and glycerin, can be transferred to a gasification plant after production of bio-diesel, wherein the glycerin alone is blended with oxygen, steam, and other suitable materials such as a controlled amount of nitric acid. In this way, excess glycerin can be dealt with by processing into diesel or other suitable liquid fuel.

In another embodiment, any plant matter comprising the whole plant or part of the plant such as grass, wheat, barley, rape, millet or the grain or seeds harvested there from, or any other suitable woody plant matter such as willow or poplar wood and/or any other type of woody or grassy bio-mass feed stocks that can be grown on existing arable farm ground, then harvested and baled (after suitable drying), then transported by road or rail to a central location can be used as the feedstock materials for bio-mass based Fischer-Tropsch liquids production.

Figure 58:
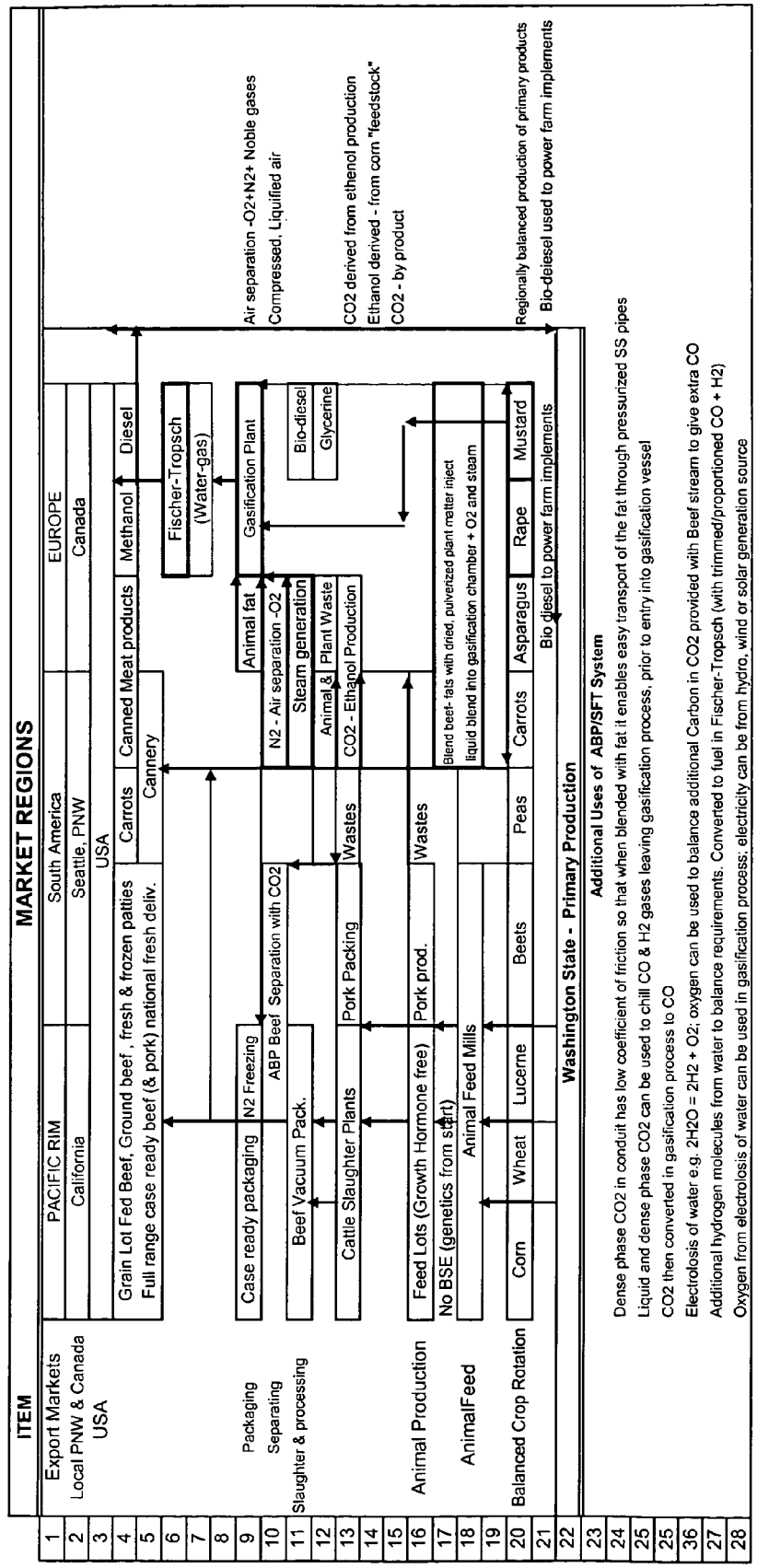
FIG. 58 is a chart showing the primary production of selected crops and their use according to a balanced plan to produce processed foods and fuels for use in local markets and also for export.

Referring to FIG. 58, a chart shows the primary production of selected crops and their use according to a balanced plan to produce processed foods and fuels for use in local markets, and also for export. The region of production can be any suitable region and the production plan comprising a selected range of crops shown on line 20, can be any suitable range of arable crops and can be planted according to typical weather conditions of a selected region. However, this particular chart refers specifically to a region in the Pacific Northwest of the USA, generally centered at the Tri-Cities region immediately north of the Columbia River in Washington State. The conditions in this region are particularly suitable for a balanced plan as proposed herein whereby primary crops are planted and rotated according to a balanced need such that adequate quantities of any particular primary crop are produced without excess, for example corn sufficient to provide for the needs of ethanol production with a reasonable margin of excess are balanced against the production of, for example, rape seed which can be a good source of vegetable oil for the production of bio-diesel. However, in this particular instance bio-diesel, which is a term generally applied to a method of producing diesel fuel comprising the blending of vegetable oil and a quantity of sodium hydroxide and ethanol, which results in production of a proportion of glycerin. The quantity of glycerin produced can be generally equal to approximately 12%-15% of the finished goods and therefore excessive production of glycerin can occur, resulting in a deflation of its value. The plan proposed herein provides for a use of excess glycerin either for soap production, cosmetics and any excess glycerin can be included in the raw materials processed in a gasification plant. Any suitable crop can be produced and this can include others not shown in FIG. 58, such as the wheat/rye hybrid grain producing cereal called Triticale. This particular hybrid cereal produces substantially more quantities of grain per acre than the typical wheat production and is very suitable for inclusion in animal feeds. Triticale straw can also be baled and torrefied in a manner herein below disclosed, which can enable the efficient production of Fischer Tropsch liquid fuels and in particular distillate. The entire plan is designed to provide for production of fuel sufficient to satisfy the regions requirements for agricultural, industrial and private use in any diesel powered vehicle. In line 18, a secondary industry of animal feed production is balanced against the requirements sufficient for the needs of cattle and hog production. Feed lots producing growth hormone free cattle, which are also free from BSE (bovine spongiform encephalopathy), are established within the region, and a balanced production accounting for export needs as well as local requirements is maintained according to the production of feeds within the region. Several feed lots can be located throughout the region and located conveniently close to feed production, and also slaughter facility location. It is contemplated that this particular region, which covers an area of approximately 250,000 square miles, and populated by approximately 10 million inhabitants, would support 8 feed lots or more or less, with between 200,000 and 500,000 cattle in each feed lot. All cattle within the region would have full records of ancestry, feed consumption with medicines, and growth history. No cattle without all such records would be allowed within the region, thereby enabling disease control. Three to five slaughter facilities built according to designs including equipment as disclosed in the present inventor's patent applications cited herein above, each with a capacity of between 2000 and 5000 head per day, and a combined total of up to 7 million head per year or an equivalent of 20% of U.S. requirements annually. Feed lot location is to be selected according to distance from all slaughter facilities such that all feedlots are within 100 miles or more or less, of each slaughter facility. Hog production and slaughtering facilities, comprising a total production capacity of up to a number equal to 20% of the U.S. national annual requirements, are also to be installed within the region at locations convenient to feed production and slaughtering facilities. Beef and pork can be most cost effectively produced in this manner and competitive with any other production region in the world. The Pacific Northwest includes the most productive arable land available with ample water supply provided via the Columbia River and other water sources, and in spite of this ample water supply, the semi desert conditions of central Washington are eminently suitable and ideal for cattle feed lot production.

Still referring to FIG. 58, the chart shows cattle and pork packing plant installation with the use of ABP beef separation capability, which provides for efficiency unknown elsewhere. The details of the ABP beef separation system are disclosed in the above referenced U.S. Patent Application No. 60/561,128 The by product animal waste streams available from feed lot and hog production facilities in combination with the non-human food animal by product waste streams produced at slaughter plants, can all be combined after suitable processing and directed to a gasification plant. Plant materials such as wheat straw, rape seed and any other plant waste material, can be transferred to the gasification plant and converted to syngas, trimmed with the use of appropriate catalysts, and then by Fischer Tropsch method, converted to distillate, naptha, methanol, or any other valuable fuel or plastic materials. Steam generation as required in the gasification plant, can be fueled by distillate produced or alternatively, hydroelectric energy can be used to generate the steam required. Air separation plants (ASU facilities) are required to effectively and most efficiently operate gasification equipment and consequently, liquid nitrogen can be transferred to the beef and pork production facilities and used in freezing or chilling as required. Corn and wheat straw ethanol production can be installed to provide for requirements in bio-diesel production and use in distillate formulations, and carbon dioxide produced is compressed and made available for ABP beef separation facilities. Beef tallow separated from ground beef production can be transferred to the gasification plant. Noble gases including argon, neon, and other atmospheric gases, can be separated and sold outside the region.

Electrolysis of water to produce hydrogen and oxygen can also be used to balance hydrogen requirements in the Fischer Tropsch process, and oxygen requirements in the gasification plant.

Potato, pea and carrot production, and any beet, hay, Lucerne or cereal plants, can be included in the balanced crop rotation to optimize arable husbandry with the vegetables produced, either canned or frozen, or alternatively whole plant inclusion in animal feed or fuel production.

It can be seen that the balanced production of primary produce, cereals, vegetables, and any temperate climate plant, can be matched for animal production with a corresponding manufacture of bio-mass fuels and in this way, the complete elimination of imported crude oil achieved.

Referring now to FIG. 59, a chart shows a list of 13 source raw materials used in the production of distillate and other fuel or plastic products in a 200,000 barrel per day gasification and Fischer Tropsch plant. The listed items 1 thru 13 correspond with the regionally balanced plan disclosed in association with FIG. 58 above, and the installation of a fuel producing plant with a capacity of approximately 2 to 3 billion gallons per year. Natural gas is included in the fuel production process and adjusted by volume according to availability of the other fuel raw material sources. Torrefied wood chips sourced from the Blue Mountain region of eastern Washington, supplement the raw material supplies and all other items including torrefied baled wheat straw are balanced so as to maximize production at a centrally located facility with a capacity of 200,000 barrels per day. It is estimated that the cost of this facility shall be in the order of US $3-5 billion, however the ROI is less than 5 years without the loss of US dollars for the purchase of corresponding amount of crude oil, which cost should include that associated with war. With consideration to such costs, the ROI may be considered instantaneous upon commissioning. Torrefaction of wood, waste paper, timber by products, wood chips, baled wheat straw, animal effluent and other animal by product waste streams, is used in this plan, to efficiently convert waste products to usable fuel.

In another preferred embodiment, large scale, mobile wood chipping systems can be arranged to systematically process, what is otherwise not only valueless but extremely hazardous forest fire fuel in the form of dead trees, branches of trees and sticks that has accumulated at the base of trees and on the floors of millions of squares miles of US forests, by chipping the forest fire fuel and loading directly into shipping containers modified to enable such loading. Such shipping containers have also accumulated at locations around the USA with no further use since the importing of goods from China into the USA far exceeds the exporting of goods from the USA to China. Many thousands of such shipping containers are stored inconveniently at numerous locations of accumulation thereof and no use for them, thus far, has been found. Said shipping containers can be modified by removal of any combustible lining(s) contained therein, which can be used for fuel in the present and subject process, and then lined with suitable galvanized sheet steel by attachment of conveniently sized sheets, directly to the floor and walls which comprise inner surfaces of the containers and in such a manner that a cavity is provided between the sheet steel and the walls and floor. Said wall and floor cavities may comprise a gap of approximately one inch or more or less wherein the floor cavity is in direct communication with the wall cavities. The upper edge of the wall cavities can be connected to a manifold that connects all wall cavities along edges that follow a path close to the perimeter of the upper edge of the steel sheets attached to the walls. The sheet steel covering the floor can be perforated with numerous apertures of about ¼" diameter or more or less and in such a manner that when a conduit carrying suitably pressurized super heated steam is connected to said manifold connecting the upper edge of the walls, the super heated steam will transfer through the wall cavities and then through the apertures in the floor. In this way a conduit of suitable size and having a suitable connection device can be rigidly or flexibly attached to the conduit and an extraction vent can be attached to single or several ports arranged at convenient locations in the shipping container roof and in such a way that super heated steam, heated gas or dry cool air can be forced under a selected pressure and temperature into the container wall cavities, through the floor apertures, into the enclosed shipping container internal space and finally through the extraction vents in the shipping container roof, thereby providing an enclosed circuit such that when super heated steam or any selected gas at any suitable temperature is provided at any selected pressure into the manifold connecting with the wall cavities is then subsequently extracted through the roof vents and re-circulated after heating or cooling by any suitable means an enclosed circuit is provided. Said supply of super heated steam, gas or air at a controlled temperature can be either vented to atmosphere or recycled according to desire. It can therefore now be seen that chipped, waste bio-mass wood, harvested from the forest floors and loaded directly into said shipping containers, through the roof vents so as to fill said shipping containers to a desired extent or with a controlled selected volume, the chipped wood therein then contained can then be treated such that it is torrified prior to shipping to, for example, a gasification plant such as at a central location and as disclosed in association with FIG. 60 herein below. Furthermore, baled wheat straw, having dimensions that provide for a tight fit within said containers or any bio-mass materials named in this application or any other suitable bio-mass materials, can be loaded into said containers having been modified in a manner similar to the that described herein above, can also be treated and/or torrified or alternatively dried, heated or cooled as required. Additionally, any effluent sludge or emulsified tallow, or any waste streams from slaughter facilities, for example, can be loaded most preferably onto the chipped wood or straw after loading so as to provide for the saturation of the wood chips or straw prior to torrification of drying or treating. In this way, suitable straw, wood chips or any other solid bio-mass material can be loaded into the enclosed shipping containers prior to any fluid or liquid waste being loaded therein. The quantities of solid bio-mass material compared to the quantities of fluid bio-mass materials can be provided according to selected and proportioned quantities according to the most efficient ratio of solid versus fluid materials and in such a manner that will allow for the most cost effective methods.

In another preferred embodiment shipping containers can be loaded, at the forest locations generally as disclosed above and then transferred by road or rail transport to the gasification plants via a central station where suitable boilers are installed to enable torrification according to the methods described above. In this way the most cost effective use of centrally installed boilers, for example, arranged to provide super heated steam according to the methods disclosed above, can be ensured. In another preferred process conduits may be provided to connect the inlet manifold of a second container to the outlet extraction vents of a first shipping container so that heated steam, or gas or air can be transferred to a second container after transfer a first container thereby enabling the efficient use of heated gas or steam. Additionally, any number of shipping containers may be connected together by transferring gases from a first container to a second container.

Figure 60:
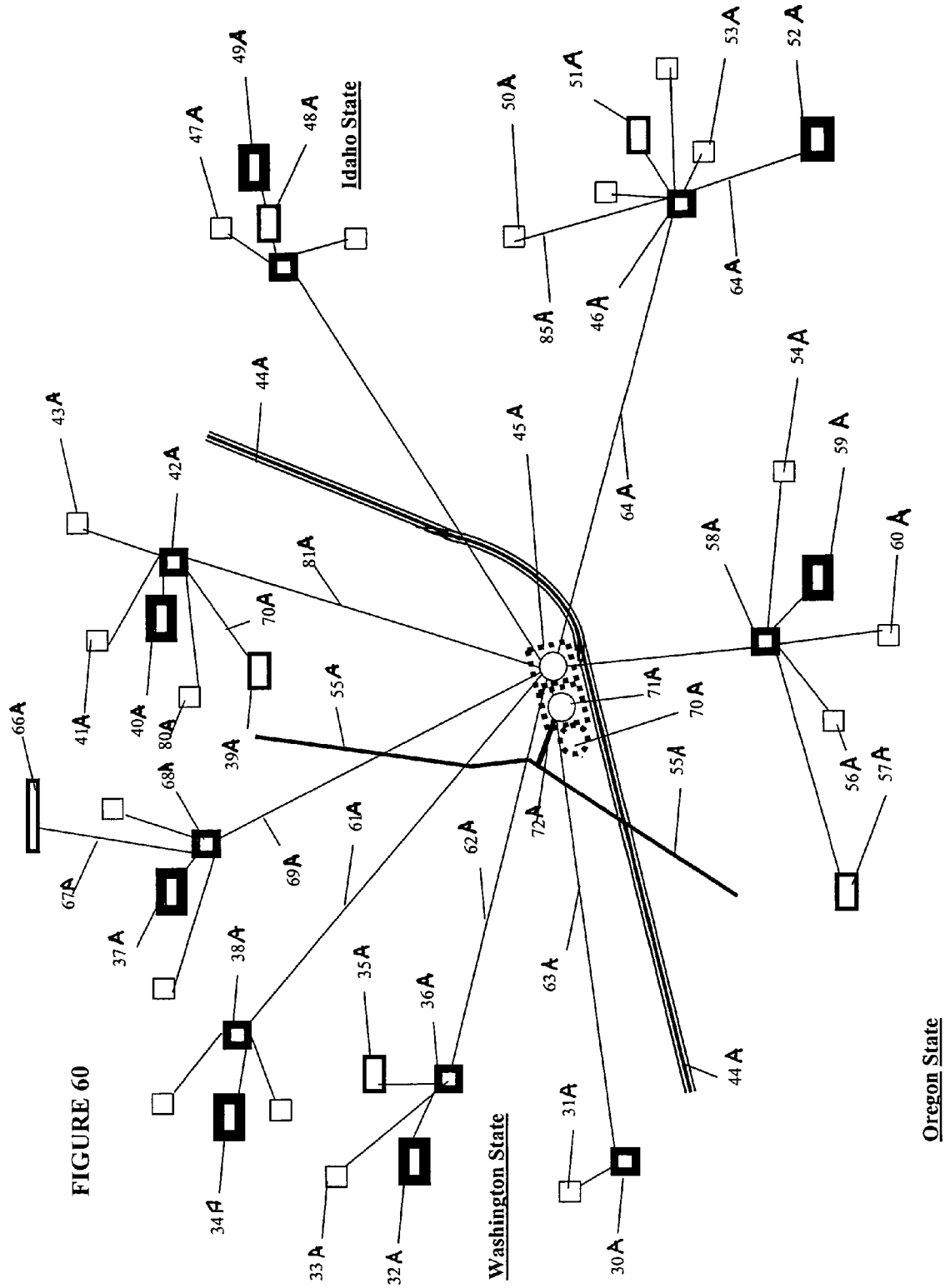
FIG. 60 is a diagrammatic representation of the region referenced in association with FIG. 58.

Referring now to FIG. 60, a diagrammatic representation of the region referenced in association with FIG. 58 is provided. The River Columbia 44A approximately dissects the view shown and natural gas pipeline 55A carries natural gas from Alaska gas fields. Gasification plant 45A is the focal point of suitable conduit pipelines 61A, 62A, 63A and 64A. Air separation unit 70A is located directly adjacent to Fischer Tropsch plant 71A and gas pipeline 72A connects gas pipeline 55A to Fischer Tropsch plant 71A. The torrefication of wood is explained in papers accessible by web links disclosed herein below and this process can be used to dehydrate such waster materials as wood chips, wheat straw and any other fuel source which has hitherto been wasted by encouraging decomposition thereof in effluent treatment plants where bacteria is supported to wastefully produce carbon dioxide without any other benefit. It is a purpose of this disclosure to show how sufficient fuel to provide for the needs of this entire region, can be readily sourced from within the region for essentially no or low cost. Wood torrefication plant 66A is connected to pipeline 67A. Wood torrefication plant 66A is located in the Blue Mountain region of eastern Washington and serves as a collection point for timber otherwise not used. The source of the wood chips provides for the benefit of reducing bio-mass fuel that will otherwise burn with random ferocity with the destruction of the forests where it is presently accumulating. The benefit of removing this fuel is dual; a first benefit being the removal of the bio-mass fuel that will burn ultimately, whether it be to the benefit of operating a vehicle controlled by local population or secondly, as a result of an inevitable natural event that will occur in the absence of its ordered removal through collection point 66A. A torrefication plant is installed to torrefy timber removed from the region and transfer the friable material produced through conduit 67A. Feed lot 37A is also attached via pipeline connection to baled wheat straw torrefication plant 68A. Wheat straw and effluent are combined at torrefication plant 68A prior to transfer of the torrefied straw and effluent via conduit 69A in direct communication with gasification plant 45A. Slaughter facility 39A is connected to torrefication plant 42A via conduit 70A. Feed lot 40A is connected directly to baled wheat straw torrefication plant 42A. Wheat straw accumulations at 41A and 43A are located conveniently for farm production of wheat straw. Baled wheat straw is stacked at central locations 41A, 43A and 80A and is connected to a central torrefication plant 42A. Torrefication plant 42A is connected via conduit 81A to gasification plant 45A. Conduit 81A comprises a continuous steel tube of approximately 6 inch internal diameter and is in direct communication with gasification plant 45A. This steel tube can be used to transfer torrefied wheat straw combined with effluent and animal waste products under pressure. Liquid carbon dioxide is blended with the torrefied materials and the pressurized materials can be effectively transferred for 100 miles or more in this way. The process was invented by Neil Greenfield of BOC, and has been used to transfer coal from the coal mine to a gasification plant. The coefficient of friction of carbon dioxide is very low, hence when blended with the friable torrefied wheat straw and torrefied effluent, the combined mixture can be pumped at high velocity through the conduit 81A. FIG. 60 shows the region at a point in the Pacific Northwest which includes areas of Washington State, Idaho, and Oregon State. Wheat straw storage locations 47A, 50A, 52A, 54A, 60A, 31A, 33A, 41A and 43A are shown as examples and can be located at any convenient location. The wheat harvesting period of each year extends for about 10 to 12 weeks, and wheat straw must therefore be accumulated at convenient locations during this period, and then progressively transferred to the gasification plant 45A, centrally located as required. In the event that insufficient wheat straw and other sources of energy rich waste products can be obtained, the quantity of natural gas converted in Fischer Tropsch apparatus 71A can be increased to compensate accordingly. Feed lots 59A, 52A, 49A, 40A, 37A, 34A, and 32A are located conveniently in the region and slaughter plants 35A, 39A, 48A, 51A and 57A are also located and connected via conduits as shown. Alternatively any suitable method of transporting materials used to produce fuel at the centrally located Fischer Tropsch converting equipment can be employed as required. However, it is anticipated that a series of conduits installed as shown can provide the most efficient method of transport.

Figure 61:
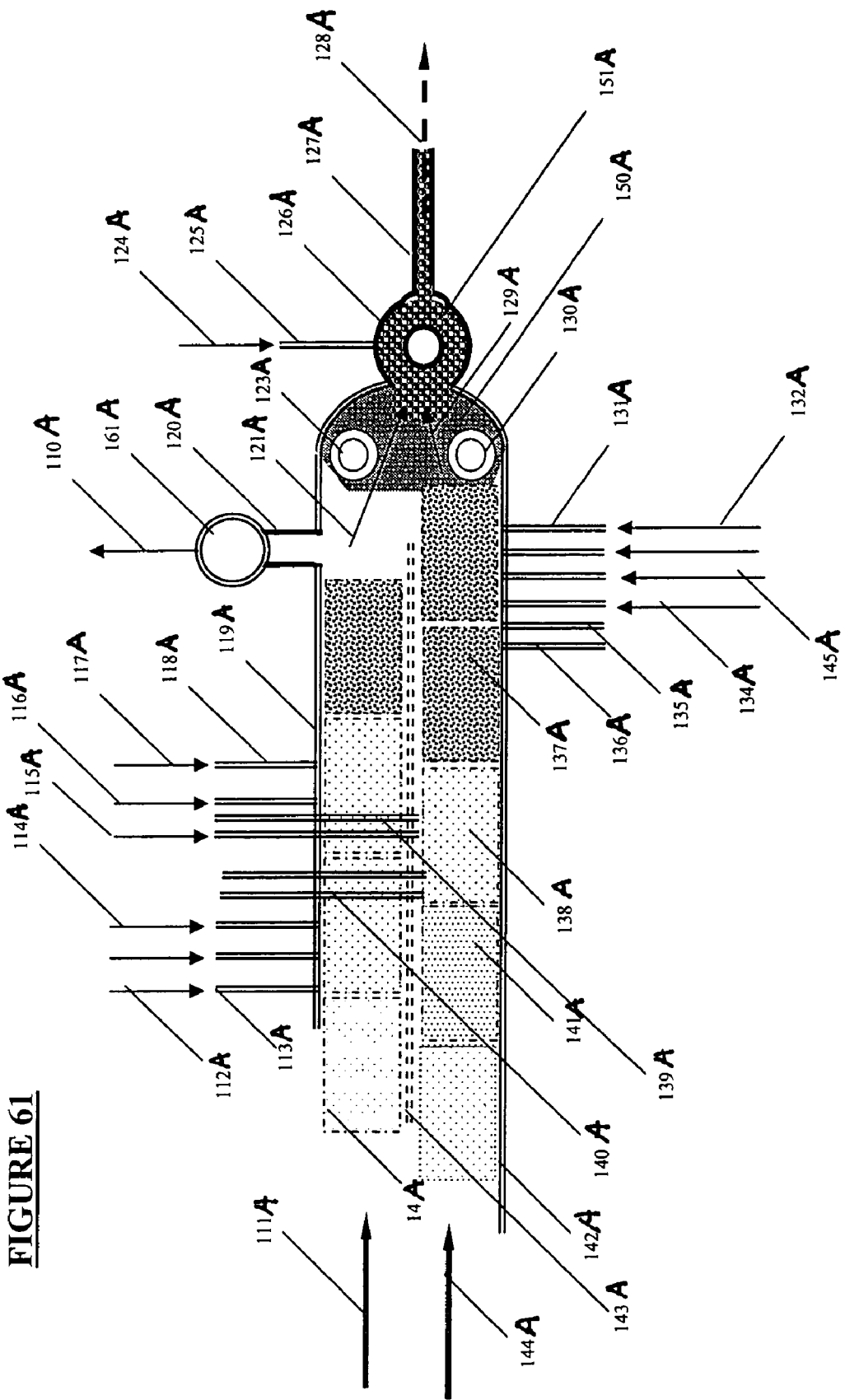
FIG. 61 is a cross-sectional view of an apparatus arranged to torrefy baled wheat straw and other waste materials.

Referring now to FIG. 61, the cross section through an apparatus arranged to torrefy baled wheat straw and other waste materials is shown. Bales of wheat 141A, 138A, 137A and 14A are arranged in two rows within an enclosing conduit 119A. Any suitable number of layers with perforated dividers such as 143A can be arranged such that a continuous stream of wheat straw bales can be transferred in the directions shown by arrows 111A and 144A. Conduits such as 113A, 140A, 139A, and 118A are arranged to enable the injection of energy rich waste materials in the direction shown by arrows such as 112A, 114A, 115A, 116A and 117A. In this way bales of wheat straw can be used as a carrier for the waste streams. The bales with waste materials transferred thereto are carried through conduit 119A in the direction shown by arrows 111A and 144A toward an end of conduit 119A. Super heated steam or alternatively super heated gas such as carbon dioxide, is transferred at any suitable pressure either above or below atmospheric pressure, in the direction shown by arrows such as 134A, 145A and 132A through a series of conduits such as 136A, 135A and 131A. The super heated steam therefore is transferred through the bales and in this way is extracted via conduit 120A in the direction shown by arrow 110A by extraction pump 161A at high velocity and mass flow. The process as shown, torrefies the wheat straw with waste materials therewith. The continuous stream of bales and waste materials can be transferred in the direction shown by arrows 111A and 144A and after torrefaction, granulator impellors at 123A and 130A can pulverize the torrefied materials which is extracted by centrifugal pump or other suitable pumping means and in the direction shown by arrows 121A and 129A. Torrefied material is friable and granulated into a homogenous blend of material 150A and transferred into conduit 127A by pump 126A, after blending with liquid carbon dioxide transferred under pressure via conduit 125A in direction shown by arrow 124A. Pressurized combination of torrefied materials and carbon dioxide are then transferred through conduit 127A under suitable pressure in the direction shown by arrow 128A.

The apparatus described herein in association with diagrammatic FIG. 61 can be located at stations, remote from the gasification 41A and Fischer-Tropsch 71A location, shown in FIG. 60 such as 30A, 36A, 38A, 68A, 42A, 46A and 58A. Conduit 127A is constructed and provided at 63A, 62A, 61A, 70A, 67A, 64A and 85A for example. In this way, torrefied products prepared in a manner that will allow rapid and controlled gasification in gasifier 45A, can be provided to most cost effectively produce bio-distillate or green diesel in sufficient quantities to provide for the entire region shown in connection with FIG. 58.

In another preferred embodiment the torrified bio-mass, which can most preferably comprise bales of wheat straw, rice straw, agri-pulp, hops, barley straw or any other suitable cereal straw, triticale or any suitable grass straw or agricultural wastes (including cotton gin trash, peanut hulls, sugar beet waste, corn stover, bagasse, sorghum stover, hemp, virgin wood fiber and/or corn silage) combined with any effluent or sewage sludge (including human effluent sewage sludge as well as any animal effluent) or any suitable energy rich waste materials including fats and cellulose which may be derived from any suitable agricultural residues or food production processes such as animal slaughtering facilities; the combined waste materials will most preferably include a fibrous component and a sludge or emulsified component such as straw or wood fiber and sewage sludge or liquefied animal wastes. Such combined waste materials can be torrified with superheated steam readily and in shorter time periods than waste that does not include a fibrous component. It is understood that the process of torrefaction can achieve a stable moisture content of about 3% and reduction of mass by 20% to 30% while retaining 80% to 90% of the bio-mass original energy content.

It can therefore be seen that the torrifaction process removes most water content from the bio-mass materials and also reduces the materials to a suitably friable condition which enables the finished product to be compressed into blocks of selected dimensions such as a block that will fit neatly into a 20' long shipping container; the dimensions can therefore be about 7.75 feet wide×19.5 feet long×7 feet high and having a weight of approximately 20 tons or 40,000 lbs. Alternatively 2× such 20 ton blocks, weighing 80,000 lbs can be loaded into a 40' shipping container and carried by rail from the point of production to the gasification plant. In this way bio-mass materials can be efficiently transported from the production facility located close to the forest or fields from which the bio-mass is harvested in blocks loaded into low cost shipping containers. It can be therefore seen that after processing with the apparatus as generally described in association with FIG. 61 the friable, terrified bio-mass materials, can be automatically loaded and compressed into a mold or multiple molds of any suitable size to produce blocks of material which can be stacked and stored until required.

Upon arrival at the gasification plant, the blocks can be automatically removed from the shipping containers, granulated into a granular condition, blended with liquid oxygen in selected proportions and pumped under a selected pressure required by the gasification process into the gasification vessels with steam and a selected quantity of natural gas in selected proportions. In this way the operation of the gasification system is most efficient.

It should be noted that each shipping container used to carry the formed blocks of torrified materials, can each be fitted with a read-write RFID tag wherein the RFID tag is located in a safe and protected location on the shipping container, so that the contents and origin of the container contents including any and all historical details associated with the block contained in the shipping container can be read at the gasification plant prior to use and used according to the known characteristics of the torrified bio-mass materials.

The Hesston baler (see www.hesston.agcocorp.com/default.cfm?pid=1.9.3 for details of Hesston large baling equipment) makes bales 4'×4'×8' which can weigh up to and above 0.5 ton each and can be stacked 4-5 bales high. This baler can be used to bale any straw material and the large dimensions enable the automation of handling and in such a way that when the bales are stacked the structure created is rigidly secure and the bales of straw can be stored in this manner and covered with waterproofing plastic sheeting and retained in this manner until required.

While the methods and apparatus disclosed in association with FIGS. 61 and 60, provide a most effective and efficient system of transporting energy rich materials from remote locations to a central fuel production facility, other methods of transport can also be used without departing from the general methods of bio-fuel production as disclosed herein.

Natural gas blended with baled grasses which may be pulverized and blended with and a measured quantity of beef tallow.

The following web links to papers provide some details of the design and economics of smaller scale natural gas and bio-mass materials gasification and production of Fischer-Tropsch liquids as referenced herein and are hereby included in this subject matter:

http://www.netl.doe.gov/publications/proceedings/97/97cl/choi.pdf-
http://www.rentechinc.com/pdfs/CWC_pres_on_5-22-03-final.pdf
http://www.sasolchevron.com/conceptual_design.htm
http://www.novem.nl/default.asp?menuId=10&documentId=28277-
http://www.techtp.com/FT%20Liquids%20from%20TW%20Gasification.pdf-
http://bioproducts-bioenergy.gov/pdfs/bcota/abstracts/28/z136.pdf Catalysts required for the efficient operation of gasification plants with corresponding Fischer-Tropsch conversion of water gas to diesel fuels can be obtained from Johnson Matthey, plc of London and information is accessible on their web site at http://www.imcatalysts.com.

While the preferred embodiment of the invention has been illustrated and described, it will be appreciated that various changes can be made therein without departing from the spirit and scope of the invention.

What is claimed is:

1. A method of processing organic waste products into fuel comprising:
    (a) homogenizing the waste products;
    (b) heating and pressurizing the waste products;
    (c) removal of water from the waste products;
    (d) separation of a selected constituent of the waste products from the waste products into a waste stream, wherein the selected constituent is proteins; and
    (e) blending a fuel with the waste stream to form a bio-fuel mixture.

* * * * *